(12) United States Patent
Lee et al.

(10) Patent No.: US 12,478,674 B2
(45) Date of Patent: Nov. 25, 2025

(54) IPILIMUMAB VARIANTS WITH ENHANCED SPECIFICITY FOR BINDING AT LOW PH

(71) Applicant: BRISTOL-MYERS SQUIBB COMPANY, Princeton, NJ (US)

(72) Inventors: Peter Sung Keun Lee, Millbrae, CA (US); Pavel Strop, San Mateo, CA (US); Arvind Rajpal, San Francisco, CA (US); Olafur S. Gudmundsson, West Windsor, NJ (US); Pradyot Nandi, Haskell, NJ (US)

(73) Assignee: BRISTOL-MYERS SQUIBB COMPANY, Princeton, NJ (US)

( * ) Notice: Subject to any disclaimer, the term of this patent is extended or adjusted under 35 U.S.C. 154(b) by 1035 days.

(21) Appl. No.: 17/604,711

(22) PCT Filed: Apr. 16, 2020

(86) PCT No.: PCT/US2020/028402
§ 371 (c)(1),
(2) Date: Oct. 18, 2021

(87) PCT Pub. No.: WO2020/214748
PCT Pub. Date: Oct. 22, 2020

(65) Prior Publication Data
US 2022/0193237 A1    Jun. 23, 2022

Related U.S. Application Data

(60) Provisional application No. 62/835,794, filed on Apr. 18, 2019.

(51) Int. Cl.
*A61K 39/395*    (2006.01)
*A61P 35/00*    (2006.01)
*C07K 16/28*    (2006.01)
*A61K 39/00*    (2006.01)

(52) U.S. Cl.
CPC .. *A61K 39/39575* (2013.01); *A61K 39/39591* (2013.01); *A61P 35/00* (2018.01); *C07K 16/2818* (2013.01); *A61K 2039/505* (2013.01)

(58) Field of Classification Search
None
See application file for complete search history.

(56) References Cited

U.S. PATENT DOCUMENTS

| | | |
|---|---|---|
| 6,984,720 B1 | 1/2006 | Korman |
| 9,301,510 B2 | 4/2016 | McWhirter et al. |
| 9,540,449 B2 | 1/2017 | Yancopoulos et al. |
| 9,683,985 B2 | 6/2017 | Kodandapani et al. |
| 10,106,576 B2 | 10/2018 | Short |
| 10,329,556 B2 | 6/2019 | Short et al. |
| 2005/0260711 A1 | 11/2005 | Datta et al. |

FOREIGN PATENT DOCUMENTS

| | | |
|---|---|---|
| WO | 03105757 A2 | 12/2003 |
| WO | 2010104821 A1 | 9/2010 |
| WO | 2011009058 A2 | 1/2011 |
| WO | 2016033331 A1 | 3/2016 |
| WO | 2017034615 A1 | 3/2017 |
| WO | 2017078839 A1 | 5/2017 |
| WO | 2018044619 A1 | 3/2018 |
| WO | 2018129007 A1 | 7/2018 |
| WO | 2018218076 A1 | 11/2018 |
| WO | 2019152423 A1 | 8/2019 |
| WO | 2019241216 A1 | 12/2019 |
| WO | 2020041247 A1 | 2/2020 |
| WO | 2020092155 A1 | 5/2020 |
| WO | 2020252095 A1 | 12/2020 |

OTHER PUBLICATIONS

MacCallum et al. (1996). J. Mol. Biol. 262:732-745.*
De Pascalis et al. (2002). Journal of Immunology. 169:3076-3084.*
Casset et al. (2003). Biochemical and Biophysical Research Communications. 307:198-205.*
Chen et al. (1999). J. Mol. biol. 293:865-881.*
Wu et al. (1999). J. Mol. Biol. 294: 151-162.*
Rudikoff et al. (1982). PNAS. 79:1979-1983.*
International Search Report; ISA EP; pp. 1-18; Jul. 6, 2020.
Bonvin et al. MABS; "De novo isolation of antibodies with pH-dependent binding properties"; vol. 7; Issue 2; pp. 294-302; 2015.
Chaparro-Riggers et al.; Journal of Biological Chemistry; "Increasing Serum Half-life and Extending Cholesterol Lowering in Vivo by Engineering Antibody with pH-sensitive Binding to PCSK9"; vol. 287; No. 14; pp. 11090-11097; 2012.
Devanaboyina et al; MABS; "The effect of pH dependence of antibody-antigen interactions on subcellular trafficking dynamics"; vol. 5. No. 6; pp. 851-859; 2013.
Fukuzawa et al.; Scientific Reports; "Long Lasting Neutralization of C5 By SKY59 a Novel Recylcing Antibody, is a Potential Therapy for Complement-Mediated Diseases"; vol. 7. No. 1080; pp. 1-12; 2017.
Hornsby et al.; Molecular & Cellular Proteomics; "A High Throughput Platform for Recombinant Antibodies to Folded Proteins"; vol. 14. No. 10; pp. 2833-2847; 2015.
Igawa et al.; Nature Biotechnology; "Antibody recycling by engineered pH-dependent antigen binding Improves the duration of antigen neutralization"; vol. 28; No. 11; pp. 1203-1208; 2010.
Rajpal et al.; PNAS; "A general method for greatly improving the affinity of antibodies by using combinatorial libraries"; vol. 102; No. 24; pp. 8466-8471 ; 2005.

(Continued)

*Primary Examiner* — Christine J Saoud
*Assistant Examiner* — Jon M Lockard
(74) *Attorney, Agent, or Firm* — Gregory R. Bellomy

(57) ABSTRACT

The present invention provides variant forms of anti-CTLA-4 antibodies, such as ipilimumab, that preferentially bind to CTLA-4 at low pH. Such antibody variants exhibit preferential activity in the tumor microenvironment, an enhanced ratio of anti-tumor response to side-effects, and an enhanced therapeutic index.

10 Claims, 36 Drawing Sheets
Specification includes a Sequence Listing.

(56) References Cited

OTHER PUBLICATIONS

Schroter et al.; MABS; "A generic approach to engineer antibody pH-switches using combinatorial histidine scanninglibraries and yeast display"; vol. 7; No. 1; 138-151; 2015.
Sulea et al.; MABS; "Structure-Based Engineering of pH-Dependent Antibody Binding for Selective Targeting of Solid-Tumor Microenvironment"; vol. 12; No. 1; pp. 1-15; 2020.

* cited by examiner

FIG. 1

CDR Sequence Numbering

| HCDR1 | HCDR2 | HCDR3 |
|---|---|---|
| GFTFSSYTMH | FISYDGNNKYYADSVKG | TGWLGPFDY |
| SEQ ID NO: 3 | SEQ ID NO: 4 | SEQ ID NO: 5 |

| LCDR1 | LCDR2 | LCDR3 |
|---|---|---|
| RASQSVGSSYLA | GAFSRAT | QQYGSSPWT |
| SEQ ID NO: 6 | SEQ ID NO: 7 | SEQ ID NO: 8 |

FIG. 2A

GFTFSSYTMH

TISYDGNNKYYADSVKG

TGWLGPFDY

A.

B.

A.            pH 7.4

B.            pH 6.0

A.

B.

C.

A.

B.

A.

B.

A.

B.

A.

B.

A.

B.

A.

B.

Ipi.105 1mpk

Ipi.105 3mpk

Ipi.105 10mpk

SEQUENCE LISTING

```
<160> NUMBER OF SEQ ID NOS: 45

<210> SEQ ID NO 1
<211> LENGTH: 223
<212> TYPE: PRT
<213> ORGANISM: Homo sapiens

<400> SEQUENCE: 1

Met Ala Cys Leu Gly Phe Gln Arg His Lys Ala Gln Leu Asn Leu Ala
1               5                   10                  15

Thr Arg Thr Trp Pro Cys Thr Leu Leu Phe Leu Leu Phe Ile Pro
            20                  25                  30

Val Phe Cys Lys Ala Met His Val Ala Gln Pro Ala Val Val Leu Ala
            35                  40                  45
```

-continued

```
Ser Ser Arg Gly Ile Ala Ser Phe Val Cys Glu Tyr Ala Ser Pro Gly
 50                  55                  60

Lys Ala Thr Glu Val Arg Val Thr Val Leu Arg Gln Ala Asp Ser Gln
 65                  70                  75                  80

Val Thr Glu Val Cys Ala Ala Thr Tyr Met Met Gly Asn Glu Leu Thr
                     85                  90                  95

Phe Leu Asp Asp Ser Ile Cys Thr Gly Thr Ser Ser Gly Asn Gln Val
                100                 105                 110

Asn Leu Thr Ile Gln Gly Leu Arg Ala Met Asp Thr Gly Leu Tyr Ile
                115                 120                 125

Cys Lys Val Glu Leu Met Tyr Pro Pro Pro Tyr Leu Gly Ile Gly
130                 135                 140

Asn Gly Thr Gln Ile Tyr Val Ile Asp Pro Glu Pro Cys Pro Asp Ser
145                 150                 155                 160

Asp Phe Leu Leu Trp Ile Leu Ala Ala Val Ser Ser Gly Leu Phe Phe
                165                 170                 175

Tyr Ser Phe Leu Leu Thr Ala Val Ser Leu Ser Lys Met Leu Lys Lys
                180                 185                 190

Arg Ser Pro Leu Thr Thr Gly Val Tyr Val Lys Met Pro Pro Thr Glu
                195                 200                 205

Pro Glu Cys Glu Lys Gln Phe Gln Pro Tyr Phe Ile Pro Ile Asn
                210                 215                 220

<210> SEQ ID NO 2
<211> LENGTH: 220
<212> TYPE: PRT
<213> ORGANISM: Homo sapiens

<400> SEQUENCE: 2

Met Leu Arg Leu Leu Ala Leu Asn Leu Phe Pro Ser Ile Gln Val
 1                   5                  10                  15

Thr Gly Asn Lys Ile Leu Val Lys Gln Ser Pro Met Leu Val Ala Tyr
                 20                  25                  30

Asp Asn Ala Val Asn Leu Ser Cys Lys Tyr Ser Tyr Asn Leu Phe Ser
                 35                  40                  45

Arg Glu Phe Arg Ala Ser Leu His Lys Gly Leu Asp Ser Ala Val Glu
 50                  55                  60

Val Cys Val Val Tyr Gly Asn Tyr Ser Gln Gln Leu Gln Val Tyr Ser
 65                  70                  75                  80

Lys Thr Gly Phe Asn Cys Asp Gly Lys Leu Gly Asn Glu Ser Val Thr
                 85                  90                  95

Phe Tyr Leu Gln Asn Leu Tyr Val Asn Gln Thr Asp Ile Tyr Phe Cys
                100                 105                 110

Lys Ile Glu Val Met Tyr Pro Pro Pro Tyr Leu Asp Asn Glu Lys Ser
                115                 120                 125

Asn Gly Thr Ile Ile His Val Lys Gly Lys His Leu Cys Pro Ser Pro
                130                 135                 140

Leu Phe Pro Gly Pro Ser Lys Pro Phe Trp Val Leu Val Val Val Gly
145                 150                 155                 160

Gly Val Leu Ala Cys Tyr Ser Leu Leu Val Thr Val Ala Phe Ile Ile
                165                 170                 175

Phe Trp Val Arg Ser Lys Arg Ser Arg Leu Leu His Ser Asp Tyr Met
                180                 185                 190

Asn Met Thr Pro Arg Arg Pro Gly Pro Thr Arg Lys His Tyr Gln Pro
```

```
                195                 200                 205
Tyr Ala Pro Pro Arg Asp Phe Ala Ala Tyr Arg Ser
    210                 215                 220

<210> SEQ ID NO 3
<211> LENGTH: 10
<212> TYPE: PRT
<213> ORGANISM: Homo sapiens

<400> SEQUENCE: 3

Gly Phe Thr Phe Ser Ser Tyr Thr Met His
1               5                   10

<210> SEQ ID NO 4
<211> LENGTH: 17
<212> TYPE: PRT
<213> ORGANISM: Homo sapiens

<400> SEQUENCE: 4

Phe Ile Ser Tyr Asp Gly Asn Asn Lys Tyr Tyr Ala Asp Ser Val Lys
1               5                   10                  15
Gly

<210> SEQ ID NO 5
<211> LENGTH: 9
<212> TYPE: PRT
<213> ORGANISM: Homo sapiens

<400> SEQUENCE: 5

Thr Gly Trp Leu Gly Pro Phe Asp Tyr
1               5

<210> SEQ ID NO 6
<211> LENGTH: 12
<212> TYPE: PRT
<213> ORGANISM: Homo sapiens

<400> SEQUENCE: 6

Arg Ala Ser Gln Ser Val Gly Ser Ser Tyr Leu Ala
1               5                   10

<210> SEQ ID NO 7
<211> LENGTH: 7
<212> TYPE: PRT
<213> ORGANISM: Homo sapiens

<400> SEQUENCE: 7

Gly Ala Phe Ser Arg Ala Thr
1               5

<210> SEQ ID NO 8
<211> LENGTH: 9
<212> TYPE: PRT
<213> ORGANISM: Homo sapiens

<400> SEQUENCE: 8

Gln Gln Tyr Gly Ser Ser Pro Trp Thr
1               5

<210> SEQ ID NO 9
<211> LENGTH: 118
<212> TYPE: PRT
<213> ORGANISM: Homo sapiens
```

<400> SEQUENCE: 9

Gln Val Gln Leu Val Glu Ser Gly Gly Gly Val Val Gln Pro Gly Arg
1               5                   10                  15

Ser Leu Arg Leu Ser Cys Ala Ala Ser Gly Phe Thr Phe Ser Ser Tyr
            20                  25                  30

Thr Met His Trp Val Arg Gln Ala Pro Gly Lys Gly Leu Glu Trp Val
        35                  40                  45

Thr Phe Ile Ser Tyr Asp Gly Asn Asn Lys Tyr Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Ile Tyr Tyr Cys
                85                  90                  95

Ala Arg Thr Gly Trp Leu Gly Pro Phe Asp Tyr Trp Gly Gln Gly Thr
            100                 105                 110

Leu Val Thr Val Ser Ser
        115

<210> SEQ ID NO 10
<211> LENGTH: 108
<212> TYPE: PRT
<213> ORGANISM: Homo sapiens

<400> SEQUENCE: 10

Glu Ile Val Leu Thr Gln Ser Pro Gly Thr Leu Ser Leu Ser Pro Gly
1               5                   10                  15

Glu Arg Ala Thr Leu Ser Cys Arg Ala Ser Gln Ser Val Gly Ser Ser
            20                  25                  30

Tyr Leu Ala Trp Tyr Gln Gln Lys Pro Gly Gln Ala Pro Arg Leu Leu
        35                  40                  45

Ile Tyr Gly Ala Phe Ser Arg Ala Thr Gly Ile Pro Asp Arg Phe Ser
    50                  55                  60

Gly Ser Gly Ser Gly Thr Asp Phe Thr Leu Thr Ile Ser Arg Leu Glu
65                  70                  75                  80

Pro Glu Asp Phe Ala Val Tyr Tyr Cys Gln Gln Tyr Gly Ser Ser Pro
                85                  90                  95

Trp Thr Phe Gly Gln Gly Thr Lys Val Glu Ile Lys
            100                 105

<210> SEQ ID NO 11
<211> LENGTH: 447
<212> TYPE: PRT
<213> ORGANISM: Homo sapiens

<400> SEQUENCE: 11

Gln Val Gln Leu Val Glu Ser Gly Gly Gly Val Val Gln Pro Gly Arg
1               5                   10                  15

Ser Leu Arg Leu Ser Cys Ala Ala Ser Gly Phe Thr Phe Ser Ser Tyr
            20                  25                  30

Thr Met His Trp Val Arg Gln Ala Pro Gly Lys Gly Leu Glu Trp Val
        35                  40                  45

Thr Phe Ile Ser Tyr Asp Gly Asn Asn Lys Tyr Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Ile Tyr Tyr Cys

```
            85                  90                  95
Ala Arg Thr Gly Trp Leu Gly Pro Phe Asp Tyr Trp Gly Gln Gly Thr
            100                 105                 110

Leu Val Thr Val Ser Ser Ala Ser Thr Lys Gly Pro Ser Val Phe Pro
            115                 120                 125

Leu Ala Pro Ser Ser Lys Ser Thr Ser Gly Gly Thr Ala Ala Leu Gly
            130                 135                 140

Cys Leu Val Lys Asp Tyr Phe Pro Glu Pro Val Thr Val Ser Trp Asn
145                 150                 155                 160

Ser Gly Ala Leu Thr Ser Gly Val His Thr Phe Pro Ala Val Leu Gln
            165                 170                 175

Ser Ser Gly Leu Tyr Ser Leu Ser Ser Val Val Thr Val Pro Ser Ser
            180                 185                 190

Ser Leu Gly Thr Gln Thr Tyr Ile Cys Asn Val Asn His Lys Pro Ser
            195                 200                 205

Asn Thr Lys Val Asp Lys Arg Val Glu Pro Lys Ser Cys Asp Lys Thr
            210                 215                 220

His Thr Cys Pro Pro Cys Pro Ala Pro Glu Leu Leu Gly Gly Pro Ser
225                 230                 235                 240

Val Phe Leu Phe Pro Pro Lys Pro Lys Asp Thr Leu Met Ile Ser Arg
            245                 250                 255

Thr Pro Glu Val Thr Cys Val Val Val Asp Val Ser His Glu Asp Pro
            260                 265                 270

Glu Val Lys Phe Asn Trp Tyr Val Asp Gly Val Glu Val His Asn Ala
            275                 280                 285

Lys Thr Lys Pro Arg Glu Glu Gln Tyr Asn Ser Thr Tyr Arg Val Val
            290                 295                 300

Ser Val Leu Thr Val Leu His Gln Asp Trp Leu Asn Gly Lys Glu Tyr
305                 310                 315                 320

Lys Cys Lys Val Ser Asn Lys Ala Leu Pro Ala Pro Ile Glu Lys Thr
            325                 330                 335

Ile Ser Lys Ala Lys Gly Gln Pro Arg Glu Pro Gln Val Tyr Thr Leu
            340                 345                 350

Pro Pro Ser Arg Asp Glu Leu Thr Lys Asn Gln Val Ser Leu Thr Cys
            355                 360                 365

Leu Val Lys Gly Phe Tyr Pro Ser Asp Ile Ala Val Glu Trp Glu Ser
            370                 375                 380

Asn Gly Gln Pro Glu Asn Asn Tyr Lys Thr Thr Pro Pro Val Leu Asp
385                 390                 395                 400

Ser Asp Gly Ser Phe Phe Leu Tyr Ser Lys Leu Thr Val Asp Lys Ser
            405                 410                 415

Arg Trp Gln Gln Gly Asn Val Phe Ser Cys Ser Val Met His Glu Ala
            420                 425                 430

Leu His Asn His Tyr Thr Gln Lys Ser Leu Ser Leu Ser Pro Gly
            435                 440                 445
```

<210> SEQ ID NO 12
<211> LENGTH: 447
<212> TYPE: PRT
<213> ORGANISM: Artificial Sequence
<220> FEATURE:
<223> OTHER INFORMATION: S31H variant of ipilimumab HC

<400> SEQUENCE: 12

Gln Val Gln Leu Val Glu Ser Gly Gly Gly Val Val Gln Pro Gly Arg

-continued

```
  1               5                   10                  15
Ser Leu Arg Leu Ser Cys Ala Ala Ser Gly Phe Thr Phe Ser His Tyr
                20                  25                  30

Thr Met His Trp Val Arg Gln Ala Pro Gly Lys Gly Leu Glu Trp Val
                35                  40                  45

Thr Phe Ile Ser Tyr Asp Gly Asn Asn Lys Tyr Tyr Ala Asp Ser Val
                50                  55                  60

Lys Gly Arg Phe Thr Ile Ser Arg Asp Asn Ser Lys Asn Thr Leu Tyr
 65                 70                  75                  80

Leu Gln Met Asn Ser Leu Arg Ala Glu Asp Thr Ala Ile Tyr Tyr Cys
                85                  90                  95

Ala Arg Thr Gly Trp Leu Gly Pro Phe Asp Tyr Trp Gly Gln Gly Thr
                100                 105                 110

Leu Val Thr Val Ser Ser Ala Ser Thr Lys Gly Pro Ser Val Phe Pro
                115                 120                 125

Leu Ala Pro Ser Ser Lys Ser Thr Ser Gly Gly Thr Ala Ala Leu Gly
                130                 135                 140

Cys Leu Val Lys Asp Tyr Phe Pro Glu Pro Val Thr Val Ser Trp Asn
145                 150                 155                 160

Ser Gly Ala Leu Thr Ser Gly Val His Thr Phe Pro Ala Val Leu Gln
                165                 170                 175

Ser Ser Gly Leu Tyr Ser Leu Ser Ser Val Val Thr Val Pro Ser Ser
                180                 185                 190

Ser Leu Gly Thr Gln Thr Tyr Ile Cys Asn Val Asn His Lys Pro Ser
                195                 200                 205

Asn Thr Lys Val Asp Lys Arg Val Glu Pro Lys Ser Cys Asp Lys Thr
210                 215                 220

His Thr Cys Pro Pro Cys Pro Ala Pro Glu Leu Leu Gly Gly Pro Ser
225                 230                 235                 240

Val Phe Leu Phe Pro Pro Lys Pro Lys Asp Thr Leu Met Ile Ser Arg
                245                 250                 255

Thr Pro Glu Val Thr Cys Val Val Val Asp Val Ser His Glu Asp Pro
                260                 265                 270

Glu Val Lys Phe Asn Trp Tyr Val Asp Gly Val Glu Val His Asn Ala
                275                 280                 285

Lys Thr Lys Pro Arg Glu Glu Gln Tyr Asn Ser Thr Tyr Arg Val Val
                290                 295                 300

Ser Val Leu Thr Val Leu His Gln Asp Trp Leu Asn Gly Lys Glu Tyr
305                 310                 315                 320

Lys Cys Lys Val Ser Asn Lys Ala Leu Pro Ala Pro Ile Glu Lys Thr
                325                 330                 335

Ile Ser Lys Ala Lys Gly Gln Pro Arg Glu Pro Gln Val Tyr Thr Leu
                340                 345                 350

Pro Pro Ser Arg Asp Glu Leu Thr Lys Asn Gln Val Ser Leu Thr Cys
                355                 360                 365

Leu Val Lys Gly Phe Tyr Pro Ser Asp Ile Ala Val Glu Trp Glu Ser
                370                 375                 380

Asn Gly Gln Pro Glu Asn Asn Tyr Lys Thr Thr Pro Pro Val Leu Asp
385                 390                 395                 400

Ser Asp Gly Ser Phe Phe Leu Tyr Ser Lys Leu Thr Val Asp Lys Ser
                405                 410                 415

Arg Trp Gln Gln Gly Asn Val Phe Ser Cys Ser Val Met His Glu Ala
                420                 425                 430
```

Leu His Asn His Tyr Thr Gln Lys Ser Leu Ser Leu Ser Pro Gly
        435                 440                 445

<210> SEQ ID NO 13
<211> LENGTH: 447
<212> TYPE: PRT
<213> ORGANISM: Artificial Sequence
<220> FEATURE:
<223> OTHER INFORMATION: S31H / N56H variant of ipilimumab HC

<400> SEQUENCE: 13

Gln Val Gln Leu Val Glu Ser Gly Gly Val Val Gln Pro Gly Arg
1               5                   10                  15

Ser Leu Arg Leu Ser Cys Ala Ala Ser Gly Phe Thr Phe Ser His Tyr
            20                  25                  30

Thr Met His Trp Val Arg Gln Ala Pro Gly Lys Gly Leu Glu Trp Val
        35                  40                  45

Thr Phe Ile Ser Tyr Asp Gly His Asn Lys Tyr Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Ile Tyr Tyr Cys
                85                  90                  95

Ala Arg Thr Gly Trp Leu Gly Pro Phe Asp Tyr Trp Gly Gln Gly Thr
            100                 105                 110

Leu Val Thr Val Ser Ser Ala Ser Thr Lys Gly Pro Ser Val Phe Pro
        115                 120                 125

Leu Ala Pro Ser Ser Lys Ser Thr Ser Gly Gly Thr Ala Ala Leu Gly
    130                 135                 140

Cys Leu Val Lys Asp Tyr Phe Pro Glu Pro Val Thr Val Ser Trp Asn
145                 150                 155                 160

Ser Gly Ala Leu Thr Ser Gly Val His Thr Phe Pro Ala Val Leu Gln
                165                 170                 175

Ser Ser Gly Leu Tyr Ser Leu Ser Ser Val Val Thr Val Pro Ser Ser
            180                 185                 190

Ser Leu Gly Thr Gln Thr Tyr Ile Cys Asn Val Asn His Lys Pro Ser
        195                 200                 205

Asn Thr Lys Val Asp Lys Arg Val Glu Pro Lys Ser Cys Asp Lys Thr
    210                 215                 220

His Thr Cys Pro Pro Cys Pro Ala Pro Glu Leu Leu Gly Gly Pro Ser
225                 230                 235                 240

Val Phe Leu Phe Pro Pro Lys Pro Lys Asp Thr Leu Met Ile Ser Arg
                245                 250                 255

Thr Pro Glu Val Thr Cys Val Val Val Asp Val Ser His Glu Asp Pro
            260                 265                 270

Glu Val Lys Phe Asn Trp Tyr Val Asp Gly Val Glu Val His Asn Ala
        275                 280                 285

Lys Thr Lys Pro Arg Glu Glu Gln Tyr Asn Ser Thr Tyr Arg Val Val
    290                 295                 300

Ser Val Leu Thr Val Leu His Gln Asp Trp Leu Asn Gly Lys Glu Tyr
305                 310                 315                 320

Lys Cys Lys Val Ser Asn Lys Ala Leu Pro Ala Pro Ile Glu Lys Thr
                325                 330                 335

Ile Ser Lys Ala Lys Gly Gln Pro Arg Glu Pro Gln Val Tyr Thr Leu
            340                 345                 350

```
Pro Pro Ser Arg Asp Glu Leu Thr Lys Asn Gln Val Ser Leu Thr Cys
            355                 360                 365

Leu Val Lys Gly Phe Tyr Pro Ser Asp Ile Ala Val Glu Trp Glu Ser
        370                 375                 380

Asn Gly Gln Pro Glu Asn Asn Tyr Lys Thr Thr Pro Pro Val Leu Asp
385                 390                 395                 400

Ser Asp Gly Ser Phe Phe Leu Tyr Ser Lys Leu Thr Val Asp Lys Ser
                405                 410                 415

Arg Trp Gln Gln Gly Asn Val Phe Ser Cys Ser Val Met His Glu Ala
            420                 425                 430

Leu His Asn His Tyr Thr Gln Lys Ser Leu Ser Leu Ser Pro Gly
        435                 440                 445

<210> SEQ ID NO 14
<211> LENGTH: 447
<212> TYPE: PRT
<213> ORGANISM: Artificial Sequence
<220> FEATURE:
<223> OTHER INFORMATION: S31H / N56H / T99H variant of ipilimumab HC

<400> SEQUENCE: 14

Gln Val Gln Leu Val Glu Ser Gly Gly Gly Val Val Gln Pro Gly Arg
1               5                   10                  15

Ser Leu Arg Leu Ser Cys Ala Ala Ser Gly Phe Thr Phe Ser His Tyr
            20                  25                  30

Thr Met His Trp Val Arg Gln Ala Pro Gly Lys Gly Leu Glu Trp Val
        35                  40                  45

Thr Phe Ile Ser Tyr Asp Gly His Asn Lys Tyr Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Ile Tyr Tyr Cys
                85                  90                  95

Ala Arg His Gly Trp Leu Gly Pro Phe Asp Tyr Trp Gly Gln Gly Thr
            100                 105                 110

Leu Val Thr Val Ser Ser Ala Ser Thr Lys Gly Pro Ser Val Phe Pro
        115                 120                 125

Leu Ala Pro Ser Ser Lys Ser Thr Ser Gly Gly Thr Ala Ala Leu Gly
    130                 135                 140

Cys Leu Val Lys Asp Tyr Phe Pro Glu Pro Val Thr Val Ser Trp Asn
145                 150                 155                 160

Ser Gly Ala Leu Thr Ser Gly Val His Thr Phe Pro Ala Val Leu Gln
                165                 170                 175

Ser Ser Gly Leu Tyr Ser Leu Ser Val Val Thr Val Pro Ser Ser
            180                 185                 190

Ser Leu Gly Thr Gln Thr Tyr Ile Cys Asn Val Asn His Lys Pro Ser
        195                 200                 205

Asn Thr Lys Val Asp Lys Arg Val Glu Pro Lys Ser Cys Asp Lys Thr
    210                 215                 220

His Thr Cys Pro Pro Cys Pro Ala Pro Glu Leu Leu Gly Gly Pro Ser
225                 230                 235                 240

Val Phe Leu Phe Pro Pro Lys Pro Lys Asp Thr Leu Met Ile Ser Arg
                245                 250                 255

Thr Pro Glu Val Thr Cys Val Val Val Asp Val Ser His Glu Asp Pro
            260                 265                 270
```

```
Glu Val Lys Phe Asn Trp Tyr Val Asp Gly Val Glu Val His Asn Ala
            275                 280                 285

Lys Thr Lys Pro Arg Glu Glu Gln Tyr Asn Ser Thr Tyr Arg Val Val
    290                 295                 300

Ser Val Leu Thr Val Leu His Gln Asp Trp Leu Asn Gly Lys Glu Tyr
305                 310                 315                 320

Lys Cys Lys Val Ser Asn Lys Ala Leu Pro Ala Pro Ile Glu Lys Thr
                325                 330                 335

Ile Ser Lys Ala Lys Gly Gln Pro Arg Glu Pro Gln Val Tyr Thr Leu
                340                 345                 350

Pro Pro Ser Arg Asp Glu Leu Thr Lys Asn Gln Val Ser Leu Thr Cys
                355                 360                 365

Leu Val Lys Gly Phe Tyr Pro Ser Asp Ile Ala Val Glu Trp Glu Ser
            370                 375                 380

Asn Gly Gln Pro Glu Asn Asn Tyr Lys Thr Thr Pro Pro Val Leu Asp
385                 390                 395                 400

Ser Asp Gly Ser Phe Phe Leu Tyr Ser Lys Leu Thr Val Asp Lys Ser
                405                 410                 415

Arg Trp Gln Gln Gly Asn Val Phe Ser Cys Ser Val Met His Glu Ala
                420                 425                 430

Leu His Asn His Tyr Thr Gln Lys Ser Leu Ser Leu Ser Pro Gly
            435                 440                 445

<210> SEQ ID NO 15
<211> LENGTH: 447
<212> TYPE: PRT
<213> ORGANISM: Artificial Sequence
<220> FEATURE:
<223> OTHER INFORMATION: T33H variant of ipilimumab HC

<400> SEQUENCE: 15

Gln Val Gln Leu Val Glu Ser Gly Gly Gly Val Val Gln Pro Gly Arg
1               5                   10                  15

Ser Leu Arg Leu Ser Cys Ala Ala Ser Gly Phe Thr Phe Ser Ser Tyr
            20                  25                  30

His Met His Trp Val Arg Gln Ala Pro Gly Lys Gly Leu Glu Trp Val
        35                  40                  45

Thr Phe Ile Ser Tyr Asp Gly Asn Asn Lys Tyr Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Ile Tyr Tyr Cys
                85                  90                  95

Ala Arg Thr Gly Trp Leu Gly Pro Phe Asp Tyr Trp Gly Gln Gly Thr
                100                 105                 110

Leu Val Thr Val Ser Ser Ala Ser Thr Lys Gly Pro Ser Val Phe Pro
            115                 120                 125

Leu Ala Pro Ser Ser Lys Ser Thr Ser Gly Gly Thr Ala Ala Leu Gly
        130                 135                 140

Cys Leu Val Lys Asp Tyr Phe Pro Glu Pro Val Thr Val Ser Trp Asn
145                 150                 155                 160

Ser Gly Ala Leu Thr Ser Gly Val His Thr Phe Pro Ala Val Leu Gln
                165                 170                 175

Ser Ser Gly Leu Tyr Ser Leu Ser Ser Val Val Thr Val Pro Ser Ser
            180                 185                 190
```

Ser Leu Gly Thr Gln Thr Tyr Ile Cys Asn Val Asn His Lys Pro Ser
            195                 200                 205

Asn Thr Lys Val Asp Lys Arg Val Glu Pro Lys Ser Cys Asp Lys Thr
210                 215                 220

His Thr Cys Pro Pro Cys Pro Ala Pro Glu Leu Leu Gly Gly Pro Ser
225                 230                 235                 240

Val Phe Leu Phe Pro Pro Lys Pro Lys Asp Thr Leu Met Ile Ser Arg
                245                 250                 255

Thr Pro Glu Val Thr Cys Val Val Val Asp Val Ser His Glu Asp Pro
            260                 265                 270

Glu Val Lys Phe Asn Trp Tyr Val Asp Gly Val Glu Val His Asn Ala
        275                 280                 285

Lys Thr Lys Pro Arg Glu Glu Gln Tyr Asn Ser Thr Tyr Arg Val Val
290                 295                 300

Ser Val Leu Thr Val Leu His Gln Asp Trp Leu Asn Gly Lys Glu Tyr
305                 310                 315                 320

Lys Cys Lys Val Ser Asn Lys Ala Leu Pro Ala Pro Ile Glu Lys Thr
                325                 330                 335

Ile Ser Lys Ala Lys Gly Gln Pro Arg Glu Pro Gln Val Tyr Thr Leu
            340                 345                 350

Pro Pro Ser Arg Asp Glu Leu Thr Lys Asn Gln Val Ser Leu Thr Cys
        355                 360                 365

Leu Val Lys Gly Phe Tyr Pro Ser Asp Ile Ala Val Glu Trp Glu Ser
370                 375                 380

Asn Gly Gln Pro Glu Asn Tyr Lys Thr Thr Pro Pro Val Leu Asp
385                 390                 395                 400

Ser Asp Gly Ser Phe Phe Leu Tyr Ser Lys Leu Thr Val Asp Lys Ser
                405                 410                 415

Arg Trp Gln Gln Gly Asn Val Phe Ser Cys Ser Val Met His Glu Ala
            420                 425                 430

Leu His Asn His Tyr Thr Gln Lys Ser Leu Ser Leu Ser Pro Gly
        435                 440                 445

<210> SEQ ID NO 16
<211> LENGTH: 447
<212> TYPE: PRT
<213> ORGANISM: Artificial Sequence
<220> FEATURE:
<223> OTHER INFORMATION: N57H variant of ipilimumab HC

<400> SEQUENCE: 16

Gln Val Gln Leu Val Glu Ser Gly Gly Gly Val Val Gln Pro Gly Arg
1               5                   10                  15

Ser Leu Arg Leu Ser Cys Ala Ala Ser Gly Phe Thr Phe Ser Ser Tyr
            20                  25                  30

Thr Met His Trp Val Arg Gln Ala Pro Gly Lys Gly Leu Glu Trp Val
        35                  40                  45

Thr Phe Ile Ser Tyr Asp Gly Asn His Lys Tyr Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Ile Tyr Tyr Cys
                85                  90                  95

Ala Arg Thr Gly Trp Leu Gly Pro Phe Asp Tyr Trp Gly Gln Gly Thr
            100                 105                 110

```
Leu Val Thr Val Ser Ser Ala Ser Thr Lys Gly Pro Ser Val Phe Pro
            115                 120                 125

Leu Ala Pro Ser Ser Lys Ser Thr Ser Gly Gly Thr Ala Ala Leu Gly
            130                 135                 140

Cys Leu Val Lys Asp Tyr Phe Pro Glu Pro Val Thr Val Ser Trp Asn
145                 150                 155                 160

Ser Gly Ala Leu Thr Ser Gly Val His Thr Phe Pro Ala Val Leu Gln
                165                 170                 175

Ser Ser Gly Leu Tyr Ser Leu Ser Ser Val Val Thr Val Pro Ser Ser
                180                 185                 190

Ser Leu Gly Thr Gln Thr Tyr Ile Cys Asn Val Asn His Lys Pro Ser
                195                 200                 205

Asn Thr Lys Val Asp Lys Arg Val Glu Pro Lys Ser Cys Asp Lys Thr
            210                 215                 220

His Thr Cys Pro Pro Cys Pro Ala Pro Glu Leu Leu Gly Gly Pro Ser
225                 230                 235                 240

Val Phe Leu Phe Pro Pro Lys Pro Lys Asp Thr Leu Met Ile Ser Arg
                245                 250                 255

Thr Pro Glu Val Thr Cys Val Val Val Asp Val Ser His Glu Asp Pro
            260                 265                 270

Glu Val Lys Phe Asn Trp Tyr Val Asp Gly Val Glu Val His Asn Ala
            275                 280                 285

Lys Thr Lys Pro Arg Glu Glu Gln Tyr Asn Ser Thr Tyr Arg Val Val
            290                 295                 300

Ser Val Leu Thr Val Leu His Gln Asp Trp Leu Asn Gly Lys Glu Tyr
305                 310                 315                 320

Lys Cys Lys Val Ser Asn Lys Ala Leu Pro Ala Pro Ile Glu Lys Thr
                325                 330                 335

Ile Ser Lys Ala Lys Gly Gln Pro Arg Glu Pro Gln Val Tyr Thr Leu
                340                 345                 350

Pro Pro Ser Arg Asp Glu Leu Thr Lys Asn Gln Val Ser Leu Thr Cys
            355                 360                 365

Leu Val Lys Gly Phe Tyr Pro Ser Asp Ile Ala Val Glu Trp Glu Ser
            370                 375                 380

Asn Gly Gln Pro Glu Asn Asn Tyr Lys Thr Thr Pro Pro Val Leu Asp
385                 390                 395                 400

Ser Asp Gly Ser Phe Phe Leu Tyr Ser Lys Leu Thr Val Asp Lys Ser
                405                 410                 415

Arg Trp Gln Gln Gly Asn Val Phe Ser Cys Ser Val Met His Glu Ala
                420                 425                 430

Leu His Asn His Tyr Thr Gln Lys Ser Leu Ser Leu Ser Pro Gly
            435                 440                 445

<210> SEQ ID NO 17
<211> LENGTH: 447
<212> TYPE: PRT
<213> ORGANISM: Artificial Sequence
<220> FEATURE:
<223> OTHER INFORMATION: T99H variant of ipilimumab HC

<400> SEQUENCE: 17

Gln Val Gln Leu Val Glu Ser Gly Gly Gly Val Val Gln Pro Gly Arg
1               5                   10                  15

Ser Leu Arg Leu Ser Cys Ala Ala Ser Gly Phe Thr Phe Ser Ser Tyr
                20                  25                  30
```

```
Thr Met His Trp Val Arg Gln Ala Pro Gly Lys Gly Leu Glu Trp Val
         35                  40                  45

Thr Phe Ile Ser Tyr Asp Gly Asn Asn Lys Tyr Tyr Ala Asp Ser Val
         50                  55                  60

Lys Gly Arg Phe Thr Ile Ser Arg Asp Asn Ser Lys Asn Thr Leu Tyr
 65                  70                  75                  80

Leu Gln Met Asn Ser Leu Arg Ala Glu Asp Thr Ala Ile Tyr Tyr Cys
                 85                  90                  95

Ala Arg His Gly Trp Leu Gly Pro Phe Asp Tyr Trp Gly Gln Gly Thr
                 100                 105                 110

Leu Val Thr Val Ser Ser Ala Ser Thr Lys Gly Pro Ser Val Phe Pro
         115                 120                 125

Leu Ala Pro Ser Ser Lys Ser Thr Ser Gly Gly Thr Ala Ala Leu Gly
         130                 135                 140

Cys Leu Val Lys Asp Tyr Phe Pro Glu Pro Val Thr Val Ser Trp Asn
145                 150                 155                 160

Ser Gly Ala Leu Thr Ser Gly Val His Thr Phe Pro Ala Val Leu Gln
                 165                 170                 175

Ser Ser Gly Leu Tyr Ser Leu Ser Val Val Thr Val Pro Ser Ser
                 180                 185                 190

Ser Leu Gly Thr Gln Thr Tyr Ile Cys Asn Val Asn His Lys Pro Ser
         195                 200                 205

Asn Thr Lys Val Asp Lys Arg Val Glu Pro Lys Ser Cys Asp Lys Thr
         210                 215                 220

His Thr Cys Pro Pro Cys Pro Ala Pro Glu Leu Leu Gly Gly Pro Ser
225                 230                 235                 240

Val Phe Leu Phe Pro Pro Lys Pro Lys Asp Thr Leu Met Ile Ser Arg
                 245                 250                 255

Thr Pro Glu Val Thr Cys Val Val Val Asp Val Ser His Glu Asp Pro
         260                 265                 270

Glu Val Lys Phe Asn Trp Tyr Val Asp Gly Val Glu Val His Asn Ala
         275                 280                 285

Lys Thr Lys Pro Arg Glu Glu Gln Tyr Asn Ser Thr Tyr Arg Val Val
290                 295                 300

Ser Val Leu Thr Val Leu His Gln Asp Trp Leu Asn Gly Lys Glu Tyr
305                 310                 315                 320

Lys Cys Lys Val Ser Asn Lys Ala Leu Pro Ala Pro Ile Glu Lys Thr
                 325                 330                 335

Ile Ser Lys Ala Lys Gly Gln Pro Arg Glu Pro Gln Val Tyr Thr Leu
                 340                 345                 350

Pro Pro Ser Arg Asp Glu Leu Thr Lys Asn Gln Val Ser Leu Thr Cys
         355                 360                 365

Leu Val Lys Gly Phe Tyr Pro Ser Asp Ile Ala Val Glu Trp Glu Ser
370                 375                 380

Asn Gly Gln Pro Glu Asn Asn Tyr Lys Thr Thr Pro Pro Val Leu Asp
385                 390                 395                 400

Ser Asp Gly Ser Phe Phe Leu Tyr Ser Lys Leu Thr Val Asp Lys Ser
                 405                 410                 415

Arg Trp Gln Gln Gly Asn Val Phe Ser Cys Ser Val Met His Glu Ala
                 420                 425                 430

Leu His Asn His Tyr Thr Gln Lys Ser Leu Ser Leu Ser Pro Gly
         435                 440                 445
```

<210> SEQ ID NO 18
<211> LENGTH: 447
<212> TYPE: PRT
<213> ORGANISM: Artificial Sequence
<220> FEATURE:
<223> OTHER INFORMATION: T33H / N57H variant of ipilimumab HC

<400> SEQUENCE: 18

```
Gln Val Gln Leu Val Glu Ser Gly Gly Gly Val Val Gln Pro Gly Arg
1               5                   10                  15

Ser Leu Arg Leu Ser Cys Ala Ala Ser Gly Phe Thr Phe Ser Ser Tyr
            20                  25                  30

His Met His Trp Val Arg Gln Ala Pro Gly Lys Gly Leu Glu Trp Val
        35                  40                  45

Thr Phe Ile Ser Tyr Asp Gly Asn His Lys Tyr Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Ile Tyr Tyr Cys
                85                  90                  95

Ala Arg Thr Gly Trp Leu Gly Pro Phe Asp Tyr Trp Gly Gln Gly Thr
            100                 105                 110

Leu Val Thr Val Ser Ser Ala Ser Thr Lys Gly Pro Ser Val Phe Pro
        115                 120                 125

Leu Ala Pro Ser Ser Lys Ser Thr Ser Gly Gly Thr Ala Ala Leu Gly
    130                 135                 140

Cys Leu Val Lys Asp Tyr Phe Pro Glu Pro Val Thr Val Ser Trp Asn
145                 150                 155                 160

Ser Gly Ala Leu Thr Ser Gly Val His Thr Phe Pro Ala Val Leu Gln
                165                 170                 175

Ser Ser Gly Leu Tyr Ser Leu Ser Ser Val Val Thr Val Pro Ser Ser
            180                 185                 190

Ser Leu Gly Thr Gln Thr Tyr Ile Cys Asn Val Asn His Lys Pro Ser
        195                 200                 205

Asn Thr Lys Val Asp Lys Arg Val Glu Pro Lys Ser Cys Asp Lys Thr
    210                 215                 220

His Thr Cys Pro Pro Cys Pro Ala Pro Glu Leu Leu Gly Gly Pro Ser
225                 230                 235                 240

Val Phe Leu Phe Pro Pro Lys Pro Lys Asp Thr Leu Met Ile Ser Arg
                245                 250                 255

Thr Pro Glu Val Thr Cys Val Val Val Asp Val Ser His Glu Asp Pro
            260                 265                 270

Glu Val Lys Phe Asn Trp Tyr Val Asp Gly Val Glu Val His Asn Ala
        275                 280                 285

Lys Thr Lys Pro Arg Glu Glu Gln Tyr Asn Ser Thr Tyr Arg Val Val
    290                 295                 300

Ser Val Leu Thr Val Leu His Gln Asp Trp Leu Asn Gly Lys Glu Tyr
305                 310                 315                 320

Lys Cys Lys Val Ser Asn Lys Ala Leu Pro Ala Pro Ile Glu Lys Thr
                325                 330                 335

Ile Ser Lys Ala Lys Gly Gln Pro Arg Glu Pro Gln Val Tyr Thr Leu
            340                 345                 350

Pro Pro Ser Arg Asp Glu Leu Thr Lys Asn Gln Val Ser Leu Thr Cys
        355                 360                 365
```

Leu Val Lys Gly Phe Tyr Pro Ser Asp Ile Ala Val Glu Trp Glu Ser
370                 375                 380

Asn Gly Gln Pro Glu Asn Asn Tyr Lys Thr Thr Pro Pro Val Leu Asp
385                 390                 395                 400

Ser Asp Gly Ser Phe Phe Leu Tyr Ser Lys Leu Thr Val Asp Lys Ser
            405                 410                 415

Arg Trp Gln Gln Gly Asn Val Phe Ser Cys Ser Val Met His Glu Ala
            420                 425                 430

Leu His Asn His Tyr Thr Gln Lys Ser Leu Ser Leu Ser Pro Gly
            435                 440                 445

<210> SEQ ID NO 19
<211> LENGTH: 447
<212> TYPE: PRT
<213> ORGANISM: Artificial Sequence
<220> FEATURE:
<223> OTHER INFORMATION: N56H variant of ipilimumab HC

<400> SEQUENCE: 19

Gln Val Gln Leu Val Glu Ser Gly Gly Gly Val Val Gln Pro Gly Arg
1               5                   10                  15

Ser Leu Arg Leu Ser Cys Ala Ala Ser Gly Phe Thr Phe Ser Ser Tyr
            20                  25                  30

Thr Met His Trp Val Arg Gln Ala Pro Gly Lys Gly Leu Glu Trp Val
            35                  40                  45

Thr Phe Ile Ser Tyr Asp Gly His Asn Lys Tyr Tyr Ala Asp Ser Val
        50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Ile Tyr Tyr Cys
                85                  90                  95

Ala Arg Thr Gly Trp Leu Gly Pro Phe Asp Tyr Trp Gly Gln Gly Thr
            100                 105                 110

Leu Val Thr Val Ser Ser Ala Ser Thr Lys Gly Pro Ser Val Phe Pro
            115                 120                 125

Leu Ala Pro Ser Ser Lys Ser Thr Ser Gly Gly Thr Ala Ala Leu Gly
        130                 135                 140

Cys Leu Val Lys Asp Tyr Phe Pro Glu Pro Val Thr Val Ser Trp Asn
145                 150                 155                 160

Ser Gly Ala Leu Thr Ser Gly Val His Thr Phe Pro Ala Val Leu Gln
                165                 170                 175

Ser Ser Gly Leu Tyr Ser Leu Ser Ser Val Val Thr Val Pro Ser Ser
            180                 185                 190

Ser Leu Gly Thr Gln Thr Tyr Ile Cys Asn Val Asn His Lys Pro Ser
            195                 200                 205

Asn Thr Lys Val Asp Lys Arg Val Glu Pro Lys Ser Cys Asp Lys Thr
        210                 215                 220

His Thr Cys Pro Pro Cys Pro Ala Pro Glu Leu Leu Gly Gly Pro Ser
225                 230                 235                 240

Val Phe Leu Phe Pro Pro Lys Pro Lys Asp Thr Leu Met Ile Ser Arg
                245                 250                 255

Thr Pro Glu Val Thr Cys Val Val Val Asp Val Ser His Glu Asp Pro
            260                 265                 270

Glu Val Lys Phe Asn Trp Tyr Val Asp Gly Val Glu Val His Asn Ala
            275                 280                 285

```
Lys Thr Lys Pro Arg Glu Glu Gln Tyr Asn Ser Thr Tyr Arg Val Val
    290                 295                 300

Ser Val Leu Thr Val Leu His Gln Asp Trp Leu Asn Gly Lys Glu Tyr
305                 310                 315                 320

Lys Cys Lys Val Ser Asn Lys Ala Leu Pro Ala Pro Ile Glu Lys Thr
                325                 330                 335

Ile Ser Lys Ala Lys Gly Gln Pro Arg Glu Pro Gln Val Tyr Thr Leu
            340                 345                 350

Pro Pro Ser Arg Asp Glu Leu Thr Lys Asn Gln Val Ser Leu Thr Cys
        355                 360                 365

Leu Val Lys Gly Phe Tyr Pro Ser Asp Ile Ala Val Glu Trp Glu Ser
370                 375                 380

Asn Gly Gln Pro Glu Asn Asn Tyr Lys Thr Thr Pro Pro Val Leu Asp
385                 390                 395                 400

Ser Asp Gly Ser Phe Phe Leu Tyr Ser Lys Leu Thr Val Asp Lys Ser
                405                 410                 415

Arg Trp Gln Gln Gly Asn Val Phe Ser Cys Ser Val Met His Glu Ala
            420                 425                 430

Leu His Asn His Tyr Thr Gln Lys Ser Leu Ser Leu Ser Pro Gly
        435                 440                 445

<210> SEQ ID NO 20
<211> LENGTH: 447
<212> TYPE: PRT
<213> ORGANISM: Artificial Sequence
<220> FEATURE:
<223> OTHER INFORMATION: S31H / T99H variant of ipilimumab HC

<400> SEQUENCE: 20

Gln Val Gln Leu Val Glu Ser Gly Gly Gly Val Val Gln Pro Gly Arg
1               5                   10                  15

Ser Leu Arg Leu Ser Cys Ala Ala Ser Gly Phe Thr Phe Ser His Tyr
            20                  25                  30

Thr Met His Trp Val Arg Gln Ala Pro Gly Lys Gly Leu Glu Trp Val
        35                  40                  45

Thr Phe Ile Ser Tyr Asp Gly Asn Asn Lys Tyr Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Ile Tyr Tyr Cys
                85                  90                  95

Ala Arg His Gly Trp Leu Gly Pro Phe Asp Tyr Trp Gly Gln Gly Thr
            100                 105                 110

Leu Val Thr Val Ser Ser Ala Ser Thr Lys Gly Pro Ser Val Phe Pro
        115                 120                 125

Leu Ala Pro Ser Ser Lys Ser Thr Ser Gly Gly Thr Ala Ala Leu Gly
    130                 135                 140

Cys Leu Val Lys Asp Tyr Phe Pro Glu Pro Val Thr Val Ser Trp Asn
145                 150                 155                 160

Ser Gly Ala Leu Thr Ser Gly Val His Thr Phe Pro Ala Val Leu Gln
                165                 170                 175

Ser Ser Gly Leu Tyr Ser Leu Ser Ser Val Val Thr Val Pro Ser Ser
            180                 185                 190

Ser Leu Gly Thr Gln Thr Tyr Ile Cys Asn Val Asn His Lys Pro Ser
        195                 200                 205
```

```
Asn Thr Lys Val Asp Lys Arg Val Glu Pro Lys Ser Cys Asp Lys Thr
            210                 215                 220
His Thr Cys Pro Pro Cys Pro Ala Pro Glu Leu Leu Gly Gly Pro Ser
225                 230                 235                 240
Val Phe Leu Phe Pro Pro Lys Pro Lys Asp Thr Leu Met Ile Ser Arg
                245                 250                 255
Thr Pro Glu Val Thr Cys Val Val Val Asp Val Ser His Glu Asp Pro
            260                 265                 270
Glu Val Lys Phe Asn Trp Tyr Val Asp Gly Val Glu Val His Asn Ala
        275                 280                 285
Lys Thr Lys Pro Arg Glu Glu Gln Tyr Asn Ser Thr Tyr Arg Val Val
290                 295                 300
Ser Val Leu Thr Val Leu His Gln Asp Trp Leu Asn Gly Lys Glu Tyr
305                 310                 315                 320
Lys Cys Lys Val Ser Asn Lys Ala Leu Pro Ala Pro Ile Glu Lys Thr
                325                 330                 335
Ile Ser Lys Ala Lys Gly Gln Pro Arg Glu Pro Gln Val Tyr Thr Leu
            340                 345                 350
Pro Pro Ser Arg Asp Glu Leu Thr Lys Asn Gln Val Ser Leu Thr Cys
        355                 360                 365
Leu Val Lys Gly Phe Tyr Pro Ser Asp Ile Ala Val Glu Trp Glu Ser
370                 375                 380
Asn Gly Gln Pro Glu Asn Asn Tyr Lys Thr Thr Pro Pro Val Leu Asp
385                 390                 395                 400
Ser Asp Gly Ser Phe Phe Leu Tyr Ser Lys Leu Thr Val Asp Lys Ser
                405                 410                 415
Arg Trp Gln Gln Gly Asn Val Phe Ser Cys Ser Val Met His Glu Ala
            420                 425                 430
Leu His Asn His Tyr Thr Gln Lys Ser Leu Ser Leu Ser Pro Gly
        435                 440                 445

<210> SEQ ID NO 21
<211> LENGTH: 215
<212> TYPE: PRT
<213> ORGANISM: Homo sapiens

<400> SEQUENCE: 21

Glu Ile Val Leu Thr Gln Ser Pro Gly Thr Leu Ser Leu Ser Pro Gly
1               5                   10                  15
Glu Arg Ala Thr Leu Ser Cys Arg Ala Ser Gln Ser Val Gly Ser Ser
            20                  25                  30
Tyr Leu Ala Trp Tyr Gln Gln Lys Pro Gly Gln Ala Pro Arg Leu Leu
        35                  40                  45
Ile Tyr Gly Ala Phe Ser Arg Ala Thr Gly Ile Pro Asp Arg Phe Ser
    50                  55                  60
Gly Ser Gly Ser Gly Thr Asp Phe Thr Leu Thr Ile Ser Arg Leu Glu
65                  70                  75                  80
Pro Glu Asp Phe Ala Val Tyr Tyr Cys Gln Gln Tyr Gly Ser Ser Pro
                85                  90                  95
Trp Thr Phe Gly Gln Gly Thr Lys Val Glu Ile Lys Arg Thr Val Ala
            100                 105                 110
Ala Pro Ser Val Phe Ile Phe Pro Pro Ser Asp Glu Gln Leu Lys Ser
        115                 120                 125
Gly Thr Ala Ser Val Val Cys Leu Leu Asn Asn Phe Tyr Pro Arg Glu
    130                 135                 140
```

Ala Lys Val Gln Trp Lys Val Asp Asn Ala Leu Gln Ser Gly Asn Ser
145                 150                 155                 160

Gln Glu Ser Val Thr Glu Gln Asp Ser Lys Asp Ser Thr Tyr Ser Leu
            165                 170                 175

Ser Ser Thr Leu Thr Leu Ser Lys Ala Asp Tyr Glu Lys His Lys Val
        180                 185                 190

Tyr Ala Cys Glu Val Thr His Gln Gly Leu Ser Ser Pro Val Thr Lys
    195                 200                 205

Ser Phe Asn Arg Gly Glu Cys
    210                 215

<210> SEQ ID NO 22
<211> LENGTH: 215
<212> TYPE: PRT
<213> ORGANISM: Artificial Sequence
<220> FEATURE:
<223> OTHER INFORMATION: S28E / S31D variant of ipilimumab LC

<400> SEQUENCE: 22

Glu Ile Val Leu Thr Gln Ser Pro Gly Thr Leu Ser Leu Ser Pro Gly
1               5                   10                  15

Glu Arg Ala Thr Leu Ser Cys Arg Ala Ser Gln Glu Val Gly Asp Ser
            20                  25                  30

Tyr Leu Ala Trp Tyr Gln Gln Lys Pro Gly Gln Ala Pro Arg Leu Leu
        35                  40                  45

Ile Tyr Gly Ala Phe Ser Arg Ala Thr Gly Ile Pro Asp Arg Phe Ser
    50                  55                  60

Gly Ser Gly Ser Gly Thr Asp Phe Thr Leu Thr Ile Ser Arg Leu Glu
65                  70                  75                  80

Pro Glu Asp Phe Ala Val Tyr Tyr Cys Gln Gln Tyr Gly Ser Ser Pro
                85                  90                  95

Trp Thr Phe Gly Gln Gly Thr Lys Val Glu Ile Lys Arg Thr Val Ala
            100                 105                 110

Ala Pro Ser Val Phe Ile Phe Pro Pro Ser Asp Glu Gln Leu Lys Ser
        115                 120                 125

Gly Thr Ala Ser Val Val Cys Leu Leu Asn Asn Phe Tyr Pro Arg Glu
    130                 135                 140

Ala Lys Val Gln Trp Lys Val Asp Asn Ala Leu Gln Ser Gly Asn Ser
145                 150                 155                 160

Gln Glu Ser Val Thr Glu Gln Asp Ser Lys Asp Ser Thr Tyr Ser Leu
            165                 170                 175

Ser Ser Thr Leu Thr Leu Ser Lys Ala Asp Tyr Glu Lys His Lys Val
        180                 185                 190

Tyr Ala Cys Glu Val Thr His Gln Gly Leu Ser Ser Pro Val Thr Lys
    195                 200                 205

Ser Phe Asn Arg Gly Glu Cys
    210                 215

<210> SEQ ID NO 23
<211> LENGTH: 215
<212> TYPE: PRT
<213> ORGANISM: Artificial Sequence
<220> FEATURE:
<223> OTHER INFORMATION: S28E / S31D / Y33E variant of ipilimumab LC

<400> SEQUENCE: 23

Glu Ile Val Leu Thr Gln Ser Pro Gly Thr Leu Ser Leu Ser Pro Gly

```
              1               5                  10                 15
            Glu Arg Ala Thr Leu Ser Cys Arg Ala Ser Gln Glu Val Gly Asp Ser
                            20                  25                 30

Glu Leu Ala Trp Tyr Gln Gln Lys Pro Gly Gln Ala Pro Arg Leu Leu
                            35                  40                 45

Ile Tyr Gly Ala Phe Ser Arg Ala Thr Gly Ile Pro Asp Arg Phe Ser
                50                          55                 60

Gly Ser Gly Ser Gly Thr Asp Phe Thr Leu Thr Ile Ser Arg Leu Glu
            65                          70                  75                 80

Pro Glu Asp Phe Ala Val Tyr Tyr Cys Gln Gln Tyr Gly Ser Ser Pro
                                85                  90                 95

Trp Thr Phe Gly Gln Gly Thr Lys Val Glu Ile Lys Arg Thr Val Ala
                            100                 105                110

Ala Pro Ser Val Phe Ile Phe Pro Pro Ser Asp Glu Gln Leu Lys Ser
                            115                 120                125

Gly Thr Ala Ser Val Val Cys Leu Leu Asn Asn Phe Tyr Pro Arg Glu
                            130                 135                140

Ala Lys Val Gln Trp Lys Val Asp Asn Ala Leu Gln Ser Gly Asn Ser
            145                         150                 155                160

Gln Glu Ser Val Thr Glu Gln Asp Ser Lys Asp Ser Thr Tyr Ser Leu
                            165                 170                175

Ser Ser Thr Leu Thr Leu Ser Lys Ala Asp Tyr Glu Lys His Lys Val
                            180                 185                190

Tyr Ala Cys Glu Val Thr His Gln Gly Leu Ser Ser Pro Val Thr Lys
                            195                 200                205

Ser Phe Asn Arg Gly Glu Cys
                            210                 215

<210> SEQ ID NO 24
<211> LENGTH: 215
<212> TYPE: PRT
<213> ORGANISM: Artificial Sequence
<220> FEATURE:
<223> OTHER INFORMATION: S28E variant of ipilimumab LC

<400> SEQUENCE: 24

Glu Ile Val Leu Thr Gln Ser Pro Gly Thr Leu Ser Leu Ser Pro Gly
            1               5                  10                 15

Glu Arg Ala Thr Leu Ser Cys Arg Ala Ser Gln Glu Val Gly Ser Ser
                            20                  25                 30

Tyr Leu Ala Trp Tyr Gln Gln Lys Pro Gly Gln Ala Pro Arg Leu Leu
                            35                  40                 45

Ile Tyr Gly Ala Phe Ser Arg Ala Thr Gly Ile Pro Asp Arg Phe Ser
                50                          55                 60

Gly Ser Gly Ser Gly Thr Asp Phe Thr Leu Thr Ile Ser Arg Leu Glu
            65                          70                  75                 80

Pro Glu Asp Phe Ala Val Tyr Tyr Cys Gln Gln Tyr Gly Ser Ser Pro
                                85                  90                 95

Trp Thr Phe Gly Gln Gly Thr Lys Val Glu Ile Lys Arg Thr Val Ala
                            100                 105                110

Ala Pro Ser Val Phe Ile Phe Pro Pro Ser Asp Glu Gln Leu Lys Ser
                            115                 120                125

Gly Thr Ala Ser Val Val Cys Leu Leu Asn Asn Phe Tyr Pro Arg Glu
                            130                 135                140

Ala Lys Val Gln Trp Lys Val Asp Asn Ala Leu Gln Ser Gly Asn Ser
```

```
145                 150                 155                 160
Gln Glu Ser Val Thr Glu Gln Asp Ser Lys Asp Ser Thr Tyr Ser Leu
                165                 170                 175
Ser Ser Thr Leu Thr Leu Ser Lys Ala Asp Tyr Glu Lys His Lys Val
                180                 185                 190
Tyr Ala Cys Glu Val Thr His Gln Gly Leu Ser Ser Pro Val Thr Lys
                195                 200                 205
Ser Phe Asn Arg Gly Glu Cys
                210                 215

<210> SEQ ID NO 25
<211> LENGTH: 215
<212> TYPE: PRT
<213> ORGANISM: Artificial Sequence
<220> FEATURE:
<223> OTHER INFORMATION: S31D variant of ipilimumab LC

<400> SEQUENCE: 25

Glu Ile Val Leu Thr Gln Ser Pro Gly Thr Leu Ser Leu Ser Pro Gly
1               5                   10                  15
Glu Arg Ala Thr Leu Ser Cys Arg Ala Ser Gln Ser Val Gly Asp Ser
                20                  25                  30
Tyr Leu Ala Trp Tyr Gln Gln Lys Pro Gly Gln Ala Pro Arg Leu Leu
                35                  40                  45
Ile Tyr Gly Ala Phe Ser Arg Ala Thr Gly Ile Pro Asp Arg Phe Ser
            50                  55                  60
Gly Ser Gly Ser Gly Thr Asp Phe Thr Leu Thr Ile Ser Arg Leu Glu
65                  70                  75                  80
Pro Glu Asp Phe Ala Val Tyr Tyr Cys Gln Gln Tyr Gly Ser Ser Pro
                85                  90                  95
Trp Thr Phe Gly Gln Gly Thr Lys Val Glu Ile Lys Arg Thr Val Ala
                100                 105                 110
Ala Pro Ser Val Phe Ile Phe Pro Pro Ser Asp Glu Gln Leu Lys Ser
                115                 120                 125
Gly Thr Ala Ser Val Val Cys Leu Leu Asn Asn Phe Tyr Pro Arg Glu
                130                 135                 140
Ala Lys Val Gln Trp Lys Val Asp Asn Ala Leu Gln Ser Gly Asn Ser
145                 150                 155                 160
Gln Glu Ser Val Thr Glu Gln Asp Ser Lys Asp Ser Thr Tyr Ser Leu
                165                 170                 175
Ser Ser Thr Leu Thr Leu Ser Lys Ala Asp Tyr Glu Lys His Lys Val
                180                 185                 190
Tyr Ala Cys Glu Val Thr His Gln Gly Leu Ser Ser Pro Val Thr Lys
                195                 200                 205
Ser Phe Asn Arg Gly Glu Cys
                210                 215

<210> SEQ ID NO 26
<211> LENGTH: 215
<212> TYPE: PRT
<213> ORGANISM: Artificial Sequence
<220> FEATURE:
<223> OTHER INFORMATION: Y33E variant of ipilimumab LC

<400> SEQUENCE: 26

Glu Ile Val Leu Thr Gln Ser Pro Gly Thr Leu Ser Leu Ser Pro Gly
1               5                   10                  15
```

```
Glu Arg Ala Thr Leu Ser Cys Arg Ala Ser Gln Ser Val Gly Ser Ser
            20                  25                  30

Glu Leu Ala Trp Tyr Gln Gln Lys Pro Gly Gln Ala Pro Arg Leu Leu
            35                  40                  45

Ile Tyr Gly Ala Phe Ser Arg Ala Thr Gly Ile Pro Asp Arg Phe Ser
 50                  55                  60

Gly Ser Gly Ser Gly Thr Asp Phe Thr Leu Thr Ile Ser Arg Leu Glu
 65                  70                  75                  80

Pro Glu Asp Phe Ala Val Tyr Tyr Cys Gln Gln Tyr Gly Ser Ser Pro
            85                  90                  95

Trp Thr Phe Gly Gln Gly Thr Lys Val Glu Ile Lys Arg Thr Val Ala
            100                 105                 110

Ala Pro Ser Val Phe Ile Phe Pro Pro Ser Asp Glu Gln Leu Lys Ser
            115                 120                 125

Gly Thr Ala Ser Val Val Cys Leu Leu Asn Asn Phe Tyr Pro Arg Glu
            130                 135                 140

Ala Lys Val Gln Trp Lys Val Asp Asn Ala Leu Gln Ser Gly Asn Ser
145                 150                 155                 160

Gln Glu Ser Val Thr Glu Gln Asp Ser Lys Asp Ser Thr Tyr Ser Leu
                    165                 170                 175

Ser Ser Thr Leu Thr Leu Ser Lys Ala Asp Tyr Glu Lys His Lys Val
                180                 185                 190

Tyr Ala Cys Glu Val Thr His Gln Gly Leu Ser Ser Pro Val Thr Lys
            195                 200                 205

Ser Phe Asn Arg Gly Glu Cys
            210                 215

<210> SEQ ID NO 27
<211> LENGTH: 215
<212> TYPE: PRT
<213> ORGANISM: Artificial Sequence
<220> FEATURE:
<223> OTHER INFORMATION: S28E / S31E variant of ipilimumab LC

<400> SEQUENCE: 27

Glu Ile Val Leu Thr Gln Ser Pro Gly Thr Leu Ser Leu Ser Pro Gly
 1               5                   10                  15

Glu Arg Ala Thr Leu Ser Cys Arg Ala Ser Gln Glu Val Gly Glu Ser
            20                  25                  30

Tyr Leu Ala Trp Tyr Gln Gln Lys Pro Gly Gln Ala Pro Arg Leu Leu
            35                  40                  45

Ile Tyr Gly Ala Phe Ser Arg Ala Thr Gly Ile Pro Asp Arg Phe Ser
 50                  55                  60

Gly Ser Gly Ser Gly Thr Asp Phe Thr Leu Thr Ile Ser Arg Leu Glu
 65                  70                  75                  80

Pro Glu Asp Phe Ala Val Tyr Tyr Cys Gln Gln Tyr Gly Ser Ser Pro
            85                  90                  95

Trp Thr Phe Gly Gln Gly Thr Lys Val Glu Ile Lys Arg Thr Val Ala
            100                 105                 110

Ala Pro Ser Val Phe Ile Phe Pro Pro Ser Asp Glu Gln Leu Lys Ser
            115                 120                 125

Gly Thr Ala Ser Val Val Cys Leu Leu Asn Asn Phe Tyr Pro Arg Glu
            130                 135                 140

Ala Lys Val Gln Trp Lys Val Asp Asn Ala Leu Gln Ser Gly Asn Ser
145                 150                 155                 160
```

```
Gln Glu Ser Val Thr Glu Gln Asp Ser Lys Asp Ser Thr Tyr Ser Leu
                165                 170                 175

Ser Ser Thr Leu Thr Leu Ser Lys Ala Asp Tyr Glu Lys His Lys Val
            180                 185                 190

Tyr Ala Cys Glu Val Thr His Gln Gly Leu Ser Ser Pro Val Thr Lys
        195                 200                 205

Ser Phe Asn Arg Gly Glu Cys
    210                 215

<210> SEQ ID NO 28
<211> LENGTH: 215
<212> TYPE: PRT
<213> ORGANISM: Artificial Sequence
<220> FEATURE:
<223> OTHER INFORMATION: S28E / S31E / Y33E variant of ipilimumab LC

<400> SEQUENCE: 28

Glu Ile Val Leu Thr Gln Ser Pro Gly Thr Leu Ser Leu Ser Pro Gly
1               5                   10                  15

Glu Arg Ala Thr Leu Ser Cys Arg Ala Ser Gln Glu Val Gly Glu Ser
            20                  25                  30

Glu Leu Ala Trp Tyr Gln Gln Lys Pro Gly Gln Ala Pro Arg Leu Leu
        35                  40                  45

Ile Tyr Gly Ala Phe Ser Arg Ala Thr Gly Ile Pro Asp Arg Phe Ser
    50                  55                  60

Gly Ser Gly Ser Gly Thr Asp Phe Thr Leu Thr Ile Ser Arg Leu Glu
65                  70                  75                  80

Pro Glu Asp Phe Ala Val Tyr Tyr Cys Gln Gln Tyr Gly Ser Ser Pro
                85                  90                  95

Trp Thr Phe Gly Gln Gly Thr Lys Val Glu Ile Lys Arg Thr Val Ala
            100                 105                 110

Ala Pro Ser Val Phe Ile Phe Pro Pro Ser Asp Glu Gln Leu Lys Ser
        115                 120                 125

Gly Thr Ala Ser Val Val Cys Leu Leu Asn Asn Phe Tyr Pro Arg Glu
    130                 135                 140

Ala Lys Val Gln Trp Lys Val Asp Asn Ala Leu Gln Ser Gly Asn Ser
145                 150                 155                 160

Gln Glu Ser Val Thr Glu Gln Asp Ser Lys Asp Ser Thr Tyr Ser Leu
                165                 170                 175

Ser Ser Thr Leu Thr Leu Ser Lys Ala Asp Tyr Glu Lys His Lys Val
            180                 185                 190

Tyr Ala Cys Glu Val Thr His Gln Gly Leu Ser Ser Pro Val Thr Lys
        195                 200                 205

Ser Phe Asn Arg Gly Glu Cys
    210                 215

<210> SEQ ID NO 29
<211> LENGTH: 215
<212> TYPE: PRT
<213> ORGANISM: Artificial Sequence
<220> FEATURE:
<223> OTHER INFORMATION: S28D / S31D variant of ipilimumab LC

<400> SEQUENCE: 29

Glu Ile Val Leu Thr Gln Ser Pro Gly Thr Leu Ser Leu Ser Pro Gly
1               5                   10                  15

Glu Arg Ala Thr Leu Ser Cys Arg Ala Ser Gln Asp Val Gly Asp Ser
            20                  25                  30
```

Tyr Leu Ala Trp Tyr Gln Gln Lys Pro Gly Gln Ala Pro Arg Leu Leu
         35                  40                  45

Ile Tyr Gly Ala Phe Ser Arg Ala Thr Gly Ile Pro Asp Arg Phe Ser
 50                  55                  60

Gly Ser Gly Ser Gly Thr Asp Phe Thr Leu Thr Ile Ser Arg Leu Glu
 65                  70                  75                  80

Pro Glu Asp Phe Ala Val Tyr Tyr Cys Gln Gln Tyr Gly Ser Ser Pro
                 85                  90                  95

Trp Thr Phe Gly Gln Gly Thr Lys Val Glu Ile Lys Arg Thr Val Ala
                100                 105                 110

Ala Pro Ser Val Phe Ile Phe Pro Pro Ser Asp Glu Gln Leu Lys Ser
            115                 120                 125

Gly Thr Ala Ser Val Val Cys Leu Leu Asn Asn Phe Tyr Pro Arg Glu
        130                 135                 140

Ala Lys Val Gln Trp Lys Val Asp Asn Ala Leu Gln Ser Gly Asn Ser
145                 150                 155                 160

Gln Glu Ser Val Thr Glu Gln Asp Ser Lys Asp Ser Thr Tyr Ser Leu
                165                 170                 175

Ser Ser Thr Leu Thr Leu Ser Lys Ala Asp Tyr Glu Lys His Lys Val
            180                 185                 190

Tyr Ala Cys Glu Val Thr His Gln Gly Leu Ser Ser Pro Val Thr Lys
        195                 200                 205

Ser Phe Asn Arg Gly Glu Cys
210                 215

<210> SEQ ID NO 30
<211> LENGTH: 215
<212> TYPE: PRT
<213> ORGANISM: Artificial Sequence
<220> FEATURE:
<223> OTHER INFORMATION: S28D / S31E variant of ipilimumab LC

<400> SEQUENCE: 30

Glu Ile Val Leu Thr Gln Ser Pro Gly Thr Leu Ser Leu Ser Pro Gly
 1               5                  10                  15

Glu Arg Ala Thr Leu Ser Cys Arg Ala Ser Gln Asp Val Gly Glu Ser
                 20                  25                  30

Tyr Leu Ala Trp Tyr Gln Gln Lys Pro Gly Gln Ala Pro Arg Leu Leu
         35                  40                  45

Ile Tyr Gly Ala Phe Ser Arg Ala Thr Gly Ile Pro Asp Arg Phe Ser
 50                  55                  60

Gly Ser Gly Ser Gly Thr Asp Phe Thr Leu Thr Ile Ser Arg Leu Glu
 65                  70                  75                  80

Pro Glu Asp Phe Ala Val Tyr Tyr Cys Gln Gln Tyr Gly Ser Ser Pro
                 85                  90                  95

Trp Thr Phe Gly Gln Gly Thr Lys Val Glu Ile Lys Arg Thr Val Ala
                100                 105                 110

Ala Pro Ser Val Phe Ile Phe Pro Pro Ser Asp Glu Gln Leu Lys Ser
            115                 120                 125

Gly Thr Ala Ser Val Val Cys Leu Leu Asn Asn Phe Tyr Pro Arg Glu
        130                 135                 140

Ala Lys Val Gln Trp Lys Val Asp Asn Ala Leu Gln Ser Gly Asn Ser
145                 150                 155                 160

Gln Glu Ser Val Thr Glu Gln Asp Ser Lys Asp Ser Thr Tyr Ser Leu
                165                 170                 175

```
Ser Ser Thr Leu Thr Leu Ser Lys Ala Asp Tyr Glu Lys His Lys Val
            180                 185                 190

Tyr Ala Cys Glu Val Thr His Gln Gly Leu Ser Ser Pro Val Thr Lys
        195                 200                 205

Ser Phe Asn Arg Gly Glu Cys
        210             215

<210> SEQ ID NO 31
<211> LENGTH: 118
<212> TYPE: PRT
<213> ORGANISM: Artificial Sequence
<220> FEATURE:
<223> OTHER INFORMATION: Ipilimumab (human sequence) with up to three
      modifications
<220> FEATURE:
<221> NAME/KEY: MISC_FEATURE
<222> LOCATION: (31)..(31)
<223> OTHER INFORMATION: Xaa is S or H
<220> FEATURE:
<221> NAME/KEY: MISC_FEATURE
<222> LOCATION: (56)..(56)
<223> OTHER INFORMATION: Xaa is N or H
<220> FEATURE:
<221> NAME/KEY: MISC_FEATURE
<222> LOCATION: (99)..(99)
<223> OTHER INFORMATION: Xaa is T or H

<400> SEQUENCE: 31

Gln Val Gln Leu Val Glu Ser Gly Gly Gly Val Val Gln Pro Gly Arg
1               5                   10                  15

Ser Leu Arg Leu Ser Cys Ala Ala Ser Gly Phe Thr Phe Ser Xaa Tyr
            20                  25                  30

Thr Met His Trp Val Arg Gln Ala Pro Gly Lys Gly Leu Glu Trp Val
        35                  40                  45

Thr Phe Ile Ser Tyr Asp Gly Xaa Asn Lys Tyr Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Ile Tyr Tyr Cys
                85                  90                  95

Ala Arg Xaa Gly Trp Leu Gly Pro Phe Asp Tyr Trp Gly Gln Gly Thr
            100                 105                 110

Leu Val Thr Val Ser Ser
        115

<210> SEQ ID NO 32
<211> LENGTH: 108
<212> TYPE: PRT
<213> ORGANISM: Artificial Sequence
<220> FEATURE:
<223> OTHER INFORMATION: Ipilimumab (human sequence) with up to three
      modifications
<220> FEATURE:
<221> NAME/KEY: MISC_FEATURE
<222> LOCATION: (28)..(28)
<223> OTHER INFORMATION: Xaa is S, D or E
<220> FEATURE:
<221> NAME/KEY: MISC_FEATURE
<222> LOCATION: (31)..(31)
<223> OTHER INFORMATION: Xaa is S, D or E
<220> FEATURE:
<221> NAME/KEY: MISC_FEATURE
<222> LOCATION: (33)..(33)
<223> OTHER INFORMATION: Xaa is Y, D or E

<400> SEQUENCE: 32
```

```
Glu Ile Val Leu Thr Gln Ser Pro Gly Thr Leu Ser Leu Ser Pro Gly
1               5                   10                  15

Glu Arg Ala Thr Leu Ser Cys Arg Ala Ser Gln Xaa Val Gly Xaa Ser
            20                  25                  30

Xaa Leu Ala Trp Tyr Gln Gln Lys Pro Gly Gln Ala Pro Arg Leu Leu
        35                  40                  45

Ile Tyr Gly Ala Phe Ser Arg Ala Thr Gly Ile Pro Asp Arg Phe Ser
    50                  55                  60

Gly Ser Gly Ser Gly Thr Asp Phe Thr Leu Thr Ile Ser Arg Leu Glu
65                  70                  75                  80

Pro Glu Asp Phe Ala Val Tyr Tyr Cys Gln Gln Tyr Gly Ser Ser Pro
                85                  90                  95

Trp Thr Phe Gly Gln Gly Thr Lys Val Glu Ile Lys
                100                 105
```

<210> SEQ ID NO 33
<211> LENGTH: 10
<212> TYPE: PRT
<213> ORGANISM: Homo sapiens

<400> SEQUENCE: 33

```
Gly Phe Thr Phe Ser Ser Tyr Gly Met His
1               5                   10
```

<210> SEQ ID NO 34
<211> LENGTH: 15
<212> TYPE: PRT
<213> ORGANISM: Homo sapiens

<400> SEQUENCE: 34

```
Val Ile Trp Tyr Asp Gly Ser Asn Lys Tyr Tyr Ala Asp Ser Val
1               5                   10                  15
```

<210> SEQ ID NO 35
<211> LENGTH: 16
<212> TYPE: PRT
<213> ORGANISM: Homo sapiens

<400> SEQUENCE: 35

```
Asp Pro Arg Gly Ala Thr Leu Tyr Tyr Tyr Tyr Gly Met Asp Val
1               5                   10                  15
```

<210> SEQ ID NO 36
<211> LENGTH: 11
<212> TYPE: PRT
<213> ORGANISM: Homo sapiens

<400> SEQUENCE: 36

```
Arg Ala Ser Gln Ser Ile Asn Ser Tyr Leu Asp
1               5                   10
```

<210> SEQ ID NO 37
<211> LENGTH: 7
<212> TYPE: PRT
<213> ORGANISM: Homo sapiens

<400> SEQUENCE: 37

```
Ala Ala Ser Ser Leu Gln Ser
1               5
```

<210> SEQ ID NO 38

<211> LENGTH: 9
<212> TYPE: PRT
<213> ORGANISM: Homo sapiens

<400> SEQUENCE: 38

Gln Gln Tyr Tyr Ser Thr Pro Phe Thr
1               5

<210> SEQ ID NO 39
<211> LENGTH: 125
<212> TYPE: PRT
<213> ORGANISM: Homo sapiens

<400> SEQUENCE: 39

Gln Val Gln Leu Val Glu Ser Gly Gly Gly Val Val Gln Pro Gly Arg
1               5                   10                  15

Ser Leu Arg Leu Ser Cys Ala Ala Ser Gly Phe Thr Phe Ser Ser Tyr
            20                  25                  30

Gly Met His Trp Val Arg Gln Ala Pro Gly Lys Gly Leu Glu Trp Val
        35                  40                  45

Ala Val Ile Trp Tyr Asp Gly Ser Asn Lys Tyr Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Asp Pro Arg Gly Ala Thr Leu Tyr Tyr Tyr Tyr Gly Met
            100                 105                 110

Asp Val Trp Gly Gln Gly Thr Thr Val Thr Val Ser Ser
        115                 120                 125

<210> SEQ ID NO 40
<211> LENGTH: 107
<212> TYPE: PRT
<213> ORGANISM: Homo sapiens

<400> SEQUENCE: 40

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Ser Ile Asn Ser Tyr
            20                  25                  30

Leu Asp Trp Tyr Gln Gln Lys Pro Gly Lys Ala Pro Lys Leu Leu Ile
        35                  40                  45

Tyr Ala Ala Ser Ser Leu Gln Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Tyr Tyr Ser Thr Pro Phe
                85                  90                  95

Thr Phe Gly Pro Gly Thr Lys Val Glu Ile Lys
            100                 105

<210> SEQ ID NO 41
<211> LENGTH: 450
<212> TYPE: PRT
<213> ORGANISM: Homo sapiens

<400> SEQUENCE: 41

Gln Val Gln Leu Val Glu Ser Gly Gly Gly Val Val Gln Pro Gly Arg

```
1               5                    10                   15
Ser Leu Arg Leu Ser Cys Ala Ala Ser Gly Phe Thr Phe Ser Ser Tyr
            20                  25                  30

Gly Met His Trp Val Arg Gln Ala Pro Gly Lys Gly Leu Glu Trp Val
            35                  40                  45

Ala Val Ile Trp Tyr Asp Gly Ser Asn Lys Tyr Tyr Ala Asp Ser Val
            50                  55                  60

Lys Gly Arg Phe Thr Ile Ser Arg Asp Asn Ser Lys Asn Thr Leu Tyr
 65                  70                  75                  80

Leu Gln Met Asn Ser Leu Arg Ala Glu Asp Thr Ala Val Tyr Tyr Cys
                85                  90                  95

Ala Arg Asp Pro Arg Gly Ala Thr Leu Tyr Tyr Tyr Tyr Gly Met
                    100                 105                 110

Asp Val Trp Gly Gln Gly Thr Thr Val Thr Val Ser Ser Ala Ser Thr
                115                 120                 125

Lys Gly Pro Ser Val Phe Pro Leu Ala Pro Cys Ser Arg Ser Thr Ser
            130                 135                 140

Glu Ser Thr Ala Ala Leu Gly Cys Leu Val Lys Asp Tyr Phe Pro Glu
145                 150                 155                 160

Pro Val Thr Val Ser Trp Asn Ser Gly Ala Leu Thr Ser Gly Val His
                    165                 170                 175

Thr Phe Pro Ala Val Leu Gln Ser Ser Gly Leu Tyr Ser Leu Ser Ser
                180                 185                 190

Val Val Thr Val Pro Ser Ser Asn Phe Gly Thr Gln Thr Tyr Thr Cys
            195                 200                 205

Asn Val Asp His Lys Pro Ser Asn Thr Lys Val Asp Lys Thr Val Glu
210                 215                 220

Arg Lys Cys Cys Val Glu Cys Pro Pro Cys Pro Ala Pro Pro Val Ala
225                 230                 235                 240

Gly Pro Ser Val Phe Leu Phe Pro Pro Lys Pro Lys Asp Thr Leu Met
                    245                 250                 255

Ile Ser Arg Thr Pro Glu Val Thr Cys Val Val Val Asp Val Ser His
            260                 265                 270

Glu Asp Pro Glu Val Gln Phe Asn Trp Tyr Val Asp Gly Val Glu Val
            275                 280                 285

His Asn Ala Lys Thr Lys Pro Arg Glu Glu Gln Phe Asn Ser Thr Phe
            290                 295                 300

Arg Val Val Ser Val Leu Thr Val Val His Gln Asp Trp Leu Asn Gly
305                 310                 315                 320

Lys Glu Tyr Lys Cys Lys Val Ser Asn Lys Gly Leu Pro Ala Pro Ile
                    325                 330                 335

Glu Lys Thr Ile Ser Lys Thr Lys Gly Gln Pro Arg Glu Pro Gln Val
                340                 345                 350

Tyr Thr Leu Pro Pro Ser Arg Glu Glu Met Thr Lys Asn Gln Val Ser
            355                 360                 365

Leu Thr Cys Leu Val Lys Gly Phe Tyr Pro Ser Asp Ile Ala Val Glu
            370                 375                 380

Trp Glu Ser Asn Gly Gln Pro Glu Asn Asn Tyr Lys Thr Thr Pro Pro
385                 390                 395                 400

Met Leu Asp Ser Asp Gly Ser Phe Phe Leu Tyr Ser Lys Leu Thr Val
                    405                 410                 415

Asp Lys Ser Arg Trp Gln Gln Gly Asn Val Phe Ser Cys Ser Val Met
                420                 425                 430
```

```
His Glu Ala Leu His Asn His Tyr Thr Gln Lys Ser Leu Ser Leu Ser
        435                 440                 445
Pro Gly
    450

<210> SEQ ID NO 42
<211> LENGTH: 214
<212> TYPE: PRT
<213> ORGANISM: Homo sapiens

<400> SEQUENCE: 42

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Ser Ile Asn Ser Tyr
            20                  25                  30

Leu Asp Trp Tyr Gln Gln Lys Pro Gly Lys Ala Pro Lys Leu Leu Ile
        35                  40                  45

Tyr Ala Ala Ser Ser Leu Gln Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Tyr Tyr Ser Thr Pro Phe
                85                  90                  95

Thr Phe Gly Pro Gly Thr Lys Val Glu Ile Lys Arg Thr Val Ala Ala
            100                 105                 110

Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
    130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
    210

<210> SEQ ID NO 43
<211> LENGTH: 125
<212> TYPE: PRT
<213> ORGANISM: Artificial Sequence
<220> FEATURE:
<223> OTHER INFORMATION: Human sequence with up to three modifications
<220> FEATURE:
<221> NAME/KEY: MISC_FEATURE
<222> LOCATION: (31)..(31)
<223> OTHER INFORMATION: Xaa is S or H
<220> FEATURE:
<221> NAME/KEY: MISC_FEATURE
<222> LOCATION: (56)..(56)
<223> OTHER INFORMATION: Xaa is S or H
<220> FEATURE:
<221> NAME/KEY: MISC_FEATURE
<222> LOCATION: (99)..(99)
<223> OTHER INFORMATION: Xaa is D or H

<400> SEQUENCE: 43
```

```
Gln Val Gln Leu Val Glu Ser Gly Gly Val Val Pro Gly Arg
1               5                   10                  15
Ser Leu Arg Leu Ser Cys Ala Ala Ser Gly Phe Thr Phe Ser Xaa Tyr
            20                  25                  30
Gly Met His Trp Val Arg Gln Ala Pro Gly Lys Gly Leu Glu Trp Val
            35                  40                  45
Ala Val Ile Trp Tyr Asp Gly Xaa Asn Lys Tyr Tyr Ala Asp Ser Val
50                      55                  60
Lys Gly Arg Phe Thr Ile Ser Arg Asp Asn Ser Lys Asn Thr Leu Tyr
65                  70                  75                  80
Leu Gln Met Asn Ser Leu Arg Ala Glu Asp Thr Ala Val Tyr Tyr Cys
                85                  90                  95
Ala Arg Xaa Pro Arg Gly Ala Thr Leu Tyr Tyr Tyr Tyr Gly Met
            100                 105                 110
Asp Val Trp Gly Gln Gly Thr Thr Val Thr Val Ser Ser
            115                 120                 125
```

<210> SEQ ID NO 44
<211> LENGTH: 107
<212> TYPE: PRT
<213> ORGANISM: Artificial Sequence
<220> FEATURE:
<223> OTHER INFORMATION: Human sequence with up to three modifications
<220> FEATURE:
<221> NAME/KEY: MISC_FEATURE
<222> LOCATION: (28)..(28)
<223> OTHER INFORMATION: Xaa is S, D or E
<220> FEATURE:
<221> NAME/KEY: MISC_FEATURE
<222> LOCATION: (31)..(31)
<223> OTHER INFORMATION: Xaa is S, D or E
<220> FEATURE:
<221> NAME/KEY: MISC_FEATURE
<222> LOCATION: (32)..(32)
<223> OTHER INFORMATION: Xaa is Y, D or E

<400> SEQUENCE: 44

```
Asp Ile Gln Met Thr Gln Ser Pro Ser Ser Leu Ser Ala Ser Val Gly
1               5                   10                  15
Asp Arg Val Thr Ile Thr Cys Arg Ala Ser Gln Xaa Ile Asn Xaa Xaa
            20                  25                  30
Leu Asp Trp Tyr Gln Gln Lys Pro Gly Lys Ala Pro Lys Leu Leu Ile
            35                  40                  45
Tyr Ala Ala Ser Ser Leu Gln Ser Gly Val Pro Ser Arg Phe Ser Gly
50                  55                  60
Ser Gly Ser Gly Thr Asp Phe Thr Leu Thr Ile Ser Ser Leu Gln Pro
65                  70                  75                  80
Glu Asp Phe Ala Thr Tyr Tyr Cys Gln Gln Tyr Tyr Ser Thr Pro Phe
                85                  90                  95
Thr Phe Gly Pro Gly Thr Lys Val Glu Ile Lys
            100                 105
```

<210> SEQ ID NO 45
<211> LENGTH: 107
<212> TYPE: PRT
<213> ORGANISM: Artificial Sequence
<220> FEATURE:
<223> OTHER INFORMATION: Human sequence with up to three modifications
<220> FEATURE:
<221> NAME/KEY: MISC_FEATURE
<222> LOCATION: (28)..(28)
<223> OTHER INFORMATION: Xaa is S, D or E
<220> FEATURE:

```
<221> NAME/KEY: MISC_FEATURE
<222> LOCATION: (30)..(30)
<223> OTHER INFORMATION: Xaa is N, D or E
<220> FEATURE:
<221> NAME/KEY: MISC_FEATURE
<222> LOCATION: (32)..(32)
<223> OTHER INFORMATION: Xaa is Y, D or E

<400> SEQUENCE: 45

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Xaa Ile Xaa Ser Xaa
            20                  25              30

Leu Asp Trp Tyr Gln Gln Lys Pro Gly Lys Ala Pro Lys Leu Leu Ile
                35              40              45

Tyr Ala Ala Ser Ser Leu Gln Ser Gly Val Pro Ser Arg Phe Ser Gly
        50              55              60

Ser Gly Ser Gly Thr Asp Phe Thr Leu Thr Ile Ser Ser Leu Gln Pro
65                  70              75                  80

Glu Asp Phe Ala Thr Tyr Tyr Cys Gln Gln Tyr Tyr Ser Thr Pro Phe
                85              90              95

Thr Phe Gly Pro Gly Thr Lys Val Glu Ile Lys
            100             105
```

IPILIMUMAB VARIANTS WITH ENHANCED SPECIFICITY FOR BINDING AT LOW PH

CROSS REFERENCE TO RELATED APPLICATIONS

This application claims priority to U.S. Provisional Application No. 62/835,794, filed Apr. 18, 2019, the disclosure of which is incorporated herein by reference.

SEQUENCE LISTING

The Sequence Listing filed electronically herewith is also hereby incorporated by reference in its entirety (File Name: 20200323_SEQL_13177WOPCT_GB.txt; Date Created: 23 Mar. 2020; File Size: 81,655 Bytes).

BACKGROUND OF THE INVENTION

The immune system is capable of controlling tumor development and mediating tumor regression. This requires the generation and activation of tumor antigen-specific T cells. Multiple T-cell co-stimulatory receptors and T-cell negative regulators, or co-inhibitory receptors, act in concert to control T-cell activation, proliferation, and gain or loss of effector function. Among the earliest and best characterized T-cell co-stimulatory and co-inhibitory molecules are CD28 and CTLA-4. Rudd et al. (2009) Immunol. Rev. 229:12. CD28 provides co-stimulatory signals to T-cell receptor engagement by binding to B7-1 and B7-2 ligands on antigen-presenting cells, while CTLA-4 provides a negative signal down-regulating T-cell proliferation and function. CTLA-4, which also binds the B7-1 (CD80) and B7-2 (CD86) ligands but with higher affinity than CD28, acts as a negative regulator of T-cell function through both cell autonomous (or intrinsic) and cell non-autonomous (or extrinsic) pathways. Intrinsic control of CD8 and CD4 T effector ($T_{eff}$) function is mediated by the inducible surface expression of CTLA-4 as a result of T-cell activation, and inhibition of T-cell proliferation and cytokine proliferation by multivalent engagement of B7 ligands on opposing cells. Peggs et al. (2008) Immunol. Rev. 224:141.

Anti-CTLA-4 antibodies, when cross-linked, suppress T cell function in vitro. Krummel & Allison (1995) J. Exp. Med. 182:459; Walunas et al. (1994) Immunity 1:405. Regulatory T cells ($T_{regs}$), which express CTLA-4 constitutively, control effector T cell ($T_{eff}$) function in a non-cell autonomous fashion. $T_{regs}$ that are deficient for CTLA-4 have impaired suppressive ability (Wing et al. (2008) Science 322:271) and antibodies that block CTLA-4 interaction with B7 can inhibit $T_{reg}$ function (Read et al. (2000) J. Exp. Med. 192:295; Quezada et al. (2006) J. Clin. Invest. 116:1935). More recently, $T_{effs}$ have also been shown to control T cell function through extrinsic pathways (Corse & Allison (2012) J. Immunol. 189:1123; Wang et al. (2012) J. Immunol. 189:1118). Extrinsic control of T cell function by $T_{regs}$ and $T_{effs}$ occurs through the ability of CTLA-4-positive cells to remove B7 ligands on antigen-presenting cells, thereby limiting their co-stimulatory potential. Qureshi et al. (2011) Science 332:600; Onishi et al. (2008) Proc. Nat'l Acad. Sci. (USA) 105:10113. Antibody blockade of CTLA-4/B7 interactions is thought to promote Terr activation by interfering with negative signals transmitted by CTLA-4 engagement; this intrinsic control of T-cell activation and proliferation can promote both $T_{eff}$ and $T_{reg}$ proliferation (Krummel & Allison (1995) J. Exp. Med. 182:459; Quezada et al. (2006) J. Clin. Invest. 116:1935). In early studies with animal models, antibody blockade of CTLA-4 was shown to exacerbate autoimmunity. Perrin et al. (1996) J. Immunol. 157:1333; Hurwitz et al. (1997) J. Neuroimmunol. 73:57. By extension to tumor immunity, the ability of anti-CTLA-4 to cause regression of established tumors provided a dramatic example of the therapeutic potential of CTLA-4 blockade. Leach et al. (1996) Science 271:1734.

Ipilimumab, a human anti-human CTLA-4 monoclonal antibody, which was first approved for the treatment of metastatic melanoma, has since been approved for use in other cancers, and is in clinical testing in yet other cancers. Hoos et al. (2010) Semin. Oncol. 37:533; Hodi et al. (2010) N. Engl. J. Med. 363:711; Pardoll (2012) Nat. Immunol. 13 (12): 1129. Ipilimumab has a human IgG1 isotype, which binds best to most human Fc receptors (Bruhns et al. (2009) Blood 113:3716) and is considered equivalent to murine IgG2a with respect to the types of activating Fc receptors that it binds but not necessarily in the degree of antibody-dependent cellular cytotoxicity (ADCC) or other effector function it elicits, where human IgG1 may cause much less ADCC than IgG2a does in mice. Since IgG1 binds to the activating receptor CD16 (FcγRIIIa) expressed by human NK cells and monocytes, ipilimumab can mediate ADCC. The IgG1-isotype ipilimumab was originally isolated directly from a hybridoma but was subsequently cloned and expressed in Chinese hamster ovary (CHO) cells. Notwithstanding the consideration that an isotype that mediates ADCC and/or CDC might be undesirable in an antibody targeting a receptor on T cells that seeks to upregulate an immune response, the IgG1 isotype of the antibody was retained, in part, because it enhanced vaccine response in cynomolgus monkey and was considered functional.

Ipilimumab has been shown to increase the numbers of activated T cells in the blood, as evidenced, for example, by a significant increase in the expression of HLA-DR on the surface of post-treatment CD4$^+$ and CD8$^+$ cells as well as increases in absolute lymphocyte count (Ku et al. (2010) Cancer 116:1767; Attia et al. (2005) J. Clin. Oncol. 23:6043; Maker et al. (2005) J. Immunol. 175:7746; Berman et al. (2009) J. Clin. Oncol. 27 (suppl): 15s.3020; Hamid et al. (2009) J. Clin. Oncol. 27 (suppl): 15s.9008), indicating that depletion of T cells does not occur in the periphery in man. Ipilimumab demonstrated only modest levels of ADCC of activated T cells using IL-2-activated PBMCs as effector cells (unpublished); however, use of $T_{regs}$ as targets was not tested. Minor changes in peripheral $T_{reg}$ frequency in the blood of patients treated with ipilimumab have been observed (Maker et al. (2005) J. Immunol. 175:7746), but little information of the effect of ipilimumab on intratumoral $T_{regs}$ is available. However, a positive correlation between a high CD8$^+$ to $T_{reg}$ ratio and tumor necrosis in biopsies from metastatic melanoma lesions from patients treated with ipilimumab have been described. Hodi et al. (2008) Proc. Nat'l Acad. Sci. (USA) 105:3005. In addition, tumor tissue from ipilimumab-treated bladder cancer patients had lower percentages of CD4$^+$ Foxp3$^+$ T cells than tumors from untreated bladder cancer patients. Liakou et al. (2008) Proc. Nat'l Acad. Sci. (USA) 105:14987. These results are consistent with the data disclosed herein that ipilimumab mediates $T_{reg}$ reduction at the tumor site.

In contrast, tremelimumab is an IgG2 isotype, which does not bind efficiently to Fc receptors, except for the FcγRIIa variant H131. Bruhns et al. (2009) Blood 113:3716. While tremelimumab would have the ability to enhance T cell responses by blocking the inhibitory interactions between CTLA-4 and B7, studies suggest that tremelimumab may be limited in mediating depletion of $T_{regs}$ at the tumor and, on that basis, is expected to exhibit reduced anti-tumor activity compared to ipilimumab. It is has been difficult to directly compare the clinical activity of these two antibodies as the dosing regimens for each have been different. See e.g. Ascierto et al. (2011) *J. Transl. Med.* 9:196). Tremelimumab, like ipilimumab, has demonstrable anti-tumor activity. Ribas (2010) *Semin. Oncol.* 37 (5): 450. Interestingly, studies on the mechanism of action of tremelimumab show, in a limited number of samples analyzed by immunohistochemistry, that increases in tumor-infiltrating CD8 T cells occur as a result of therapy, while there is no change in the number of Foxp3+ cells in the tumor after therapy. Comin-Anduix et al. (2008) *J. Transl. Med.* 6:22; Huang et al. (2011) *Clin. Cancer Res.* 17:4101. Alternatively, inhibition of $T_{reg}$ function may be accomplished by blocking CTLA-4/B7 interaction.

Human antibodies to human CTLA-4, ipilimumab and tremelimumab, were selected to inhibit CTLA-4-B7 interactions (Keler et al. (2003) *J. Immunol.* 171:6251; Ribas et al. (2007) *Oncologist* 12:873) and have been tested in a variety of clinical trials for multiple malignancies. Hoos et al. (2010) *Semin. Oncol.* 37:533; Ascierto et al. (2011) *J. Transl. Med.* 9:196. Tumor regressions and disease stabilization were frequently observed, and treatment with these antibodies has been accompanied by adverse events with inflammatory infiltrates capable of affecting a variety of organ systems. In 2011, ipilimumab, which has an IgG1 constant region, was approved in the US and EU for the treatment of unresectable or metastatic melanoma based on an improvement in overall survival in a phase III trial of previously treated patients with advanced melanoma. Hodi et al. (2010) *N. Engl. J. Med.* 363:711.

Although therapeutically efficacious, ipilimumab exhibits dose-limiting toxicity that prevents higher dosing that might be more effective at tumor eradication. The need exists for improved forms of ipilimumab that exhibit a greater therapeutic index. Such improved forms of ipilimumab would exhibit enhanced anti-tumor activity, reduced side-effects, or both.

SUMMARY OF THE INVENTION

The present invention provides variants of the anti-human CTLA-4 antibody ipilimumab having mutations in the variable domain that enhance target binding at low/acidic pH (e.g. pH 6.0) compared to binding at neutral pH (e.g. pH 7.4). Specifically, the variants of ipilimumab of the present invention exhibit preferential binding at low pH, such as pH 5.8, 6.0, 6.2, 6.4, 6.6 or 6.8, versus neutral pH, such as pH 7.0, 7.2, 7.4, 7.5 or 7.6, compared with ipilimumab. In one embodiment the preferential binding at low pH is expressed as the "acidic pH binding preference" (APBP), which is the ratio of the dissociation equilibrium constant for binding at pH 7.4 to the dissociation equilibrium constant for binding at pH 6.0, i.e. $K_{D-7.4}/K_{D-6.0}$. In various embodiments, the APBP is greater than or equal to 1.5, 2, 3, 4, 5, 7, 10, 12, 15, 20, 25, 35, 50, 75, and 100. In another embodiment the preferential binding at low pH is expressed as the "comparative acidic pH binding preference" (CAPBP), which is the ratio of the dissociation equilibrium constant for binding at pH 7.4 to the dissociation equilibrium constant for binding at pH 6.0 for the variant form divided by the equivalent value for ipilimumab, i.e. $[(K_{D-7.4}/K_{D-6.0})^{variant}/(K_{D-7.4}/K_{D-6.0})^{ipi}]$. In various embodiments, the CLPBR is greater than or equal to 1.5, 2, 3, 4, 5, 7, 10, 12, 15, 20, 25, 35, 50, 75, and 100. As described herein the APBP for ipilimumab is essentially 1.0, meaning that the CAPBP is essentially equal to the APBP for the ipilimumab variants disclosed herein.

In various embodiments the anti-CTLA-4 antibody of the present invention comprises a heavy chain variable region having histidine (H) substituted at one, two, three or more non-histidine positions, or having at least one histidine residue in two or more of HCDR1, HCDR2 and HCDR3. In other embodiments the anti-CTLA-4 antibody of the present invention comprises a light chain variable region comprising a LCDR1 sequence having an acidic residue (aspartic acid or glutamic acid; D/E) substituted at one, two, three or more positions that were not previously aspartic acid or glutamic acid, or having one, two, three or more aspartic acid or glutamic acid residues in LCDR1. In some embodiments the anti-CTLA-4 antibody of the present invention comprises both of the heavy and light chain variable regions of the preceding sentences.

In some embodiments, the one, two or three histidine (H) substitutions in the heavy chain variable region are at one or more of residues 31, 56 and 99 of the mature heavy chain sequence. In further embodiments, the one, two or three acidic (D/E) substitutions in the light chain variable region are at one or more of residues 28, 31, 32 and 33 of the mature light chain sequence. In some embodiments the anti-CTLA-4 antibody of the present invention comprises both of the heavy and light chain variable regions of the preceding sentences.

In yet further embodiments, the improved anti-CTLA-4 antibody of the present invention comprises one, two or three histidine (H) substitutions at one or more of residues 31, 56 and 99 in the heavy chain variable region of ipilimumab, for example as disclosed at SEQ ID NO: 31, or at one or more of residues 31, 56 and 99 in the heavy chain variable region of in tremelimumab, for example as disclosed at SEQ ID NO: 43. In further embodiments, the improved anti-CTLA-4 antibody of the present invention comprises the one, two or three acidic (D/E) substitutions at one or more of residues 28, 31 and 33 in the light chain variable region of ipilimumab, for example as disclosed at SEQ ID NO: 32, or at one or more of residues 28, 31 and 32 in the light chain variable region of tremelimumab, for example as disclosed at SEQ ID NO: 44, or at one or more of residues 28, 30 and 32 in the light chain variable region of tremelimumab, for example as disclosed at SEQ ID NO: 45. In some embodiments the anti-CTLA-4 antibody of the present invention comprises both of the heavy and light chain variable regions of the preceding sentences, such as SEQ ID NOs: 31 and 30, or SEQ ID NOs: 43 and either of 42 or 43, but the antibodies of the present invention do not comprise the both the heavy and light chain variable regions of ipilimumab (SEQ ID NOs: 9 and 10) or tremelimumab (SEQ ID NOs: 39 and 40).

In various embodiments the ipilimumab variants that preferentially bind at low pH of the present invention comprise heavy and light chain sequences provided at SEQ ID NOs: 15 and 21 (ipi.1); SEQ ID NOs: 16 and 21 (ipi.2); SEQ ID NOs: 17 and 21 (ipi.3); SEQ ID NOs: 18 and 21 (ipi.7); SEQ ID NOs: 11 and 24 (ipi.17); SEQ ID NOs: 11 and 25 (ipi.18); SEQ ID NOs: 11 and 26 (ipi.20); SEQ ID NOs: 11 and 29 (ipi.23); SEQ ID NOs: 11 and 30 (ipi.24); SEQ ID NOs: 11 and 22 (ipi.25); SEQ ID NOs: 11 and 27 (ipi.26); SEQ ID NOs: 12 and 21 (ipi.57); SEQ ID NOs: 19 and 21 (ipi.59); SEQ ID NOs: 12 and 22 (ipi.64); SEQ ID NOs: 19 and 22 (ipi.66); SEQ ID NOs: 13 and 21 (ipi.69); SEQ ID NOs: 13 and 22 (ipi.71); SEQ ID NOs: 20 and 21 (ipi.82); SEQ ID NOs: 14 and 21 (ipi.84); SEQ ID NOs: 20 and 22 (ipi.86); SEQ ID NOs: 14 and 22 (ipi.88); SEQ ID NOs: 20 and 23 (ipi.90); SEQ ID NOs: 14 and 23 (ipi.92);

SEQ ID NOs: 11 and 23 (ipi.93); SEQ ID NOs: 12 and 23 (ipi.94); SEQ ID NOs: 13 and 23 (ipi.95); SEQ ID NOs: 12 and 27 (ipi.100); SEQ ID NOs: 13 and 27 (ipi.101); SEQ ID NOs: 13 and 28 (ipi.105); and SEQ ID NOs: 14 and 28 (ipi.106). In various embodiments the ipilimumab variants that preferentially bind at low pH of the present invention comprise heavy and light chain sequences provided above with the addition of a C-terminal lysine (K) residue on the heavy chain.

In some embodiments, the ipilimumab variants that preferentially bind at low pH of the present invention are present in an antibody preparation with reduced fucosylation, an antibody preparation that is hypofucosylated, or an antibody preparation that is nonfucosylated. In some such embodiments the antibody preparation comprises greater than 95% afucosylated antibody heavy chains. In other embodiments the antibody preparation comprises 80% to 95% afucosylated antibody heavy chains. In yet further embodiments the antibody preparation exhibits at least twice the ADCC activity of a preparation of the same antibody produced by conventional means in Chinese Hamster Ovary (CHO) cells. In still further embodiments, the antibody preparation is produced in a mammalian cell line deficient in the activity of an enzyme involved in the production of GDP-fucose or a precursor thereof, including but not limited to a mammalian cell line partially or totally deficient in alpha1,6-fucosyltransferase activity, such as a mammalian cell line with a completely inactivated FUT8 gene.

In other aspects, the invention provides nucleic acids encoding the heavy and/or light chains of the pH sensitive anti-human CTLA-4 antibodies of the present invention, expression vectors comprising these nucleic acids, host cells comprising these expression vectors, and methods of making the pH sensitive anti-human CTLA-4 antibodies of the present invention by culturing the host cells under conditions that allow production of the antibodies and isolating the antibodies. The invention also provides methods of making the pH sensitive anti-human CTLA-4 antibodies of the present invention by culturing host cells comprising separate expression vectors comprising sequences encoding the heavy and light chain sequences of the antibodies, respectively, under conditions that allow production of the heavy and light chains of the antibodies, and isolating the antibodies.

In another aspect the invention provides methods of treatment comprising administration of an ipilimumab variant of the present invention to a human subject in need thereof. In one embodiment the treatment is treatment of cancer, including but not limited to, unresectable or metastatic melanoma.

In various embodiments, treatment is in combination with one or more other anti-tumor therapeutic agents, including other immunomodulatory agents. In some embodiments, such immunomodulatory agents are antagonist antibodies to PD1 or PD-L1.

In other embodiments, an ipilimumab variant of the present invention is administered at a lower or higher dose than the dose approved for treatment of the same indication with ipilimumab. In some embodiments, the ipilimumab variant is used to treat unresectable or metastatic melanoma and is administered at a dose greater than 3 mg/kg, such as 10 mg/kg, 20 mg/kg, 50 mg/kg or higher, e.g. intravenously over 90 minutes, q3w for a total of four doses.

In other embodiments, the ipilimumab variant is used an adjuvant to patients with cutaneous melanoma with pathologic involvement of regional lymph nodes of more than 1 mm who have undergone complete resection, including total lymphadenectomy and is administered at a dose at a dose greater than 10 mg/kg, such as 20 mg/kg, 50 mg/kg or higher, e.g. intravenously over 90 minutes, q3w for a total of four doses, followed by q12w for up to three years or until documented disease recurrence or unacceptable toxicity.

In further embodiments, the ipilimumab variant is used to treat patients with intermediate or poor risk, previously untreated advanced renal cell carcinoma in combination with nivolumab, and is administered at a dose greater than 1 mg/kg, such as 3 mg/kg, 10 mg/kg, 20 mg/kg, 50 mg/kg or higher, e.g. intravenously over 30 minutes q3w for a total of four doses.

In still further embodiments, the ipilimumab variant is used to treat adult and pediatric patients 12 years of age or older with microsatellite instability-high (MSI-H) or mismatch repair deficient (dMMR) metastatic colorectal cancer that has progressed following treatment with a fluoropyrimidine, oxaliplatin, or irinotecan, in combination with nivolumab, and is administered at a dose greater than 1 mg/kg, such as 3 mg/kg, 10 mg/kg, 20 mg/kg, 50 mg/kg or higher, e.g. q3w for a total of four doses.

In separate embodiments of the present invention, the pH sensitive anti-CTLA-4 antibody is derived from tremelimumab. In various embodiments, the antibody comprises: a heavy chain variable region sequence comprising the sequence of SEQ ID NO: 43, wherein histidine (H) is present at one or two or three of residues 31, 56 and 99; a light chain variable region sequence comprising the sequence of SEQ ID NO: 44, wherein aspartic acid (D) or glutamic acid (E) is present at one or two or three of residues 28, 31 and 32; a light chain variable region sequence comprising the sequence of SEQ ID NO: 45, wherein aspartic acid (D) or glutamic acid (E) is present at one or two or three of residues 28, 30 and 32; or any combination thereof.

BRIEF DESCRIPTION OF THE DRAWINGS

FIG. 1 shows residue numbering for all three heavy chain CDRs (HCDR1, HCDR2 and HCDR3) and the first light chain CDR (LCDR1) of ipilimumab. The amino acid sequences are provided in single letter code, amino terminal to carboxy terminal from left to right, as is conventional. Sequences for HCDR1, HCDR2, HCDR3 and LCDR1 are provided at SEQ ID NOs: 3-6, respectively. The top row of numbers represents strict sequential numbering, as used in the Sequence Listing, which is used, unless otherwise indicated, to describe sequence variants in the specification and claims. The numbering of the residues for the heavy and light chain CDRs is according to SEQ ID NOs: 9 and 10, respectively. The lower row of numbers represents numbering under the system of Kabat, which is used, unless otherwise indicated, to describe sequence variants in the figures. Numbers that are omitted in the Kabat numbering are the same as in the sequential numbering. The Kabat numbering system is widely used to facilitate comparisons between structurally equivalent residues in antibodies having different numbers of amino acid residues in the variable domain. The numeric concordance provided at FIG. 1 ensures no ambiguity results from the use of two numbering conventions for the same sequences.

FIG. 2A shows sequence logos for (from top to bottom) HCDR1, HCDR2 and HCDR3 in a pilot library of heavy chain sequence variants of ipilimumab. See Example 1.

FIG. 3A shows charge distribution at pH 6 and FIG. 3B shows charge distribution at pH 7.5, with HCDR1 labelled as H1 and LCDR1 labelled as L1. FIG. 3C shows enhanced view of the electrostatic model at the contact surface between HCDR1 of ipilimumab (e.g. residues T28, S30, S31 and T33 per Kabat numbering) and human CTLA-4 (e.g. residues E48, D64 and D65).

FIGS. 8A and 8B show $K_D$ values, for which lower values represent increased affinity. Antibodies below ipilimumab on these plots have enhanced binding at low pH (pH 6.0). Antibodies toward the lower right quadrant of each plot, with the quadrants based on the position of ipilimumab, have further enhanced preference for binding at low pH (pH 6.0) since they also have decreased affinity at pH 7.4. FIG. 8B presents an expanded view of the data of FIG. 8A. FIG. 8C provides half-life values for complexes of the antibodies of the present invention with CTLA-4, calculated as $\ln2/k_{off}$. For this plot, antibodies in the upper left quadrant (again with reference to ipilimumab) exhibit enhanced stability at pH 6.0 and decreased stability at pH 7.4. See Example 2.

FIGS. 17A and 17B show results for pH 7.2 at two different magnifications, with FIG. 17B expanded to better illustrate the data for ipi.106 and ipi.105. FIGS. 17C and 17D show analogous results for pH 6.7, and FIGS. 17E and 17F show analogous results for pH 6.2. Data are provided for ipilimumab (*), ipi.100 (■) ipi.101 (▲), ipi.105 (▼), ipi.106 (♦) and an isotype control ((–filled hexagons). Antibodies ipi. 100 and ipi. 101 bind almost as well as ipilimumab at pH 7.2, and progressively better at pH 6.7 and 6.2. Antibodies ipi. 105 and ipi. 106 bind much more poorly than ipilimumab at pH 7.2, but show dramatically improved binding at pH 6.7 and 6.2, with ipi. 105 approaching the affinity of ipilimumab at pH 6.2.

FIGS. 19A, 19B and 19C show results for ipilimumab dosed at 1 mg/kg (mpk), 3 mpk and 10 mpk, respectively. FIGS. 19D, 19E and 19F show analogous results for ipi.64. FIGS. 19G, 19H and 19I show analogous results for ipi. 106, and FIGS. 19J, 19K and 19L show analogous results for ipi. 105. FIG. 19M shows analogous results for mice treated with an isotype control at 10 mpk. Non-fucosylated ipilimumab is effective in suppressing tumor growth in a dose-dependent fashion between 1 and 10 mpk, with complete suppression 3 and 10 mpk. Ipi.64, ipi.106 and ipi. 105 are similarly effective in a dose-dependent manner.

FIG. 20A. In contrast, non-fucosylated ipilimumab dramatically decreases the level of Tregs in the tumor compared with isotype control, and the pH sensitive antibodies of the present invention have the same effect. FIG. 20B.

DETAILED DESCRIPTION OF THE INVENTION

Definitions

Figure 2B:
FIG. 2B shows sequence logos for these same CDRs after three rounds of selection of phage binding to huCTLA-4 at pH 6.0 but not at pH 7.4, as described at Example 1. The single most dominant sequences in HCDR1, HCDR2 and HCDR3 are T33H, N56H, and T95H (all numbering per Kabat), respectively. As in all sequence logos herein, the size of the letter representing an amino acid residue at each position is proportional to the relative frequency of that amino acid residue at that position in that library.

In order that the present disclosure may be more readily understood, certain terms are first defined. As used in this application, except as otherwise expressly provided herein, each of the following terms shall have the meaning set forth below. Additional definitions are set forth throughout the application.

"Administering" refers to the physical introduction of a composition comprising a therapeutic agent to a subject, using any of the various methods and delivery systems known to those skilled in the art. Preferred routes of administration for antibodies of the invention include intravenous, intraperitoneal, intramuscular, subcutaneous, spinal or other parenteral routes of administration, for example by injection or infusion. The phrase "parenteral administration" as used herein means modes of administration other than enteral and topical administration, usually by injection, and includes, without limitation, intravenous, intraperitoneal, intramuscular, intraarterial, intrathecal, intralymphatic, intralesional, intracapsular, intraorbital, intracardiac, intradermal, transtracheal, subcutaneous, subcuticular, intraarticular, subcapsular, subarachnoid, intraspinal, epidural and intrasternal injection and infusion, as well as in vivo electroporation. Alternatively, an antibody of the invention can be administered via a non-parenteral route, such as a topical, epidermal or mucosal route of administration, for example, intranasally, orally, vaginally, rectally, sublingually or topically. Administering can also be performed, for example, once, a plurality of times, and/or over one or more extended periods. Administration may be performed by one or more individual, including but not limited to, a doctor, a nurse, another healthcare provider, or the patient himself or herself.

An "antibody" (Ab) shall include, without limitation, a glycoprotein immunoglobulin which binds specifically to an antigen and comprises at least two heavy (H) chains and two light (L) chains interconnected by disulfide bonds, or an antigen-binding portion thereof. Each H chain comprises a heavy chain variable region (abbreviated herein as $V_H$) and a heavy chain constant region. The heavy chain constant region comprises three domains, CHI, $C_{H2}$ and $C_{H3}$. Each light chain comprises a light chain variable region (abbreviated herein as $V_L$) and a light chain constant region. The light chain constant region is comprised of one domain, $C_L$. The $V_H$ and $V_L$ regions can be further subdivided into regions of hypervariability, termed complementarity determining regions (CDRs), interspersed with regions that are more conserved, termed framework regions (FR). Each $V_H$ and $V_L$ is composed of three CDRs and four FRs, arranged from amino-terminus to carboxy-terminus in the following order: FR1, CDR1, FR2, CDR2, FR3, CDR3, FR4. The variable regions of the heavy and light chains contain a binding domain that interacts with an antigen.

As used herein, and in accord with conventional interpretation, an antibody that is described as comprising "a" heavy chain and/or "a" light chain refers to antibodies that comprise "at least one" of the recited heavy and/or light chains, and thus will encompass antibodies having two or more heavy and/or light chains. Specifically, antibodies so described will encompass conventional antibodies having two substantially identical heavy chains and two substantially identical light chains. Antibody chains may be substantially identical but not entirely identical if they differ due to post-translational modifications, such as C-terminal cleavage of lysine residues, alternative glycosylation patterns, etc.

Unless indicated otherwise or clear from the context, an antibody defined by its target specificity (e.g. an "anti-CTLA-4 antibody") refers to antibodies that can bind to its human target (e.g. human CTLA-4). Such antibodies may or may not bind to CTLA-4 from other species.

The immunoglobulin may derive from any of the commonly known isotypes, including but not limited to IgA, secretory IgA, IgG and IgM. The IgG isotype may be divided in subclasses in certain species: IgG1, IgG2, IgG3 and IgG4 in humans, and IgG1, IgG2a, IgG2b and IgG3 in mice. IgG antibodies may be referred to herein by the symbol gamma ($\gamma$) or simply "G," e.g. IgG1 may be expressed as "$\gamma$1" or as "G1," as will be clear from the context. "Isotype" refers to the antibody class (e.g., IgM or IgG1) that is encoded by the heavy chain constant region genes. "Antibody" includes, by way of example, both naturally occurring and non-naturally occurring antibodies; monoclonal and polyclonal antibodies; chimeric and humanized antibodies; human or nonhuman antibodies; wholly synthetic antibodies; and single chain antibodies. Unless otherwise indicated, or clear from the context, antibodies disclosed herein are human IgG1 antibodies.

An "isolated antibody" refers to an antibody that is substantially free of other antibodies having different antigenic specificities (e.g., an isolated antibody that binds specifically to CTLA-4 is substantially free of antibodies that bind specifically to antigens other than CTLA-4). An isolated antibody that binds specifically to CTLA-4 may, however, cross-react with other antigens, such as CTLA-4 molecules from different species. Moreover, an isolated antibody may be substantially free of other cellular material and/or chemicals. By comparison, an "isolated" nucleic acid refers to a nucleic acid composition of matter that is markedly different, i.e., has a distinctive chemical identity, nature and utility, from nucleic acids as they exist in nature. For example, an isolated DNA, unlike native DNA, is a free-standing portion of a native DNA and not an integral part of a larger structural complex, the chromosome, found in nature. Further, an isolated DNA, unlike native DNA, can be used as a PCR primer or a hybridization probe for, among other things, measuring gene expression and detecting biomarker genes or mutations for diagnosing disease or predicting the efficacy of a therapeutic. An isolated nucleic acid may also be purified so as to be substantially free of other cellular components or other contaminants, e.g., other cellular nucleic acids or proteins, using standard techniques well known in the art.

The term "monoclonal antibody" ("mAb") refers to a preparation of antibody molecules of single molecular composition, i.e., antibody molecules whose primary sequences are essentially identical, and which exhibits a single binding specificity and affinity for a particular epitope. Monoclonal antibodies may be produced by hybridoma, recombinant, transgenic or other techniques known to those skilled in the art.

The term "afucosylated," as used herein, refers to individual antibody heavy chains in which the N-linked glycan contains no fucose residues. The term "nonfucosylated" as used herein, refers to a preparation of antibodies containing antibodies with afucosylated heavy chains, and unless otherwise indicated over 95% afucosylated heavy chains. Such preparations of antibodies may be used as therapeutic compositions.

A "human" antibody (HuMAb) refers to an antibody having variable regions in which both the framework and CDR regions are derived from human germline immunoglobulin sequences. Furthermore, if the antibody contains a constant region, the constant region also is derived from human germline immunoglobulin sequences. The human antibodies of the invention may include amino acid residues not encoded by human germline immunoglobulin sequences (e.g., mutations introduced by random or site-specific mutagenesis in vitro or by somatic mutation in vivo). However, the term "human antibody", as used herein, is not intended to include antibodies in which CDR sequences derived from the germline of another mammalian species, such as a mouse, have been grafted onto human framework sequences. The terms "human" antibodies and "fully human" antibodies and are used synonymously.

An "antibody fragment" refers to a portion of a whole antibody, generally including the "antigen-binding portion" ("antigen-binding fragment") of an intact antibody which retains the ability to bind specifically to the antigen bound by the intact antibody, or the Fc region of an antibody which retains FcR binding capability. Exemplary antibody fragments include Fab fragments and single chain variable domain (scFv) fragments.

As used herein, "low pH" refers to any pH below the normal physiological pH in a typical human subject, such as the pH of normal human blood or serum, e.g. pH 7.4. In specific embodiments, "low pH" refers to the pH in a tumor microenvironment within a tumor in a human subject to be treated with an antibody of the present invention, such as pH 7.0, 6.8. 6.6, 6.4. 6.2. 6.0 or lower. Unless otherwise indicated, or clear from the context, normal or physiological pH is pH 7.4 and low pH is pH 6.0. Recited pH values are intended to encompass values within the typical range of error for determination of pH in the relevant samples. In some experiments pH values of 7.3 and 7.5 were used as surrogates for physiological pH. The pH values of 7.4 and 6.0 are selected as exemplary pH values for experiments described herein to select improved antibodies of the present invention, but such improved antibodies will find use in any situation where the tumor microenvironment has a lower pH than non-tumor tissues. Use of the antibodies of the present invention is in no way limited to any specific pH value used in their selection.

The "acidic pH binding preference" (APBP) is the ratio of the dissociation equilibrium constant for binding at pH 7.4 to the dissociation equilibrium constant for binding at pH 6.0, i.e. $K_{D-7.4}/K_{D-6.0}$. Unless otherwise indicated, or clear from the context, $K_D$ values are determined by surface plasmon resonance, e.g. using as BIACORE® surface plasmon resonance devices (GE Healthcare, Chicago, Ill.), or equivalent methods. A higher APBP represents a greater preference for binding at low pH, and thus an improved antibody relative to antibodies with lower APBP values. A high APBP may result from enhanced binding at acidic pH with decreased binding at neutral pH, highly enhanced binding at acidic pH with slightly enhanced binding at neutral pH, or slightly decreased binding at acidic pH with highly decreased binding at neutral pH. Useful antibodies of the present invention may arise under any of these scenarios.

Antibodies of the present invention may exhibit any APBP greater than that of ipilimumab. To facilitate this comparison, APBP values may be normalized to that of ipilimumab as the "comparative acidic pH binding preference" (CAPBP). CAPBP is the ratio of the dissociation equilibrium constant for binding at pH 7.4 to the dissociation equilibrium constant for binding at pH 6.0 for a particular variant form of ipilimumab divided by the equivalent value for ipilimumab, i.e. $[(K_{D-7.4}/K_{D-6.0})^{variant}/(K_{D-7.4}/K_{D-6.0})^{ipi}]$. In various embodiments, the CAPBP is greater than or equal to 1.5, 2, 3, 4, 5, 7, 10, 12, 15, 20, 25, 35, 50, 75, and 100.

"Antibody-dependent cell-mediated cytotoxicity" ("ADCC") refers to an in vitro or in vivo cell-mediated reaction in which nonspecific cytotoxic cells that express FcRs (e.g., natural killer (NK) cells, macrophages, neutrophils and eosinophils) recognize antibody bound to a surface antigen on a target cell and subsequently cause lysis of the target cell. In principle, any effector cell with an activating FcR can be triggered to mediate ADCC.

"Cancer" refers a broad group of various diseases characterized by the uncontrolled growth of abnormal cells in the body. Unregulated cell division and growth divide and grow results in the formation of malignant tumors or cells that invade neighboring tissues and may also metastasize to distant parts of the body through the lymphatic system or bloodstream.

A "cell surface receptor" refers to molecules and complexes of molecules capable of receiving a signal and transmitting such a signal across the plasma membrane of a cell.

An "effector cell" refers to a cell of the immune system that expresses one or more FcRs and mediates one or more effector functions. Preferably, the cell expresses at least one type of an activating Fc receptor, such as, for example, human FcγRIII, and performs ADCC effector function. Examples of human leukocytes which mediate ADCC include peripheral blood mononuclear cells (PBMCs), NK cells, monocytes, macrophages, neutrophils and eosinophils.

"Effector function" refers to the interaction of an antibody Fc region with an Fc receptor or ligand, or a biochemical event that results therefrom. Exemplary "effector functions" include C1q binding, complement dependent cytotoxicity (CDC), Fc receptor binding, FcγR-mediated effector functions such as ADCC and antibody dependent cell-mediated phagocytosis (ADCP), and down-regulation of a cell surface receptor (e.g., the B cell receptor; BCR). Such effector functions generally require the Fc region to be combined with a binding domain (e.g., an antibody variable domain).

An "Fc receptor" or "FcR" is a receptor that binds to the Fc region of an immunoglobulin. FcRs that bind to an IgG antibody comprise receptors of the FcγR family, including allelic variants and alternatively spliced forms of these receptors. The FcγR family consists of three activating (FcγRI, FcγRIII, and FcγRIV in mice; FcγRIA, FcγRIIA, and FcγRIIIA in humans) receptors and one inhibitory (FcγRIIB) receptor. Various properties of human FcγRs are summarized in Table 1. The majority of innate effector cell types co-express one or more activating FcγR and the inhibitory FcγRIIB, whereas natural killer (NK) cells selectively express one activating Fc receptor (FcγRIII in mice and FcγRIIIA in humans) but not the inhibitory FcγRIIB in mice and humans.

An "Fc region" (fragment crystallizable region) or "Fc domain" or "Fc" refers to the C-terminal region of the heavy chain of an antibody that mediates the binding of the immunoglobulin to host tissues or factors, including binding to Fc receptors located on various cells of the immune system (e.g., effector cells) or to the first component (C1q) of the classical complement system. Thus, the Fc region is a polypeptide comprising the constant region of an antibody excluding the first constant region immunoglobulin domain. In IgG, IgA and IgD antibody isotypes, the Fc region is composed of two identical protein fragments, derived from the second ($C_{H2}$) and third ($C_{H2}$) constant domains of the antibody's two heavy chains; IgM and IgE Fc regions contain three heavy chain constant domains ($C_H$ domains 2-4) in each polypeptide chain. For IgG, the Fc region comprises immunoglobulin domains Cγ2 and Cγ3 and the hinge between Cγ1 and Cγ2. Although the boundaries of the Fc region of an immunoglobulin heavy chain might vary, the human IgG heavy chain Fc region is usually defined to stretch from an amino acid residue at position C226 or P230 to the carboxy-terminus of the heavy chain, wherein the numbering is according to the EU index as in Kabat. The $C_{H2}$ domain of a human IgG Fc region extends from about amino acid 231 to about amino acid 340, whereas the $C_{H3}$ domain is positioned on C-terminal side of a $C_{H2}$ domain in an Fc region, i.e., it extends from about amino acid 341 to about amino acid 447 of an IgG. As used herein, the Fc region may be a native sequence Fc or a variant Fc. Fc may also refer to this region in isolation or in the context of an Fc-comprising protein polypeptide such as a "binding protein comprising an Fc region," also referred to as an "Fc fusion protein" (e.g., an antibody or immunoadhesin).

TABLE 1

Properties of Human FcγRs

| Fcγ | Allelic variants | Affinity for human IgG | Isotype preference | Cellular distribution |
|---|---|---|---|---|
| FcγRI | None described | High ($K_D$) ~10 nM) | IgG1 = 3 > 4 >> 2 | Monocytes, macrophages, activated neutrophils, dendritic cells? |
| FcγRIIA | H131 | Low to medium | IgG1 > 3 > 2 > 4 | Neutrophils, monocytes, macrophages, eosinophils, dendritic cells, platelets |
| | R131 | Low | IgG1 > 3 > 4 > 2 | |
| FcγRIIIA | V158 | Medium | IgG1 = 3 >> 4 > 2 | NK cells, monocytes, macrophages, mast cells, eosinophils, dendritic cells? |
| | F158 | Low | IgG1 = 3 >> 4 > 2 | |
| FcγRIIB | I232 | Low | IgG1 = 3 = 4 > 2 | B cells, monocytes, macrophages, dendritic cells, mast cells |
| | T232 | Low | IgG1 = 3 = 4 > 2 | |

An "immune response" refers to a biological response within a vertebrate against foreign agents, which response protects the organism against these agents and diseases caused by them. The immune response is mediated by the action of a cell of the immune system (for example, a T lymphocyte, B lymphocyte, natural killer (NK) cell, macrophage, eosinophil, mast cell, dendritic cell or neutrophil) and soluble macromolecules produced by any of these cells or the liver (including antibodies, cytokines, and complement) that results in selective targeting, binding to, damage to, destruction of, and/or elimination from the vertebrate's body of invading pathogens, cells or tissues infected with pathogens, cancerous or other abnormal cells, or, in cases of autoimmunity or pathological inflammation, normal human cells or tissues.

An "immunomodulator" or "immunoregulator" refers to a component of a signaling pathway that may be involved in modulating, regulating, or modifying an immune response. "Modulating," "regulating," or "modifying" an immune response refers to any alteration in a cell of the immune system or in the activity of such cell. Such modulation includes stimulation or suppression of the immune system which may be manifested by an increase or decrease in the number of various cell types, an increase or decrease in the activity of these cells, or any other changes which can occur within the immune system. Both inhibitory and stimulatory immunomodulators have been identified, some of which may have enhanced function in a tumor microenvironment. In preferred embodiments of the disclosed invention, the immunomodulator is located on the surface of a T cell. An "immunomodulatory target" or "immunoregulatory target" is an immunomodulator that is targeted for binding by, and whose activity is altered by the binding of, a substance, agent, moiety, compound or molecule. Immunomodulatory targets include, for example, receptors on the surface of a cell ("immunomodulatory receptors") and receptor ligands ("immunomodulatory ligands").

"Immunotherapy" refers to the treatment of a subject afflicted with, or at risk of contracting or suffering a recurrence of, a disease by a method comprising inducing, enhancing, suppressing or otherwise modifying an immune response.

"Potentiating an endogenous immune response" means increasing the effectiveness or potency of an existing immune response in a subject. This increase in effectiveness and potency may be achieved, for example, by overcoming mechanisms that suppress the endogenous host immune response or by stimulating mechanisms that enhance the endogenous host immune response.

A "protein" refers to a chain comprising at least two consecutively linked amino acid residues, with no upper limit on the length of the chain. One or more amino acid residues in the protein may contain a modification such as, but not limited to, glycosylation, phosphorylation or disulfide bond formation. The term "protein" is used interchangeable herein with "polypeptide."

A "subject" includes any human or non-human animal. The term "non-human animal" includes, but is not limited to, vertebrates such as nonhuman primates, sheep, dogs, rabbits, rodents such as mice, rats and guinea pigs, avian species such as chickens, amphibians, and reptiles. In preferred embodiments, the subject is a mammal such as a nonhuman primate, sheep, dog, cat, rabbit, ferret or rodent. In more preferred embodiments of any aspect of the disclosed invention, the subject is a human. The terms, "subject" and "patient" are used interchangeably herein.

A "therapeutically effective amount" or "therapeutically effective dosage" of a drug or therapeutic agent, such as an Fc fusion protein of the invention, is any amount of the drug that, when used alone or in combination with another therapeutic agent, promotes disease regression evidenced by a decrease in severity of disease symptoms, an increase in frequency and duration of disease symptom-free periods, or a prevention of impairment or disability due to the disease affliction. A therapeutically effective amount or dosage of a drug includes a "prophylactically effective amount" or a "prophylactically effective dosage", which is any amount of the drug that, when administered alone or in combination with another therapeutic agent to a subject at risk of developing a disease or of suffering a recurrence of disease, inhibits the development or recurrence of the disease. The ability of a therapeutic agent to promote disease regression or inhibit the development or recurrence of the disease can be evaluated using a variety of methods known to the skilled practitioner, such as in human subjects during clinical trials, in animal model systems predictive of efficacy in humans, or by assaying the activity of the agent in in vitro assays.

By way of example, an anti-cancer agent promotes cancer regression in a subject. In preferred embodiments, a therapeutically effective amount of the drug promotes cancer regression to the point of eliminating the cancer. "Promoting cancer regression" means that administering an effective amount of the drug, alone or in combination with an anti-neoplastic agent, results in a reduction in tumor growth or size, necrosis of the tumor, a decrease in severity of at least one disease symptom, an increase in frequency and duration of disease symptom-free periods, a prevention of impairment or disability due to the disease affliction, or otherwise amelioration of disease symptoms in the patient. In addition, the terms "effective" and "effectiveness" with regard to a treatment includes both pharmacological effectiveness and physiological safety. Pharmacological effectiveness refers to the ability of the drug to promote cancer regression in the patient. Physiological safety refers to the level of toxicity, or other adverse physiological effects at the cellular, organ and/or organism level (adverse effects) resulting from administration of the drug.

By way of example for the treatment of tumors, a therapeutically effective amount or dosage of the drug preferably inhibits cell growth or tumor growth by at least about 20%, more preferably by at least about 40%, even more preferably by at least about 60%, and still more preferably by at least about 80% relative to untreated subjects. In the most preferred embodiments, a therapeutically effective amount or dosage of the drug completely inhibits cell growth or tumor growth, i.e., preferably inhibits cell growth or tumor growth by 100%. The ability of a compound to inhibit tumor growth can be evaluated in an animal model system, such as the CT26 colon adenocarcinoma, MC38 colon adenocarcinoma and Sa1N fibrosarcoma mouse tumor models described herein, which are predictive of efficacy in human tumors. Alternatively, this property of a composition can be evaluated by examining the ability of the compound to inhibit cell growth, such inhibition can be measured in vitro by assays known to the skilled practitioner. In other preferred embodiments of the invention, tumor regression may be observed and continue for a period of at least about 20 days, more preferably at least about 40 days, or even more preferably at least about 60 days.

"Treatment" or "therapy" of a subject refers to any type of intervention or process performed on, or administering an active agent to, the subject with the objective of reversing, alleviating, ameliorating, inhibiting, slowing down or prevent the onset, progression, development, severity or recurrence of a symptom, complication, condition or biochemical indicia associated with a disease.

Anti-CTLA-4 Antibodies with Enhanced Preference for Binding at Low pH

In one aspect, the present invention provides improved anti-CTLA-4 antibodies, such as improved forms of ipilimumab, having enhanced preference for binding at low pH, such as in the tumor microenvironment, which may have a pH between 6.5 and 6.9, as compared with 7.2-7.4 in normal tissues. See FIGS. 14A-14C. Such antibodies would be expected to exhibit improved therapeutic index compared to ipilimumab, i.e. they will have an improved ratio of anti-tumor activity (requiring binding in the tumor microenvironment of other low pH compartment) to side-effects (mediated by binding in peripheral, non-tumor tissues). Reduction of side effects may represent a significant advantage in light of the level of adverse events observed with anti-CTLA-4 therapy, particularly at higher doses. Ribas et al. (2013) *J. Clin. Oncology* 31:616; Feng et al. (2013) *Clin. Cancer* 19:3977.

Depending on the specific $K_D$ values at low and physiological pHs, the improved antibodies of the present invention may be dosed at higher, lower or equivalent doses than are used with ipilimumab. Antibodies of the present invention, all of which necessarily have a CAPBP greater than 1.0, fall into three categories: enhanced affinity at both low and physiological pH (Type I); lower affinity at both low and physiological pH (Type II); and enhanced affinity at low pH but lower affinity at physiological pH (Type III). Type I antibodies may be dosed, for example, lower than ipilimumab while retaining anti-tumor efficacy. Type III antibodies may be dosed, for example, higher than ipilimumab without increasing side effects. Type II antibodies may be dosed, for example, lower, higher or the same as ipilimumab, depending on whether the goal is to maximize safety, maximize efficacy, or strike a balance between these two, respectively. Nevertheless, antibodies of the present invention may be administered at whatever dose provides the desired efficacy and safety, and the range of possible doses will be wider than with ipilimumab due to their enhanced therapeutic index.

Other antibodies have been engineered to selectively alter binding at low pH. Tocilizumab (anti-IL-6R) was modified to decrease binding selectively at pH 6.0 to enhance dissociation from bound IL-6R in the acidic endosome, freeing the antibody for release into the plasma to bind another IL-6R. Igawa et al. (2010) *Nat. Biotechnol.* 28:1203. A similar approach was taken with an anti-PCSK-9 antibody (Chaparro-Riggers et al. (2012) *J. Biol. Chem.* 287:11090), an IL-6 antibody (Devanaboyina et al. (2013) mAbs 5:851), an anti-complement C5 mAb (Fukuzawa et al. (2017) *Sci. Reports* 7:1080) and the anti-TNFα antibody adalimumab (Schröter et al. (2015) mAbs 7:138). Each of these cases, unlike the present invention, involved decreasing the relative affinity at low pH compared to neutral/physiological pH, in order to enhance antibody recycling.

A variety of anti-human CTLA-4 antibodies with preferential binding affinity at low pH, compared to ipilimumab, were designed and selected as illustrated in the figures and examples herein. Briefly, libraries of nucleic acids were designed to introduce amino acids into the CDRs of ipilimumab to increase the pH sensitivity of its binding, and antibodies with the desired property of preferential binding at low pH were selected. The properties and sequences of the antibodies are provided at Table 4, 5, 6, 7, and in the Sequence Listing summarized at Table 8. The preference for binding at low pH by the anti-human CTLA-4 antibodies of the present invention is visually apparent from FIGS. 8A-8C, where antibodies cluster in the quadrant of the plot corresponding to preferential binding at low pH, and at FIG. 9, and most clearly at FIG. 14A. The antibodies also exhibit the same tendency to favor low pH binding to cyno CTLA-4 (FIG. 15A), suggesting the cynomolgus macaque will be a good toxicology model.

Antibodies of the present invention are shown to bind to huCTLA-4 not only in SPR experiments, but also when expressed on the cell surface (FIGS. 10A-10B, 11A-11B, 12A-12C, 13A-13C, 16A-16C, 17A-17F, and 18A-18C). Selected antibodies of the present invention (ipi.64, ipi. 106 and ipi.105) were also shown to be as effective as ipilimumab, when all antibodies were expressed as nonfucosylated IgG1s, at suppressing tumor growth in a mouse tumor model using huCTLA-4 knock-in mice (FIGS. 19A-19M). These antibodies were also shown to reduce $T_{reg}$ levels in the tumor microenvironment as well as ipilimumab (FIG. 20B) while having less enhancing effect in the periphery (FIG. 20A), suggesting they may elicit fewer side effects in patients, which are known to result from peripheral T cell activation. These same antibodies were also shown to elicit less activation (FIG. 21A) and proliferation (FIG. 21B) in peripheral Tregs, consistent with the view that the pH sensitive anti-huCTLA-4 antibodies of the present invention, such as ipi. 106 and ipi. 105, either fucosylated or non-fucosylated, may retain the anti-tumor efficacy of ipilimumab with reduced peripheral toxicity. Such improved antibodies might be administered at higher doses then ipilimumab, whose dosing is generally limited by toxicity, to provide enhanced efficacy, or it may be dosed the same as ipilimumab with equivalent efficacy but greater safety/tolerability.

Targeted Antigen Binding

In various embodiments, the antibody of the present invention is modified to selectively block antigen binding in tissues and environments where antigen binding would be detrimental, but allow antigen binding where it would be beneficial. In one embodiment, a blocking peptide "mask" is generated that specifically binds to the antigen binding surface of the antibody and interferes with antigen binding, which mask is linked to each of the binding arms of the antibody by a peptidase cleavable linker. See, e.g., U.S. Pat. No. 8,518,404 to CytomX. See also Int'l Pat. App. Pub. No. WO 2018/085555. Such constructs are useful for treatment of cancers in which protease levels are greatly increased in the tumor microenvironment compared with non-tumor tissues. Selective cleavage of the cleavable linker in the tumor microenvironment allows disassociation of the masking/blocking peptide, enabling antigen binding selectively in the tumor, rather than in peripheral tissues in which antigen binding might cause unwanted side effects. Such modification would enhance the benefit of the low pH preference of the antibodies of the present invention because it would further enhance specificity of ipilimumab activity to the tumor site, having low pH and tumor-specific proteases, compared with the periphery.

Alternatively, in a related embodiment, a bivalent binding compound ("masking ligand") comprising two antigen binding domains is developed that binds to both antigen binding surfaces of the (bivalent) antibody and interfere with antigen binding, in which the two binding domains masks are linked to each other (but not the antibody) by a cleavable linker, for example cleavable by a peptidase. See, e.g., Int'l Pat. App. Pub. No. WO 2010/077643 to Tegopharm Corp. Masking ligands may comprise, or be derived from, the antigen to which the antibody is intended to bind, or may be independently generated. Such masking ligands are useful for treatment of cancers in which protease levels are greatly increased in the tumor microenvironment compared with non-tumor tissues. Selective cleavage of the cleavable linker in the tumor microenvironment allows disassociation of the two binding domains from each other, reducing the avidity for the antigen-binding surfaces of the antibody. The resulting dissociation of the masking ligand from the antibody enables antigen binding selectively in the tumor, rather than in peripheral tissues in which antigen binding might cause unwanted side effects.

Nucleic Acid Molecules Encoding Antibodies of the Invention

Another aspect of the present disclosure pertains to isolated nucleic acid molecules that encode any of the improved anti-CTLA-4 antibodies of the present invention. The nucleic acids may be present in whole cells, in a cell lysate, or in a partially purified or substantially pure form. The nucleic acid can be, for example, DNA or RNA, and may or may not contain intronic sequences. In certain embodiments, the DNA is genomic DNA, cDNA, or synthetic DNA, i.e., DNA synthesized in a laboratory, e.g., by the polymerase chain reaction or by chemical synthesis.

Ph Sensitive Anti-CTLA-4 Antibodies with Enhanced Effector Functions

Various modifications to the Fc region of antibodies have been shown to enhance effector function. In mice, enhanced binding to activating Fc gamma receptors and reduced binding to the Fc gamma inhibitory receptor follow the hierarchy: mIgG2a>>mIgG2b>>mIgG1-D265A. This hierarchy follows the activity ratio of the binding of immunoglobulin Fc regions to activating Fc receptors versus inhibitory Fc receptors (known as the A/I ratio) defined by Nimmerjahn & Ravetch (2005) *Science* 310:1510 and determined for antibodies mediating ADCC function.

In certain aspects the pH sensitive anti-CTLA-4 antibodies of the present invention are a human IgG1 antibodies. ADCC activity in the anti-CTLA-4 antibodies of the present invention may be enhanced, e.g., by introducing one or more amino acid substitutions in the Fc region, altering the glycosylation pattern at the N-linked glycan, or both.

Fc Mutations that Enhance Effector Function

In some embodiments, ADCC activity of the pH sensitive anti-CTLA-4 antibodies of the present invention is increased by modifying the amino acid sequence of the Fc region, e.g. adding mutations to a naturally occurring human IgG1 sequence to enhance ADCC. With regard to ADCC activity, human IgG1≥IgG3>>IgG4≥IgG2, so an IgG1 constant domain, rather than an IgG2 or IgG4, might be chosen as a starting point from which to enhance ADCC. As defined herein, unmodified human IgG1 as it occurs in ipilimumab does not have enhanced ADCC. The Fc region may be modified to increase antibody dependent cellular cytotoxicity (ADCC) and/or to increase the affinity for an Fcγ receptor (FcγR) by modifying one or more amino acids at the following positions. 234, 235, 236, 238, 239, 240, 241, 243, 244, 245, 247, 248, 249, 252, 254, 255, 256, 258, 262, 263, 264, 265, 267, 268, 269, 270, 272, 276, 278, 280, 283, 285, 286, 289, 290, 292, 293, 294, 295, 296, 298, 299, 301, 303, 305, 307, 309, 312, 313, 315, 320, 322, 324, 325, 326, 327, 329, 330, 331, 332, 333, 334, 335, 337, 338, 340, 360, 373, 376, 378, 382, 388, 389, 398, 414, 416, 419, 430, 433, 434, 435, 436, 437, 438 or 439. See WO 2012/142515; see also WO 00/42072. Exemplary individual substitutions include 236A, 239D, 239E, 268D, 267E, 268E, 268F, 324T, 332D, and 332E. Exemplary clusters of variants include 239D/332E, 236A/332E, 236A/239D/332E, 268F/324T, 267E/268F, 267E/324T, and 267E/268F/324T. For example, human IgG1Fcs comprising the G236A variant, which can optionally be combined with I332E, have been shown to increase the FcγIIA/FcγIIB binding affinity ratio approximately 15-fold. Richards et al. (2008) *Mol. Cancer Therap.* 7:2517; Moore et al. (2010) mAbs 2:181. Other modifications for enhancing FcγR and complement interactions include but are not limited to substitutions 298A, 333A, 334A, 326A, 247I, 339D, 339Q, 280H, 290S, 298D, 298V, 243L, 292P, 300L, 396L, 30SI, and 396L. These and other modifications are reviewed in Strohl (2009) *Current Opinion in Biotechnology* 20:685-691. Specifically, both ADCC and CDC may be enhanced by changes at position E333 of IgG1, e.g. E333A. Shields et al. (2001) *J. Biol. Chem.* 276:6591. The use of P247I and A339D/Q mutations to enhance effector function in an IgG1 is disclosed at WO 2006/020114, and D280H, K290S±S298D/V is disclosed at WO 2004/074455. The K326A/W and E333A/S variants have been shown to increase effector function in human IgG1, and E333S in IgG2. Idusogie et al. (2001) *J. Immunol.* 166:2571. Other experiments have shown that G236A/S239D/A330L/I332E results in enhanced binding to FcRIIa and FcRIIIa. Smith et al. (2012) *Proc. Nat'l Acad. Sci.* (USA) 109.6181; Bournazos et al. (2014) *Cell* 158-1243.

Unless otherwise indicated, or clear from the context, amino acid residue numbering in the Fc region of an antibody is according to the EU numbering convention (the EU index as in Kabat et al. (1991) *Sequences of Proteins of Immunological Interest*, National Institutes of Health, Bethesda, MD; see also FIGS. 3c-3f of U.S. Pat. App. Pub. No. 2008/0248028), except when specifically referring to residues in a sequence in the Sequence Listing, in which case numbering is necessarily consecutive. For example, literature references regarding the effects of amino acid substitutions in the Fc region will typically use EU numbering, which allows for reference to any given residue in the Fc region of an antibody by the same number regardless of the length of the variable domain to which is it attached. In rare cases it may be necessary to refer to the document being referenced to confirm the precise Fc residue being referred to.

Specifically, the binding sites on human IgG1 for FcγR1, FcγRII, FcγRIII and FcRn have been mapped, and variants with improved binding have been described. Shields et al. (2001) *J. Biol. Chem.* 276:6591-6604. Specific mutations at positions 256, 290, 298, 333, 334 and 339 were shown to improve binding to FcγRIII, including the combination mutants T256A/S298A, S298A/E333A, S298A/K224A and S298A/E333A/K334A (having enhanced FcγRIIIa binding and ADCC activity). Other IgG1 variants with strongly enhanced binding to FcγRIIIa have been identified, including variants with S239D/I332E and S239D/I332E/A330L mutations which showed the greatest increase in affinity for FcγRIIIa, a decrease in FcγRIIb binding, and strong cytotoxic activity in cynomolgus monkeys. Lazar et al. (2006) *Proc. Nat'l Acad. Sci.* (USA) 103:4005; Awan et al. (2010) *Blood* 115:1204; Desjarlais & Lazar (2011) *Exp. Cell Res.* 317:1278. Introduction of the triple mutations into antibodies such as alemtuzumab (CD52-specific), trastuzumab (HER2/neu-specific), rituximab (CD20-specific), and cetuximab (EGFR-specific) translated into greatly enhanced ADCC activity in vitro, and the S239D/I332E variant showed an enhanced capacity to deplete B cells in macaques. Lazar et al. (2006) *Proc. Nat'l Acad. Sci.* (USA) 103:4005. In addition, IgG1 mutants containing L235V, F243L, R292P, Y300L, V305I and P396L mutations which exhibited enhanced binding to FcγRIIIa and concomitantly enhanced ADCC activity in transgenic mice expressing human FcγRIIIa in models of B cell malignancies and breast cancer have been identified. Stavenhagen et al. (2007) *Cancer Res.* 67:8882; U.S. Pat. No. 8,652,466; Nordstrom et al. (2011) *Breast Cancer Res.* 13:R123.

Different IgG isotypes also exhibit differential CDC activity (IgG3>IgG1>>IgG2~IgG4). Dangl et al. (1988) *EMBO J.* 7:1989. For uses in which enhanced CDC is desired, it is also possible to introduce mutations that increase binding to C1q. The ability to recruit complement (CDC) may be enhanced by mutations at K326 and/or E333 in an IgG2, such as K326W (which reduces ADCC activity) and E333S, to increase binding to C1q, the first component of the complement cascade. Idusogie et al. (2001) *J. Immunol.* 166:2571. Introduction of S267E/H268F/S324T (alone or in any combination) into human IgG1 enhances C1q binding. Moore et al. (2010) mAbs 2:181. The Fc region of the IgG1/IgG3 hybrid isotype antibody "113F" of Natsume et al. (2008) *Cancer Res.* 68:3863 (FIG. 1 therein) also confers enhanced CDC. See also Michaelsen et al. (2009) *Scand. J. Immunol.* 70:553 and Redpath et al. (1998) *Immunology* 93:595.

Additional mutations that can increase or decrease effector function are disclosed at Dall'Acqua et al. (2006) *J. Immunol.* 177.1129. See also Carter (2006) *Nat. Rev. Immunol.* 6:343; Presta (2008) Curr. Op. Immunol. 20:460.

Reduced Fucosylation, Nonfucosylation and Hypofucosylation

The interaction of antibodies of the present invention with FcγRs can also be enhanced by modifying the glycan moiety attached to each Fc fragment at the N297 residue. In particular, the absence of core fucose residues strongly enhances ADCC via improved binding of IgG to activating FcγRIIIA without altering antigen binding or CDC. Natsume et al. (2009) *Drug Des. Devel. Ther.* 3:7. There is convincing evidence that afucosylated tumor-specific antibodies translate into enhanced therapeutic activity in mouse models in vivo. Nimmerjahn & Ravetch (2005) *Science* 310:1510; Mossner et al. (2010) *Blood* 115:4393.

Modification of antibody glycosylation can be accomplished by, for example, expressing the antibody in a host cell with altered glycosylation machinery. Antibodies with reduced or eliminated fucosylation, which exhibit enhanced ADCC, are particularly useful in the methods of the present invention. Cells with altered glycosylation machinery have been described in the art and can be used as host cells in which to express recombinant antibodies of this disclosure to thereby produce an antibody with altered glycosylation. For example, the cell lines Ms704, Ms705, and Ms709 lack the fucosyltransferase gene, FUT8 (α-(1,6) fucosyltransferase (see U.S. Pat. App. Publication No. 20040110704; Yamane-Ohnuki et al. (2004) *Biotechnol. Bioeng.* 87:614), such that antibodies expressed in these cell lines lack fucose on their carbohydrates. As another example, EP 1176195 also describes a cell line with a functionally disrupted FUT8 gene as well as cell lines that have little or no activity for adding fucose to the N-acetylglucosamine that binds to the Fc region of the antibody, for example, the rat myeloma cell line YB2/0 (ATCC CRL 1662). PCT Publication WO 03/035835 describes a variant CHO cell line, Lec13, with reduced ability to attach fucose to Asn (297)-linked carbohydrates, also resulting in hypofucosylation of antibodies expressed in that host cell. See also Shields et al. (2002) *J. Biol. Chem.* 277:26733. Antibodies with a modified glycosylation profile can also be produced in chicken eggs, as described in PCT Publication No. WO 2006/089231. Alternatively, antibodies with a modified glycosylation profile can be produced in plant cells, such as *Lemna*. See e.g. U.S. Publication No. 2012/0276086. PCT Publication No. WO 99/54342 describes cell lines engineered to express glycoprotein-modifying glycosyl transferases (e.g., beta (1,4)-N-acetylglucosaminyltransferase III (GnTIII)) such that antibodies expressed in the engineered cell lines exhibit increased bisecting GlcNac structures which results in increased ADCC activity of the antibodies. See also Umaña et al. (1999) *Nat. Biotech.* 17:176. Alternatively, the fucose residues of the antibody may be cleaved off using a fucosidase enzyme. For example, the enzyme alpha-L-fucosidase removes fucosyl residues from antibodies. Tarentino et al. (1975) *Biochem.* 14:5516. Antibodies with reduced fucosylation may also be produced in cells harboring a recombinant gene encoding an enzyme that uses GDP-6-deoxy-D-lyxo-4-hexylose as a substrate, such as GDP-6-deoxy-D-lyxo-4-hexylose reductase (RMD), as described at U.S. Pat. No. 8,642,292. Alternatively, cells may be grown in medium containing fucose analogs that block the addition of fucose residues to the N-linked glycan or a glycoprotein, such as antibody, produced by cells grown in the medium. U.S. Pat. No. 8,163,551; WO 09/135181.

Because afucosylated antibodies exhibit greatly enhanced ADCC compared with fucosylated antibodies, antibody preparations need not be completely free of fucosylated heavy chains to be useful in the methods of the present invention. Residual levels of fucosylated heavy chains will not significantly interfere with the ADCC activity of a preparation substantially of afucosylated heavy chains. Antibodies produced in conventional CHO cells, which are fully competent to add core fucose to N-glycans, may nevertheless comprise from a few percent up to 15% afucosylated antibodies. Afucosylated antibodies may exhibit ten-fold higher affinity for CD16, and up to 30- to 100-fold enhancement of ADCC activity, so even a small increase in the proportion of afucosylated antibodies may drastically increase the ADCC activity of a preparation. Any preparation comprising more afucosylated antibodies than would be produced in normal CHO cells in culture may exhibit some level of enhanced ADCC. Such antibody preparations are referred to herein as preparations having reduced fucosylation. Depending on the original level of afucosylation obtained from normal CHO cells, reduced fucosylation preparations may comprise as little as 50%, 30%, 20%, 10% and even 5% afucosylated antibodies. Reduced fucosylation is functionally defined as preparations exhibiting two-fold or greater enhancement of ADCC compared with antibodies prepared in normal CHO cells, and not with reference to any fixed percentage of afucosylated species.

In other embodiments the level of nonfucosylation is structurally defined. As used herein, nonfucosylated antibody preparations are antibody preparations comprising greater than 95% afucosylated antibody heavy chains, including 100%. Hypofucosylated antibody preparations are antibody preparations comprising less than or equal to 95% heavy chains lacking fucose, e.g. antibody preparations in which between 80 and 95% of heavy chains lack fucose, such as between 85 and 95%, and between 90 and 95%. Unless otherwise indicated, hypofucosylated refers to antibody preparations in which 80 to 95% of heavy chains lack fucose, nonfucosylated refers to antibody preparations in which over 95% of heavy chains lack fucose, and "hypofucosylated or nonfucosylated" refers to antibody preparations in which 80% or more of heavy chains lack fucose.

In some embodiments, hypofucosylated or nonfucosylated antibodies are produced in cells lacking an enzyme essential to fucosylation, such as alpha1,6-fucosyltransferase encoded by FUT8 (e.g. U.S. Pat. No. 7,214,775), or in cells in which an exogenous enzyme partially depletes the pool of metabolic precursors for fucosylation (e.g. U.S. Pat. No. 8,642,292), or in cells cultured in the presence of a small molecule inhibitor of an enzyme involved in fucosylation (e.g. WO 09/135181).

The level of fucosylation in an antibody preparation may be determined by any method known in the art, including but not limited to gel electrophoresis, liquid chromatography, and mass spectrometry. Unless otherwise indicated, for the purposes of the present invention, the level of fucosylation in an antibody preparation is determined by hydrophilic interaction chromatography (or hydrophilic interaction liquid chromatography, HILIC), essentially as described at Example 3. To determine the level of fucosylation of an antibody preparation, samples are denatured treated with PNGase F to cleave N-linked glycans, which are then analyzed for fucose content. LC/MS of full-length antibody chains is an alternative method to detect the level of fucosylation of an antibody preparation, but mass spectroscopy is inherently less quantitative.

Pharmaceutical Compositions

Improved anti-CTLA-4 antibodies of the present invention may be constituted in a composition, e.g., a pharmaceutical composition, containing the binding protein, for example an antibody or a fragment thereof, and a pharmaceutically acceptable carrier. As used herein, a "pharmaceutically acceptable carrier" includes any and all solvents, dispersion media, coatings, antibacterial and antifungal agents, isotonic and absorption delaying agents, and the like that are physiologically compatible. Preferably, the carrier is suitable for intravenous, subcutaneous, intramuscular, parenteral, spinal or epidermal administration (e.g., by injection or infusion). A pharmaceutical composition of the invention may include one or more pharmaceutically acceptable salts, anti-oxidant, aqueous and non-aqueous carriers, and/or adjuvants such as preservatives, wetting agents, emulsifying agents and dispersing agents.

Dosage regimens are adjusted to provide the optimum desired response, e.g., a therapeutic response or minimal adverse effects. The improved antibodies of the present invention may be administered at the same dosage as ipilimumab, but with improved safety. Alternatively, they may be administered at higher doses than ipilimumab, e.g. if the antibody in question exhibits lower affinity (or otherwise poorer binding activity and/or activity) in peripheral tissues, which are at approximately pH 7.4. For metastatic or unresectable melanoma, YERVOY" (ipilimumab) is administered intravenously at 3 mg/kg over 90 minutes every three weeks for a total of four doses. For adjuvant use in melanoma, YERVOY® (ipilimumab) is administered intravenously at 10 mg/kg. For use in combination with anti-PD1 antibody OPDIVO® (nivolumab) for advanced renal cell carcinoma or Microsatellite instability-high (MSI-H) or mismatch repair deficient (dMMR) metastatic colorectal cancer, YERVOY® (ipilimumab) is administered intravenously at 1 mg/kg.

In some embodiments, for example when the anti-CTLA-4 antibody ipilimumab of the present invention is a Type I antibody, it is administered at a dose that is lower than the dose that is approved for ipilimumab. Such lower dosing may exhibit equivalent, or even enhanced, anti-tumor efficacy without significantly enhanced side effects when compared to treatment with unmodified ipilimumab. In exemplary embodiments, they are administered to treat unresectable or metastatic melanoma at less than 3 mg/kg, such as 2 mg/kg, 1 mg/kg, 0.5 mg/kg or lower. In other embodiments, they are administered for adjuvant treatment of patients with cutaneous melanoma with pathologic involvement of regional lymph nodes of more than 1 mm who have undergone complete resection, including total lymphadenectomy, at less than 10 mg/kg, such as 5 mg/kg, 3 mg/kg, 1 mg/kg, 0.5 mg/kg or lower. Improved ipilimumab variants of the present invention may also be used in at least any combination therapy, or bispecific reagent, e.g. in combination with a PD1 or PD-L1 antagonist, in which ipilimumab is used.

In some embodiments, for example when the anti-CTLA-4 antibody ipilimumab of the present invention is a Type III antibody, the ipilimumab variant is used to treat unresectable or metastatic melanoma and is administered at a dose greater than 3 mg/kg, such as 10 mg/kg, 20 mg/kg, 50 mg/kg or higher. In other embodiments, the Type III ipilimumab variant an adjuvant to patients with cutaneous melanoma with pathologic involvement of regional lymph nodes of more than 1 mm who have undergone complete resection, including total lymphadenectomy and is administered at a dose at a dose greater than 10 mg/kg, such as 20 mg/kg, 50 mg/kg or higher.

In further embodiments, the Type III ipilimumab variant is used to treat patients with intermediate or poor risk, previously untreated advanced renal cell carcinoma in combination with nivolumab, and is administered at a dose greater than 1 mg/kg, such as 3 mg/kg, 10 mg/kg, 20 mg/kg, 50 mg/kg or higher, e.g. intravenously over 30 minutes q3w for a total of four doses. In still further embodiments, the Type III ipilimumab variant is used to treat adult and pediatric patients 12 years of age or older with microsatellite instability-high (MSI-H) or mismatch repair deficient (dMMR) metastatic colorectal cancer that has progressed following treatment with a fluoropyrimidine, oxaliplatin, or irinotecan, in combination with nivolumab, and is administered at a dose greater than 1 mg/kg, such as 3 mg/kg, 10 mg/kg, 20 mg/kg, 50 mg/kg or higher, e.g. q3w for a total of four doses.

Actual dosage levels of the active ingredients in the pharmaceutical compositions of the present invention may be varied so as to obtain an amount of the active ingredient that is effective to achieve the desired therapeutic response for a particular patient, composition, and mode of administration, without being unduly toxic to the patient. The selected dosage level will depend upon a variety of pharmacokinetic factors including the activity of the particular compositions of the present invention employed, the route of administration, the time of administration, the rate of excretion of the particular compound being employed, the duration of the treatment, other drugs, compounds and/or materials used in combination with the particular compositions employed, the age, sex, weight, condition, general health and prior medical history of the patient being treated, and like factors well known in the medical arts. One of ordinary skill in the art would be able to determine appropriate dosages based on such factors as the subject's size, the severity of the subject's symptoms, and the particular composition or route of administration selected. A composition of the present invention can be administered via one or more routes of administration using one or more of a variety of methods well known in the art.

Therapeutic Uses and Methods of the Invention

This disclosure provides methods for cancer immunotherapy, e.g. potentiating an endogenous immune response in a subject afflicted with a cancer so as to thereby treat the subject, which method comprises administering to the subject a therapeutically effective amount of any of the improved anti-CTLA-4 antibodies described herein.

In preferred embodiments of the present immunotherapeutic methods, the subject is a human.

Examples of other cancers that may be treated using the immunotherapeutic methods of the disclosure include bone cancer, pancreatic cancer, skin cancer, cancer of the head or neck, breast cancer, lung cancer, cutaneous or intraocular malignant melanoma, renal cancer, uterine cancer, ovarian cancer, colorectal cancer, colon cancer, rectal cancer, cancer of the anal region, stomach cancer, testicular cancer, uterine cancer, carcinoma of the fallopian tubes, carcinoma of the endometrium, carcinoma of the cervix, carcinoma of the vagina, carcinoma of the vulva, cancer of the esophagus, cancer of the small intestine, cancer of the endocrine system, cancer of the thyroid gland, cancer of the parathyroid gland, cancer of the adrenal gland, sarcoma of soft tissue, cancer of the urethra, cancer of the penis, a hematological malignancy, solid tumors of childhood, lymphocytic lymphoma, cancer of the bladder, cancer of the kidney or ureter, carcinoma of the renal pelvis, neoplasm of the central nervous system (CNS), primary CNS lymphoma, tumor angiogenesis, spinal axis tumor, brain stem glioma, pituitary adenoma, Kaposi's sarcoma, epidermoid cancer, squamous cell cancer, environmentally induced cancers including those induced by asbestos, metastatic cancers, and any combinations of said cancers. In preferred embodiments, the cancer is selected from MEL, RCC, squamous NSCLC, non-squamous NSCLC, CRC, CRPC, squamous cell carcinoma of the head and neck, and carcinomas of the esophagus, ovary, gastrointestinal tract and breast. The present methods are also applicable to treatment of metastatic cancers.

Other cancers include hematologic malignancies including, for example, multiple myeloma, B-cell lymphoma, Hodgkin lymphoma/primary mediastinal B-cell lymphoma, non-Hodgkin's lymphomas, acute myeloid lymphoma, chronic myelogenous leukemia, chronic lymphoid leukemia, follicular lymphoma, diffuse large B-cell lymphoma, Burkitt's lymphoma, immunoblastic large cell lymphoma, precursor B-lymphoblastic lymphoma, mantle cell lymphoma, acute lymphoblastic leukemia, mycosis fungoides, anaplastic large cell lymphoma, T-cell lymphoma, and precursor T-lymphoblastic lymphoma, and any combinations of said cancers.

Combination Therapy

In certain embodiments of these methods for treating a cancer patient, the improved anti-CTLA-4 antibody of the present invention is administered to the subject as monotherapy, whereas in other embodiments, stimulation or blockade of immunomodulatory targets may be effectively combined with standard cancer treatments, including chemotherapeutic regimes, radiation, surgery, hormone deprivation and angiogenesis inhibitors. The improved anti-CTLA-4 antibody can be linked to an anti-neoplastic agent (as an immunoconjugate) or can be administered separately from the agent. In the latter case (separate administration), the antibody can be administered before, after or concurrently with the agent or can be co-administered with other known therapeutic agents. Chemotherapeutic drugs include, among others, doxorubicin (ADRIAMYCIN®), cisplatin, carboplatin, bleomycin sulfate, carmustine, chlorambucil (LEUKERAN®), cyclophosphamide (CYTOXAN®; NEOSAR®), lenalidomide (REVLIMID®), bortezomib (VELCADE®), dexamethasone, mitoxantrone, etoposide, cytarabine, bendamustine (TREANDA®), rituximab (RITUXAN®), ifosfamide, vincristine (ONCOVIN®), fludarabine (FLUDARA®), thalidomide (THALOMID®), alemtuzumab (CAMPATH®, ofatumumab (ARZERRA®), everolimus (AFINITOR®, ZORTRESS®), and carfilzomib (KYPROLIS™). Co-administration of anti-cancer agents that operate via different mechanisms can help overcome the development of resistance to drugs or changes in the antigenicity of tumor cells.

Improved anti-CTLA-4 antibodies of the present invention may also be used in combination with other immunomodulatory agents, such as antibodies against other immunomodulatory receptors or their ligands. Several other co-stimulatory and inhibitory receptors and ligands that regulate T cell responses have been identified. Examples of stimulatory receptors include Inducible T cell Co-Stimulator (ICOS), CD137 (4-1BB), CD134 (OX40), CD27, Glucocorticoid-Induced TNFR-Related protein (GITR), and Herpes Virus Entry Mediator (HVEM), whereas examples of inhibitory receptors include Programmed Death-1 (PD-1), B and T Lymphocyte Attenuator (BTLA), T cell Immunoglobulin and Mucin domain-3 (TIM-3), Lymphocyte Activation Gene-3 (LAG-3), adenosine A2a receptor (A2aR), Killer cell Lectin-like Receptor G1 (KLRG-1), Natural Killer Cell Receptor 2B4 (CD244), CD160, T cell Immunoreceptor with Ig and ITIM domains (TIGIT), and the receptor for V-domain Ig Suppressor of T cell Activation (VISTA). Mellman et al. (2011) *Nature* 480:480; Pardoll (2012) *Nat. Rev. Cancer* 12:252; Baitsch et al. (2012) *PloS One* 7:e30852. Anti-PD-1 antibodies OPDIVO® (nivolumab) and KEYTRUDA® (pembrolizumab) have been approved for use in treating cancer, and may be combined with the improved anti-CLTA-4 antibodies of the present invention. These receptors and their ligands provide targets for therapeutics designed to stimulate, or prevent the suppression, of an immune response so as to thereby attack tumor cells. Weber (2010) *Semin. Oncol.* 37:430; Flies et al. (2011) *Yale J. Biol. Med.* 84:409; Mellman et al. (2011) *Nature* 480:480; Pardoll (2012) *Nat. Rev. Cancer* 12:252. Stimulatory receptors or receptor ligands are targeted by agonist agents, whereas inhibitory receptors or receptor ligands are targeted by blocking agents. Among the most promising approaches to enhancing immunotherapeutic anti-tumor activity is the blockade of so-called "immune checkpoints," which refer to the plethora of inhibitory signaling pathways that regulate the immune system and are crucial for maintaining self-tolerance and modulating the duration and amplitude of physiological immune responses in peripheral tissues in order to minimize collateral tissue damage. See e.g. Weber (2010) *Semin. Oncol.* 37:430; Pardoll (2012) *Nat. Rev. Cancer* 12:252. Because many of the immune checkpoints are initiated by ligand-receptor interactions, they can be readily blocked by antibodies or modulated by recombinant forms of ligands or receptors.

The present invention is further illustrated by the following examples, which should not be construed as limiting. The contents of all figures and all references, patents and published patent applications cited throughout this application are expressly incorporated herein by reference.

Example 1

Pilot Selection of Ipilimumab Heavy Chain CDR Sequence Variants with Enhanced Preference for Low pH Binding To test the process for selecting pH-optimized sequence variants, one mutation was introduced into each CDR of the heavy chain of ipilimumab, for a total of three amino acid substitutions per heavy chain. CDRs were modified to histidine (H) at positions 28, 30, 31, 32, and 33 in HCDR1; 52, 52a, 53, 54, 55, and 56 in HCDR2; and 95, 97, 98 in HCDR3 (all numbering per Kabat). See FIG. 1. The light chain was unaltered.

Selection of sequence variants with enhanced preference for binding at low/acidic pH was performed essentially as described at Hornsby et al. (2015) *Mol. Cell. Proteomics* 14:2833. Briefly, ipilimumab light and heavy chain variable domain sequences containing one or more sequence alterations were cloned into an M13 phagemid vectors, and phage were produced such that the cloned scFv fragment was expressed on the surface of the phage as a fusion of a coat protein. Because the oligonucleotides encoding the ipilimumab light and heavy chain variable domains included degenerate alterations at selected nucleic acid residues (in this case to change one histidine codon in place of one native residue at each heavy chain CDR), the resulting phage population comprised a library of ipilimumab scFv sequence variants. The nucleic acids encoding the variant ipilimumab light and heavy chain variable domains in this pre-selection library were sequenced. The distribution of CDR sequences in the library of sequence variants is represented by the sequence logo at FIG. 2A.

This phage library was subjected to four rounds of selection/counter-selection for binding/non-binding at pH 6.0 and pH 7.4, respectively. Briefly, biotinylated human CTLA-4 was bound to magnetic streptavidin beads. Phage library was exposed to the beads for one hour with gentle mixing at pH 6.0, and beads were pulled down using a magnetic separator, washed at pH 6.0, and eluted at pH 7.4. Phage that were released at pH 7.4 were then propagated overnight in bacterial cells. Phage obtained from these overnight bacterial cultures were subjected to further rounds of selection similar to the first round described above, except that the antigen (huCTLA-4) concentration on the streptavidin magnetic beads was systematically reduced for each subsequent round of selection, to increase the stringency of the selection.

The resulting selected phage library after four rounds of selection was used to infect bacteria, which were then plated to allow for clonal selection. Individual colonies were picked and the nucleic acids encoding the variant ipilimumab light and heavy chain variable domains were sequenced. The distribution of CDR sequences in the resulting collection of sequence variants is represented by the sequence logo at FIG. 2B, in which the dominant variant at each CDR is represented by the largest letter compared with the largest letter in the pre-selection library of sequence variants illustrated in FIG. 2A.

Ipilimumab heavy chain variable domains (Fab constructs) were then produced with each of the dominant variants individually (T33H, N56H and T95H, per Kabat numbering) and with all three together (T33H/N56H/T95H), resulting in antibodies named ipi. 1, ipi.2, ipi.3 and ipi.4, respectively. Binding parameters for each of these antibodies to human CTLA-4 are provided at Table 2. Binding parameters were determined by surface plasmon resonance (SPR) as described in Example 3.

TABLE 2

Binding of Selected Heavy Chain Variable Domain Sequence Variants of Ipilimumab

| mAb | Variant | pH 7.4 | | | pH 6.0 | | | Ratio |
| | | $k_a$ ($10^5$/Ms) | $k_d$ (1/s) | $K_D$ (nM) | $k_a$ ($10^5$/Ms) | $k_d$ (1/s) | $K_D$ (nM) | (APBP) $K_{D\ 7.4/6}$ |
| --- | --- | --- | --- | --- | --- | --- | --- | --- |
| ipi | wt | 5.5 | 0.026 | 47 | 3.5 | 0.016 | 46 | 1.0 |
| ipi.1 | T33H | 6.5 | 0.011 | 17 | 5.6 | 0.011 | 20 | 1.2 |
| ipi.2 | N56H | 6.7 | 0.011 | 16 | 4.9 | 0.0065 | 13 | 0.8 |
| ipi.3 | T95H | 4.8 | 0.094 | 200 | 8.4 | 0.15 | 180 | 0.9 |
| ipi.4 | ALL | 5.8 | 0.0025 | 4.2 | 4.7 | 0.0020 | 4.3 | 1.0 |

The mutations in HCDR1 and HCDR2 enhanced binding affinity two-to-three-fold (as measured by decreased $K_D$), whereas the mutation in HCDR3 significantly reduced binding, and the combination of all three mutations improved $K_D$ ten-fold. However, all of these results are essentially identical at pH 6.0 and pH 7.4, meaning that while the selections provided antibodies with enhanced affinity (i.e. affinity matured antibodies), the antibodies did not have an enhanced preference to binding at acidic pH.

Electrostatic Modeling

Figure 3A:
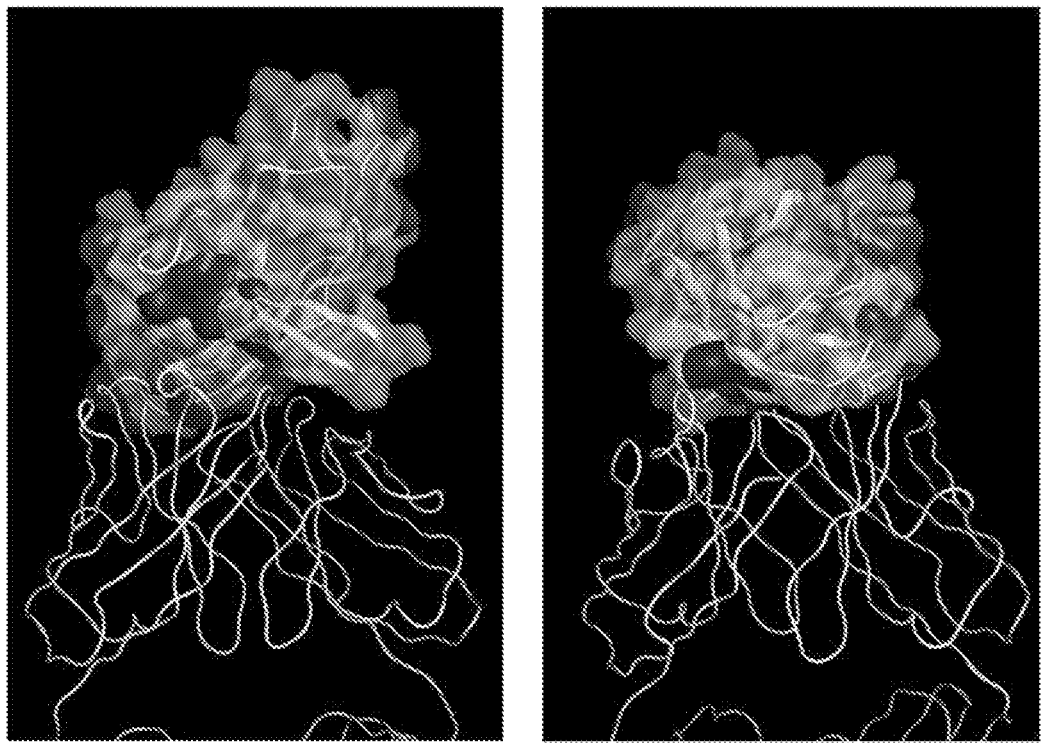
FIGS. 3A, 3B and 3C show results of electrostatic modeling of ipilimumab bound to human CTLA-4. See Example 1.
Figure 3B:
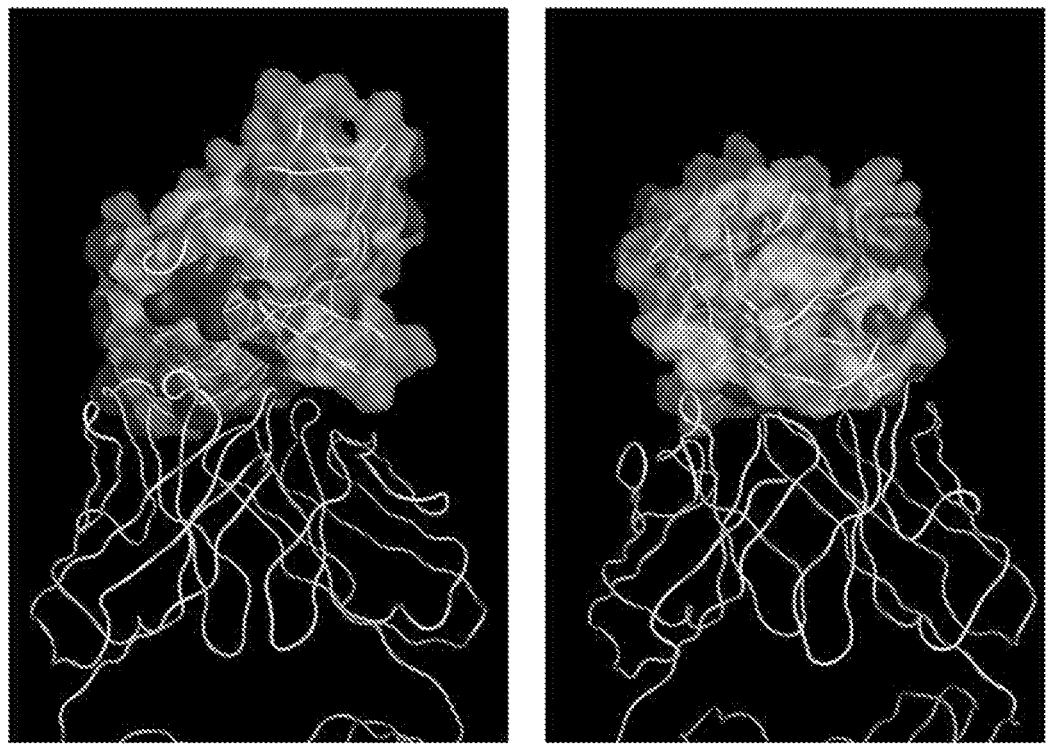
Figure 3C:
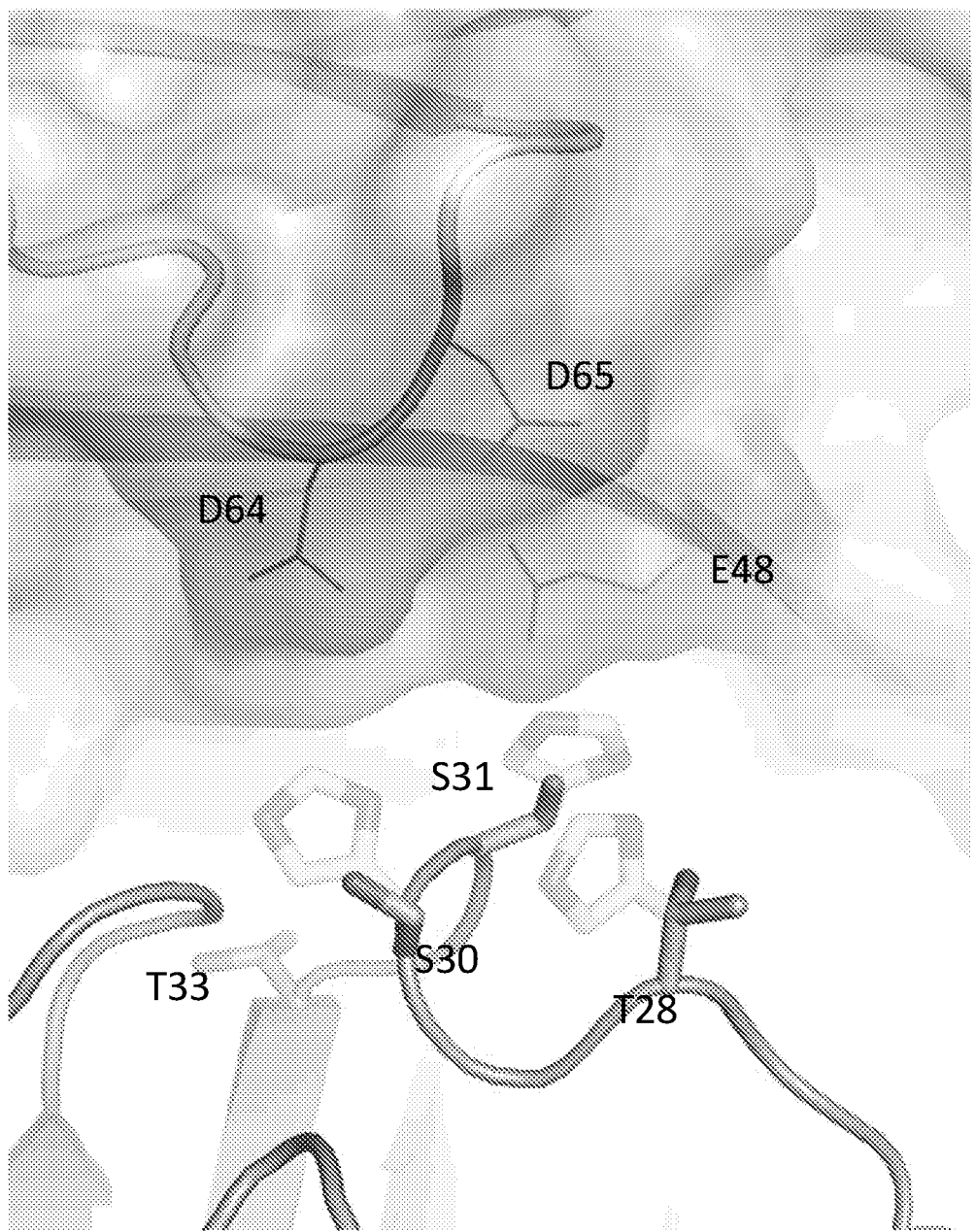

The electrostatic surface of CTLA4 was modeled using Molecular Operating Environment (MOE) (Chemical Computing Group, Montreal, Canada). Results are shown at FIGS. 3A, 3B and 3C. There is an electronegative patch in CTLA4, composed of residues E48, D64, and D65, that is proximal to the HCDR1 of ipilimumab. See FIG. 3C. Although position T33H was enriched in the HCDR1 after selections with the combinatorial library, we have observed that the single substitution of T33H enhanced affinity equally at both pH 6.0 and pH 7.4 but did not have enhanced low-pH specificity (Table 2), and thus was not wanted in constructs for further development. Other residues in HCDR1 were enriched for histidine, such as S31, which has its side chain positioned near the electronegative patch in CTLA4. The S31H variant was produced, resulting in ipi.57, which exhibited a preference for binding at pH 6.0 compared with pH 7.4 (Table 4). This experiment demonstrates the principle that only sequence variants that enhance the ratio of binding at pH 6.0 compared to pH 7.4 find use in the methods of the present invention, not just any mutation resulting from affinity maturation of the antibody.

Example 2

Combinatorial Library of Ipilimumab CDR Sequence Variants with Enhanced Preference for Low pH Binding After the pilot heavy chain variable screens (Example 1), a full combinatorial approach was devised to consider modifications in all six CDRs. To obtain sequence variants of ipilimumab with enhanced preference binding at pH 6.0 compared with binding at pH 7.4, mutations were introduced into the heavy and light chain CDRs at selected positions. CDRs were modified at positions T28, S30, S31, Y32, T33 in HCDR1; F50, S52, Y52a, D53, G54, N55, N56, Y58 in HCDR2; T95, W97, L98 in HCDR3; and Q27, S27a, S30, S31, Y32 in LCDR1; F52, S53, T56 in LCDR2; Q90, Y91, W96 in LCDR3. Each position was substituted with H (His) as well as D (Asp) or E (Glu) for LCDR1, with one to three mutations per CDR, one to three mutations per chain, for a total of two to six mutations per scFv. All residue numbering is according to Kabat, as illustrated at FIG. 1.

Briefly, oligonucleotides comprising desired mutated ipilimumab heavy and light chain CDR sequences were combined to generate scFv ipilimumab variants with up to three mutations per CDR, and between one and three mutations in each heavy chain variable domain. These oligonucleotide constructs were cloned into an M13 phagemid vector such that the cloned scFv fragment was expressed on the surface of the phage as a fusion of a coat protein.

Light Chain Results

Figure 4A:
FIGS. 4A and 4B show sequence logos for light chain CDR1 (LCDR1) in both a pre-selected (FIG. 4A) and a selected combinatorial library (FIG. 4B) of ipilimumab sequence variants. The selection protocol that generated the sequences of FIG. 4B from the starting set of sequences of FIG. 4A is described at Example 2. Dramatic shifts were observed away from the native ipilimumab sequence after selection at positions 27a (S27aE) and 30 (S30E), as compared to other positions where the original ipilimumab residues were favored.
Figure 4B:

Pre- and post-selection phage libraries were sequenced to determine what sequences were preferentially enriched in the light chain irrespective of the heavy chain. Exemplary results are provided as sequence logos at FIGS. 4A and 4B, in which the relative abundance of each amino acid residue in LCDR1 is represented by the size of the corresponding single letter code. It is apparent that the pre-selection libraries contain primarily the original ipilimumab residues at the mutated positions, but that the post-selection libraries are highly enriched for different residues at certain positions, such as LCDR1 mutations S28E and S31E (or S31D) (sequential numbering). See FIG. 4B.

Figure 5A:
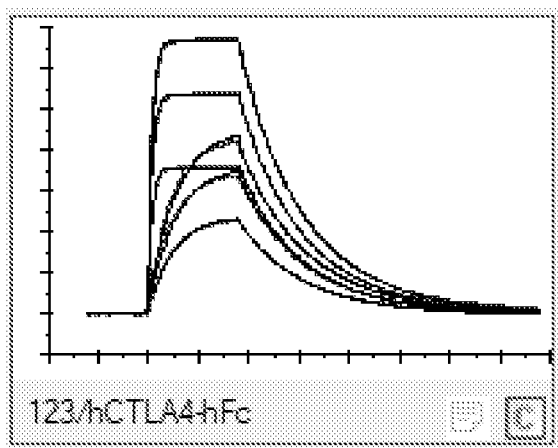
FIGS. 5A and 5B show exemplary surface plasmon resonance affinity data for ipi.25 (LCDR1 S27aE/S30D) at pH 7.4 (FIG. 5A) and pH 6.0 (FIG. 5B). See Example 2. Antibody ipi.25 binds four-to-five fold more tightly to CTLA-4 at pH 6.0 than at pH 7.4, compared with 1.0-fold for ipilimumab. See Table 3 (in Example 2).
Figure 5B:
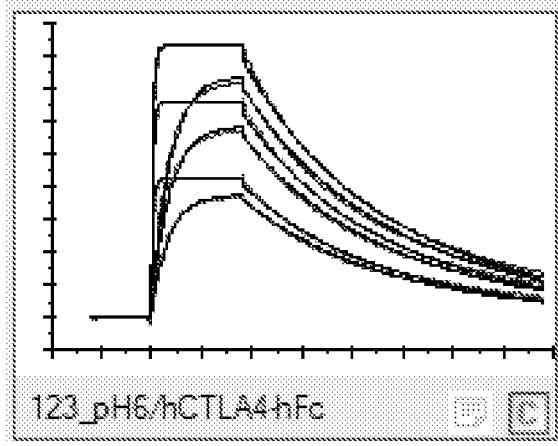
Figure 6A:
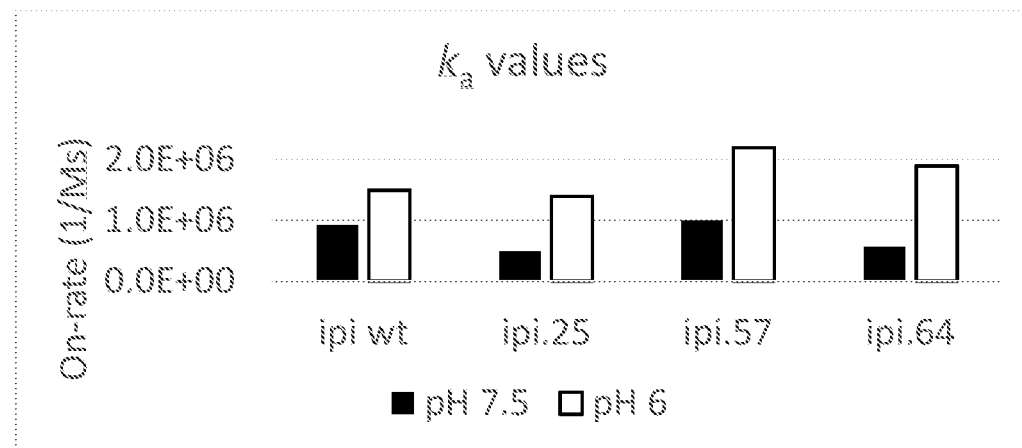
FIGS. 6A, 6B and 6C show binding parameters for selected ipilimumab sequence variants of the present invention at pH 6.0 and pH 7.5, specifically antibodies ipi.25 (LCDR1 S28E/S31D), ipi.57 (HCDR1 S31H) and ipi.64 (LCDR1 S28E/S31D and HCDR1 S31H). Values were obtained essentially as described in Example 3. Antibody ipi.64 combines the mutations of ipi.25 and ipi.57. The combination of heavy and light chain mutations gives an antibody with enhanced preference for binding at low pH compared with the heavy and light chain mutations individually. The ratio of dissociation equilibrium binding constants ($K_D$)), normalized to the ratio for ipilimumab (1.0), of CAPBP, is 6.3, 5.5 and 27.2 for ipi.25, ipi.57 and ipi.64, respectively.
Figure 6B:
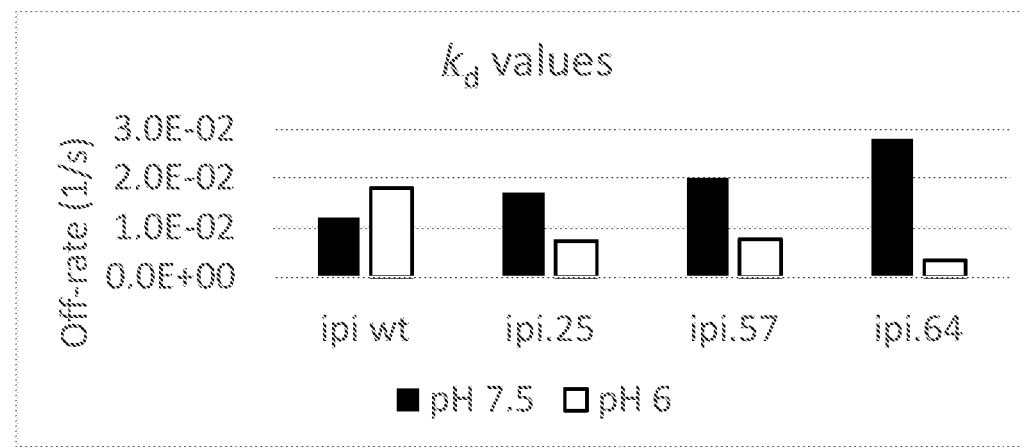
Figure 6C:
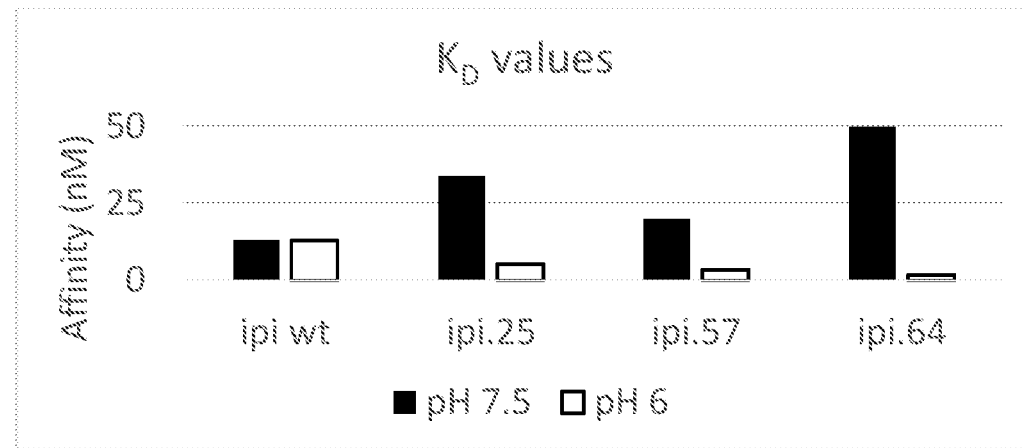
Figure 7A:
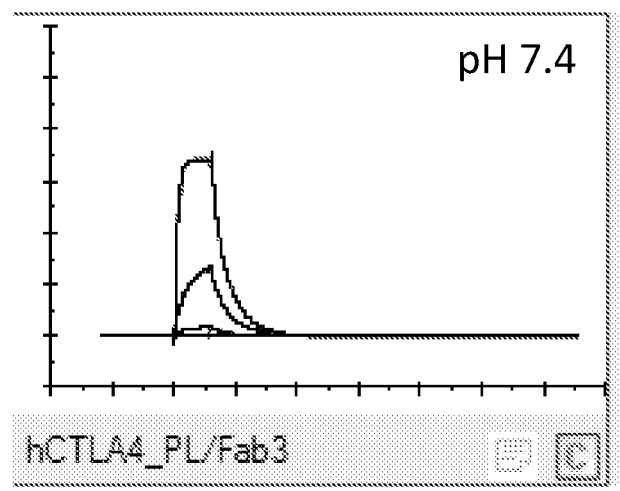
FIGS. 7A and 7B show surface plasmon resonance sensorgram data for binding of ipi.3 (HCDR3 T95H per Kabat numbering) to CTLA-4 at pH 7.4 (FIG. 7A) and pH 6.0 (FIG. 7B). This mutation was introduced to de-tune the affinity of ipilimumab at pH 7.5. See Example 4.
Figure 7B:
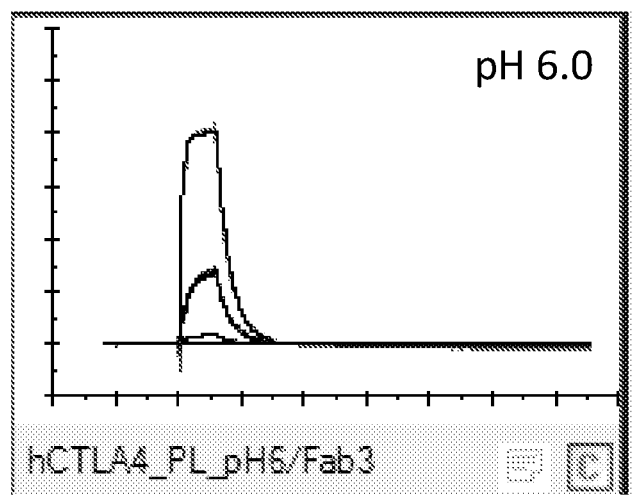

Selected LCDR1 variants at positions 28 and 31 (27a and 30 by Kabat numbering) were studied by surface plasmon resonance to determine the on and off rate constants (and thus equilibrium binding constant) at pH 7.4 and pH 6.0, using a BIACORE™ surface plasmon resonance spectrometer (Biacore AB, Uppsala, Sweden). See Example 3. Antibodies were tested as monovalent Fab fragments to simplify analysis. Results are provided at Table 3 (upper rows) for ipi.17 (S28E), ipi.18 (S31D) and ipi.25 (S28E/S31D), Exemplary sensorgrams for ipi.25 are provided at FIGS. 5A and 5B. Separate experiments were performed to test all pairwise combinations of the variant sequences at LCDR1 positions 28 and 31 (28E, 28D: 31E, 31D; or 27aE, 27aD: 30E, 30D in Kabat numbering). Results are provided at Table 3 (lower rows). The combination of S28E and S31D (ipi.25) exhibited the highest preference for binding at pH 6.0 compared with pH 7.4 ($K_{D\text{-}7.4}/K_{D\text{-}6.0}=4.0$).

TABLE 3

Binding of Selected LCDR1 Sequence Variants of Ipilimumab

| | pH 7.4 | | | pH 6.0 | | | Ratio (APBP) | | |
|---|---|---|---|---|---|---|---|---|---|
| mAb | $k_a$ ($10^5$/Ms) | $k_d$ (1/s) | $K_D$ (nM) | $k_a$ ($10^5$/Ms) | $k_d$ (1/s) | $K_D$ (nM) | $k_{a\,6/7.4}$ | $k_{d\,7.4/6}$ | $K_{D\,7.4/6}$ |
| ipi | 7.7 | 0.017 | 22 | 8.8 | 0.018 | 21 | 1.1 | 0.9 | 1.0 |
| ipi.17 | 8.5 | 0.016 | 19 | 10 | 0.015 | 14 | 1.2 | 1.1 | 1.4 |
| ipi.18 | 6.4 | 0.018 | 28 | 11 | 0.0093 | 8.8 | 1.7 | 1.9 | 3.2 |
| ipi.25 | 7.2 | 0.018 | 25 | 12 | 0.0077 | 6.2 | 1.7 | 2.3 | 4.0 |
| ipi | 8.3 | 0.012 | 14 | 11 | 0.020 | 18 | 1.3 | 0.6 | 0.8 |
| ipi.23 | 4.9 | 0.013 | 27 | 9.6 | 0.0062 | 6.5 | 2.0 | 2.1 | 4.1 |
| ipi.24 | 4.2 | 0.0099 | 24 | 8.3 | 0.0060 | 7.2 | 2.0 | 1.7 | 3.3 |
| ipi.25 | 4.6 | 0.017 | 37 | 10 | 0.0074 | 7.4 | 2.2 | 2.3 | 5.0 |
| ipi.26 | 4.1 | 0.012 | 30 | 7.9 | 0.0070 | 8.9 | 2.0 | 1.7 | 3.4 |

All selected antibody variants are somewhat poorer binders to CTLA-4 at pH 7.4 with less than two-fold changes in both on and off rate constants. Binding at pH 6.0, however, exhibits similar $k_a$ values but lower $k_d$ values (tighter binding). The ratio of dissociation equilibrium binding constants ($K_D$), normalized to the ratio of ipilimumab for the same experiment, are 1.4, 3.2 and 4.0 for ipi.17, ipi. 18 and ipi.25, respectively, in the first experiment above, and 5.1, 4.1, 6.3 and 4.3 for ipi.23, ipi.24, ipi.25 and ipi.26, respectively, in the second experiment above.

Characterization of Selected Variants

Binding of selected variants to human CTLA-4 was determined essentially as described in Example 3. Results are provided at Table 4. Nomenclature and sequences for these antibodies is provided at Tables 6 and 7, and in the sequence listing as summarized at Table 8.

TABLE 4

Binding Parameters for Selected Antibodies of the Present Invention

| | pH 7.4 | | | pH 6.0 | | | Ratio (APBP) | | |
|---|---|---|---|---|---|---|---|---|---|
| | $k_a$(1/Ms) × $10^5$ | $t_{1/2}$ (s) | $K_D$ (nM) | $k_a$(1/Ms) × $10^5$ | $t_{1/2}$ (s) | $K_D$ (nM) | $k_{a\,6/7.4}$ | $t_{1/2\,6/7.4}$ | $K_{D\,7.4/6}$ |
| ipi | 7.7 | 41 | 22 | 8.8 | 39 | 21 | 1.1 | 0.9 | 1 |
| ipi.1 | 8.4 | 96 | 8.6 | 9.6 | 94 | 7.7 | 1.1 | 1 | 1.1 |
| ipi.2 | 8.8 | 136 | 5.8 | 12 | 83 | 6.8 | 1.4 | 0.6 | 0.9 |
| ipi.3 | | short | 97 | 11 | 9 | 76 | nd | nd | 1.3 |
| ipi.7 | 10.0 | 462 | 1.5 | 12 | 347 | 1.7 | 1.1 | 0.7 | 0.8 |

TABLE 4-continued

Binding Parameters for Selected Antibodies of the Present Invention

| | pH 7.4 | | | pH 6.0 | | | Ratio (APBP) | | |
|---|---|---|---|---|---|---|---|---|---|
| | $k_a$(1/Ms) × 10$^5$ | $t_{1/2}$ (s) | $K_D$ (nM) | $k_a$(1/Ms) × 10$^5$ | $t_{1/2}$ (s) | $K_D$ (nM) | $k_{a\ 6/7.4}$ | $t_{1/2\ 6/7.4}$ | $K_{D\ 7.4/6}$ |
| ipi.17 | 8.5 | 43 | 19 | 10 | 46 | 14 | 1.2 | 1.1 | 1.3 |
| ipi.18 | 6.4 | 39 | 28 | 11 | 75 | 8.8 | 1.7 | 1.9 | 3.1 |
| ipi.20 | 7.9 | 11 | 84 | 16 | 14 | 32 | 2.0 | 1.3 | 2.6 |
| ipi.25 | 7.2 | 39 | 25 | 12 | 90 | 6.2 | 1.7 | 2.4 | 4.1 |
| ipi.57 | 8.0 | 32 | 28 | 11 | 83 | 7.9 | 1.3 | 2.7 | 3.5 |
| ipi.59 | 8.1 | 41 | 21 | 10 | 63 | 11 | 1.3 | 1.5 | 1.9 |
| ipi.64 | 7.8 | 25 | 37 | 14 | 182 | 2.7 | 1.8 | 7.6 | 13 |
| ipi.66 | 7.0 | 36 | 26 | 12 | 161 | 3.5 | 1.8 | 4.3 | 7.6 |
| ipi.69 | 8.2 | 30 | 28 | 11 | 144 | 4.4 | 1.3 | 4.7 | 6.3 |
| ipi.71 | 7.4 | 24 | 39 | 15 | 289 | 1.6 | 2.0 | 12.2 | 25 |
| ipi.82 | | short | 130 | 14 | 16 | 31 | nd | nd | 4.4 |
| ipi.84 | | short | 120 | 13 | 35 | 16 | nd | nd | 7.7 |
| ipi.86 | | short | 180 | 16 | 36 | 12 | nd | nd | 15 |
| ipi.88 | | short | 170 | 20 | 53 | 6.5 | nd | nd | 27 |
| ipi.90 | | short | >1000 | 19 | 10 | 36 | nd | nd | >28 |
| ipi.92 | | short | >1000 | 18 | 22 | 17 | nd | nd | >59 |
| ipi.93 | | short | 210 | 17 | 32 | 13 | nd | nd | 16 |
| ipi.94 | | short | 270 | 19 | 70 | 5.2 | nd | nd | 52 |
| ipi.95 | | short | 280 | 19 | 126 | 2.8 | nd | nd | 99 |
| ipi.100 | 4.6 | 33 | 46 | 9.4 | 289 | 2.5 | 2.1 | 8.8 | 17 |
| ipi.101 | 4.9 | 32 | 45 | 12 | 385 | 1.5 | 2.5 | 12 | 31 |
| ipi.105 | fast | short | 390 | 13 | 217 | 2.5 | | | 76 |
| ipi.106 | weak binding | weak binding | >350 | 12 | 33 | 18 | | | >20 |

Figure 8A:
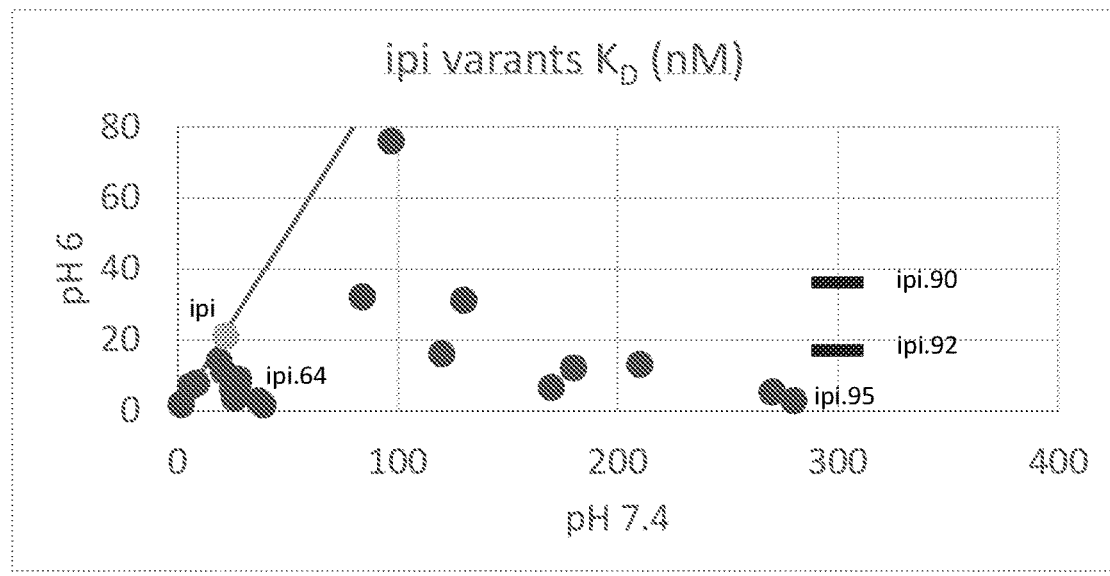
FIGS. 8A, 8B and 8C provide plots of binding of various antibodies of the present invention at pH 6.0 and pH 7.4.
Figure 8B:
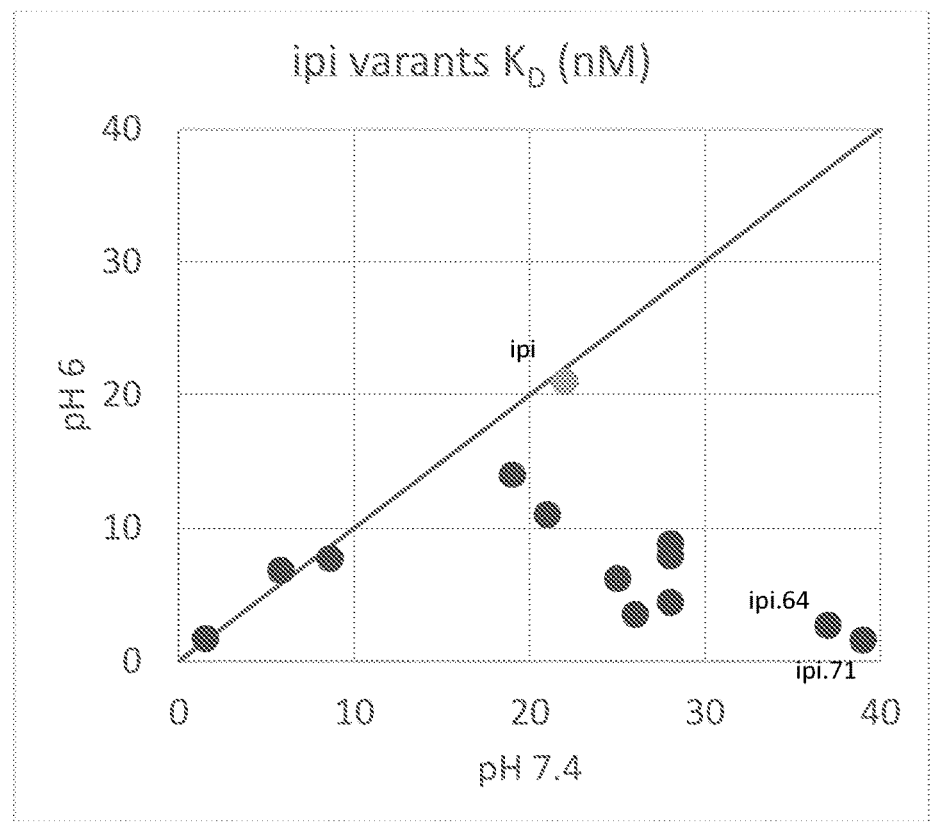
Figure 8C:
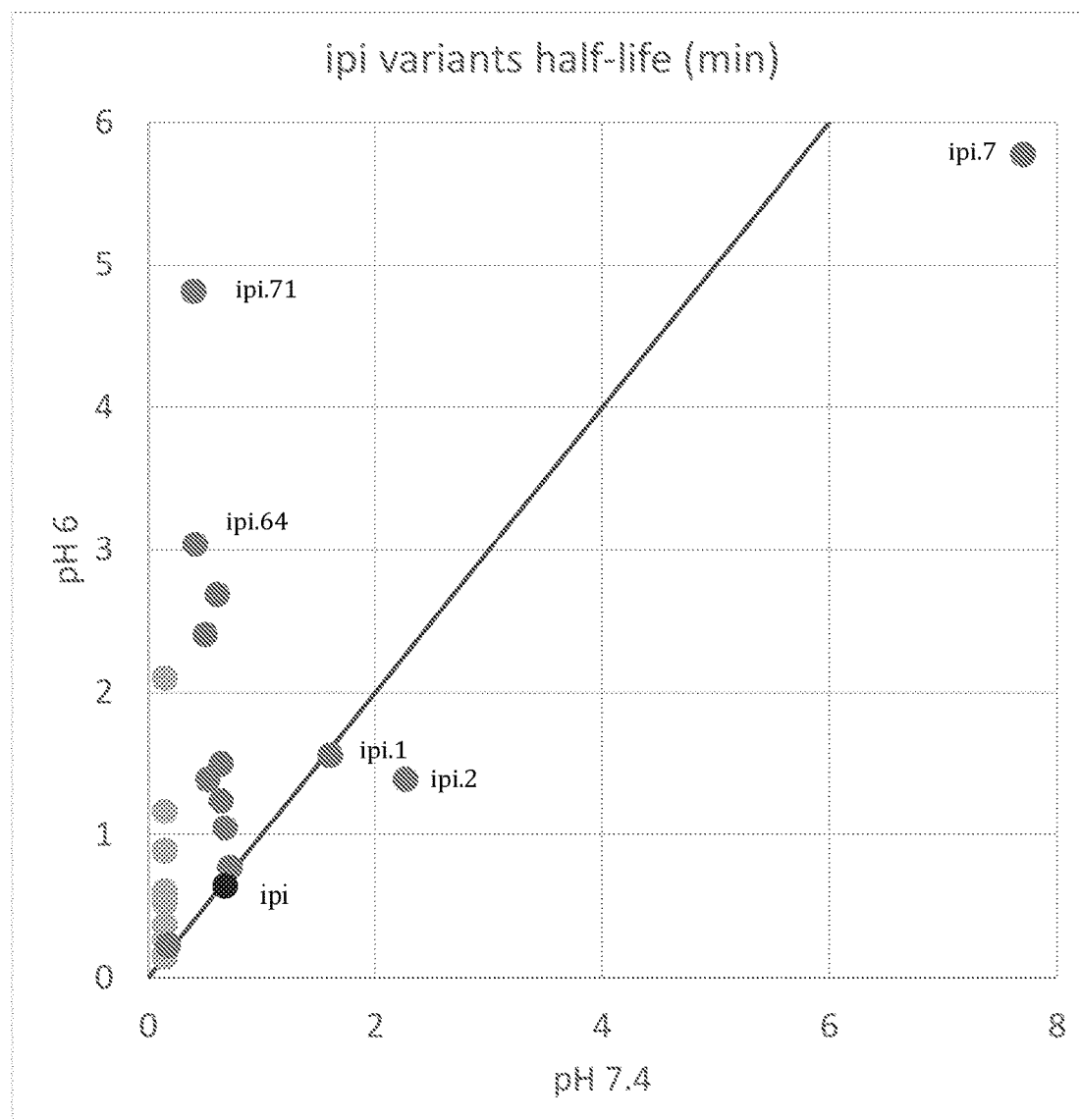
Figure 9:
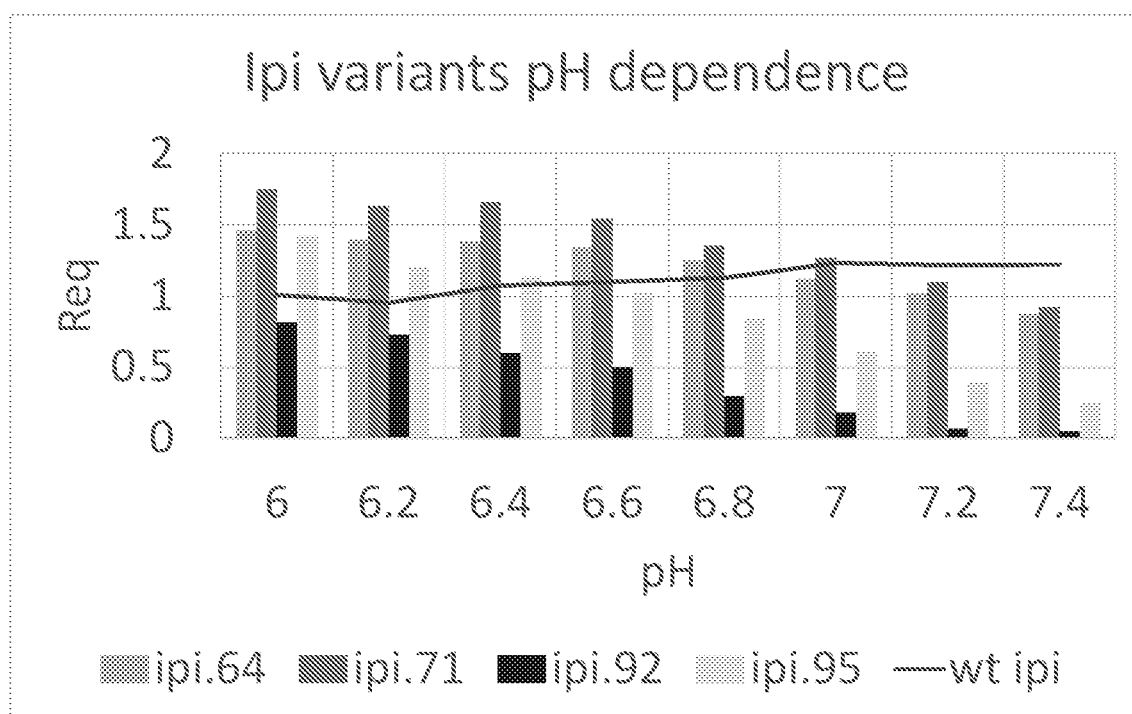
FIG. 9 shows the pH dependence of binding of selected ipilimumab variants of the present invention to CTLA-4. Binding is presented as Req, which is a measure of the steady state binding in a surface plasmon resonance, as a function of pH, with data presented (from left to right) for antibodies ipi.64, ipi.71, ipi.92, and ipi.95 for each pH. Data for ipilimumab are provided as a line, as indicated in the legend. For all ipilimumab sequence variants, affinity decreases with increasing pH, as compared with ipilimumab which binds similarly at all measured pHs. See Example 2.
Figure 10A:
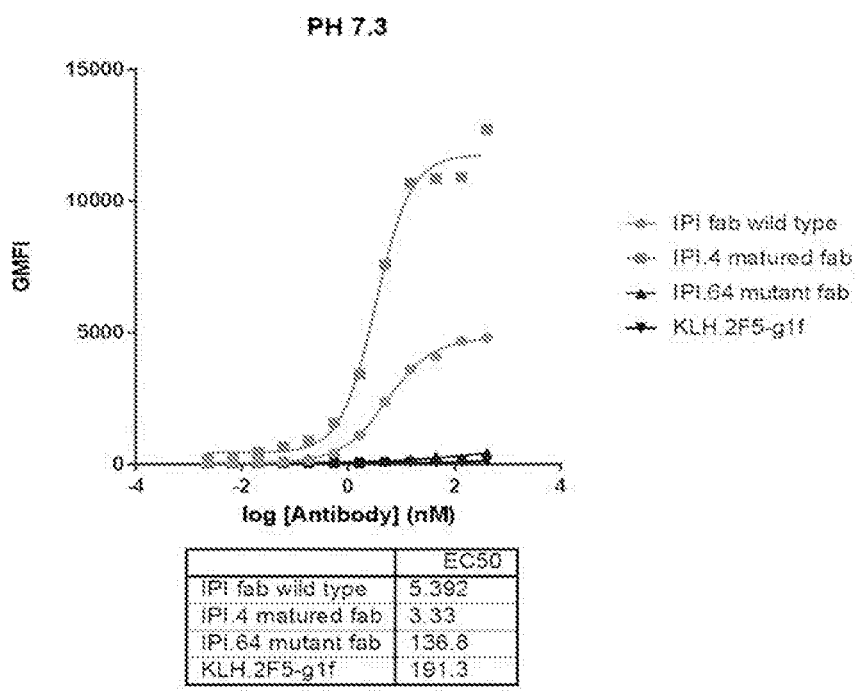
FIGS. 10A and 10B shows binding of various antibodies, as Fab fragments, to 58 α-β-CTLA-4/CD3 ζ cells at pH 7.3 (FIG. 10A) and pH 6.0 (FIG. 10B). See Example 5. Ipilimumab (IPI fab wild type, •) binds similarly as measured by arbitrary fluorescence intensity units (GMFI) at both pHs (EC50 of 5.4 nM at pH 7.3 and 7.1 nM at pH 6.0), whereas ipilimumab sequence variant ipi.64 (IPI.64 mutant fab, ▲) binds well at pH 6.0 (3.3 nM) but poorly if at all at pH 7.3 (140 nM). See Example 5.
Figure 10B:
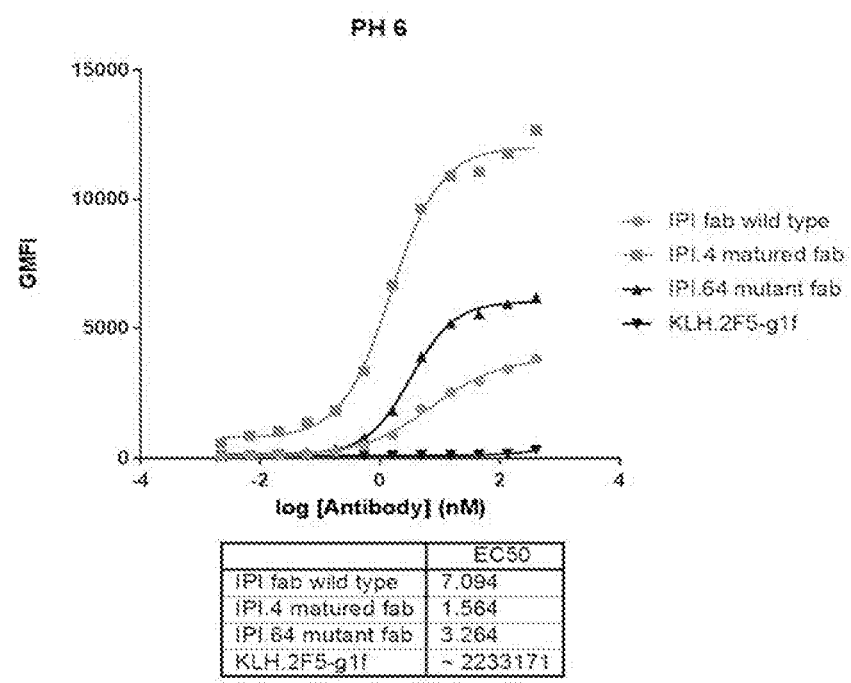
Figure 11A:
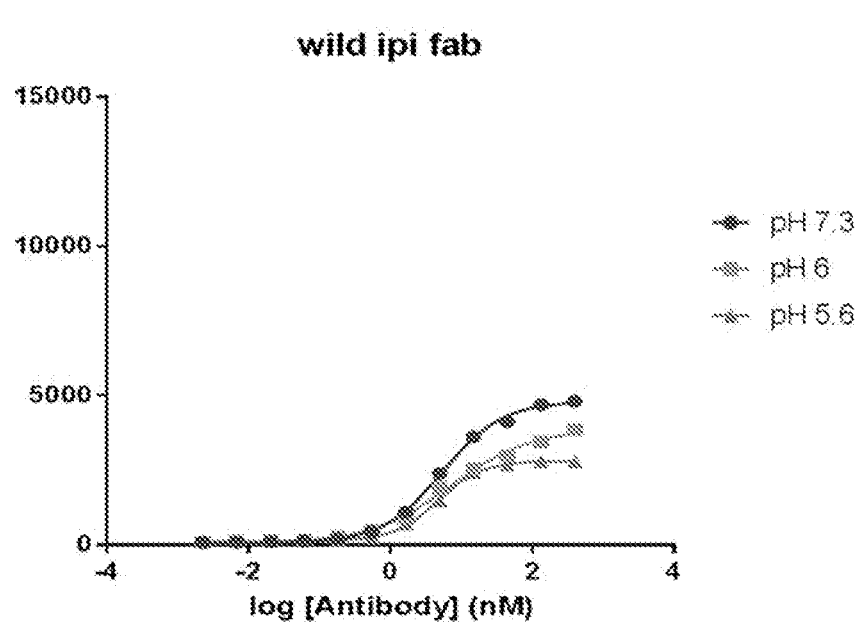
FIGS. 11A and 11B show results similar to those shown in FIGS. 10A and 10B, except that data are grouped by antibody rather than pH, and additional data are provided for pH 5.6. As with FIGS. 10A and 10B, it is apparent that ipilimumab sequence variant ipi.64 binds much better at pH 6.0 (■) compared with pH 7.3 (•), whereas ipilimumab binds similarly. See Example 5.
Figure 11B:
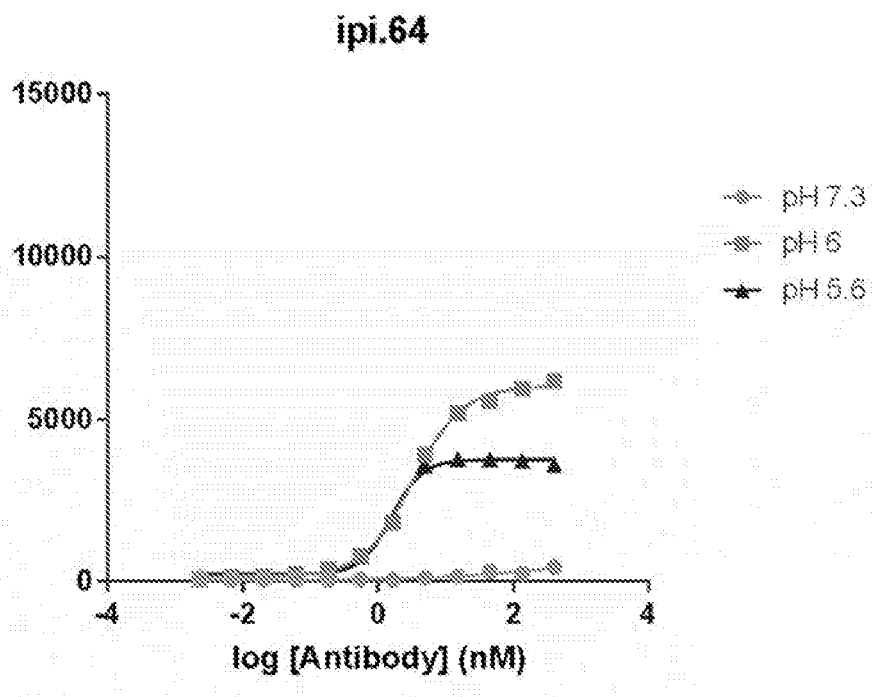

Plots of binding data for selected antibodies are provided at FIGS. 8A-8C. Such plots provide convenient visual assessment of the relative binding preferences at pH 6.0 and pH 7.4. Several antibodies of the present invention exhibited dramatically enhanced preference for binding at pH 6.0 compared with pH 7.4, such as ipi.64, ipi.71, ipi.92 and ipi.95. See FIG. 9. All of these antibodies include LCDR1 S30D (per Kabat numbering), which was selected despite S30E being favored in the selections (FIGS. 4A and 4B) because the light chain S27aE S30D had 5-fold preference (as measured by $K_D$) for binding at pH 6.0 compared to 7.4 whereas S27aE S30E had only a 3.4-fold preference. Nevertheless, variants of ipi.64, ipi.71, ipi.92 and ipi.95 having S30E mutations in LCDR1 rather than S30D are provided as ipi. 100, ipi. 101, ipi. 106 and ipi. 105, respectively. The reversion from D to E at position 30 (per Kabat) in LCDR1 was made to eliminate a sequence ("DS") giving rise to unwanted isomerization.

Example 3

Surface Plasmon Resonance (SPR) Spectroscopic Determination of Binding Parameters for Antibodies of the Present Invention Surface plasmon resonance spectroscopy (SPR) was used to determine binding parameters for various ipilimumab sequence variants of the present invention to human CTLA-4 essentially as follows. Unless otherwise indicated, experiments were performed with a BIACORE® SPR surface plasmon resonance spectrometer (Biacore AB, Uppsala, Sweden). Antibodies were tested as monovalent Fab fragments to simplify analysis. Data may be provided as sensorgrams, as in FIGS. 5A, 5B, 7A and 7B, or summarized as binding parameters such as the equilibrium dissociation binding constant ($K_D$), association/on-rate constant ($k_a$, $k_{on}$), dissociation/off-rate constant ($k_d$, $k_{off}$), and/or half-life ($t_{1/2}$).

Briefly, ipilimumab variants of the present invention were produced as Fab fragments and captured on a BIACORE® CM4 chip with immobilized anti-human kappa polyclonal capture antibody. Monomeric human CTLA-4 was flowed as analyte with up to 2 µM top concentration. Between cycles, the capture surface was regenerated with 75 mM phosphoric acid. Experiments were run on a BIACORE™ T200 instrument at 37° C. Running buffers were HEPES buffered saline for pH 7.4 experiments and Bis-Tris buffered saline for lower pH experiments. All buffers were supplemented with 0.05% Tween-20 and 1 g/L BSA. Double referenced sensorgrams were fitted to a 1:1 Langmuir binding model with mass transport to determine equilibrium dissociation constants ($K_D$), as well as association ($k_a$) and dissociation ($k_d$) rate constants where appropriate.

Example 4

Mutations to Decrease Affinity Generally

A T95H substitution (per Kabat numbering) in HCDR3 was discovered to de-tune (generally decrease) affinity of ipilimumab for CTLA-4, generating antibody ipi.3. Exemplary sensorgrams are provided at FIG. 7A (pH 7.4) and 7B (pH 6.0). As is apparent from Table 2, T95H decreased affinity (increased $K_D$) approximately four-fold at both pH 6.0 and 7.4, leading to little if any enhancement in preferential binding at low pH, with $K_{D-7.4}/K_{D-6.0}$ of 0.9 compared to 1.0 for ipilimumab. Nevertheless, this mutation was combined with other mutations in various antibodies of the present invention that increased the preference for binding at low pH (i.e. ipi.57, ipi.69, ipi. 64, ipi.71, ipi.94, ipi.95 and ipi. 105 became ipi.82, ipi.84, ipi.86, ipi.88, ipi.90, ipi.92 and ipi. 106, respectively). See Table 7. Without intending to be limited by theory, it was hypothesized that incorporation of the T95H substitution could mitigate dose-limiting toxicity (presumably driven by binding at pH 7.4) even if such substitution also impacted affinity at low pH (in the tumor microenvironment).

Example 5

Binding of Antibodies of the Present Invention to CTLA-4 on Cells

Additional experiments were performed to confirm that the selected antibodies of the present invention bind, and exhibit enhanced preference for binding at low pH, on the surface of cells (and not just in in vitro binding assays). Briefly, antibody ipi.64 was expressed as a Fab fragment and IgG and bound to 58 α-β-CTLA-4/CD3 ζ cells in serial dilutions at pH 6.3, 6.6, and 7.2. Cells were incubated with antibody for one hour at 4° C., washed in respective buffer, and bound antibody was detected. Results are provided at FIG. 10A (pH 7.3) and FIG. 10B (pH 6.0). Antibody ipi.64 greatly reduced binding at pH 7.3, but enhanced binding at pH 6.0, compared with the ipilimumab Fab. See FIGS. 11A and 11B. Such an ipilimumab sequence variant would be expected to exhibit lower peripheral binding, and thus less fewer toxic side-effects, compared with ipilimumab, while retaining (or even improving) affinity and activity in the acidic tumor microenvironment. Such an antibody may be administered at the same dose as ipilimumab (e.g. approximately 3 mg/kg) with an expectation of enhanced safety, or may be administered at a higher (more efficacious) dose before hitting dose-limiting toxicity (e.g. 10 mg/kg or more). Ipilimumab is known to be more efficacious at 10 mg/kg but is not dosed at this level in unresectable or metastatic melanoma settings due to toxicity (although it is administered at 10 mg/kg for adjuvant melanoma use).

Analogous experiments were performed to compare binding antibodies ipi.64 and ipi.71 at pH 6.3, 6.6 and 7.2. Results using Fab fragments of the antibodies as provided at FIGS. 12A, 12B and 12C, whereas results with full-length IgG mAbs are provided at FIGS. 13A, 13B and 13C.

Figure 12A:
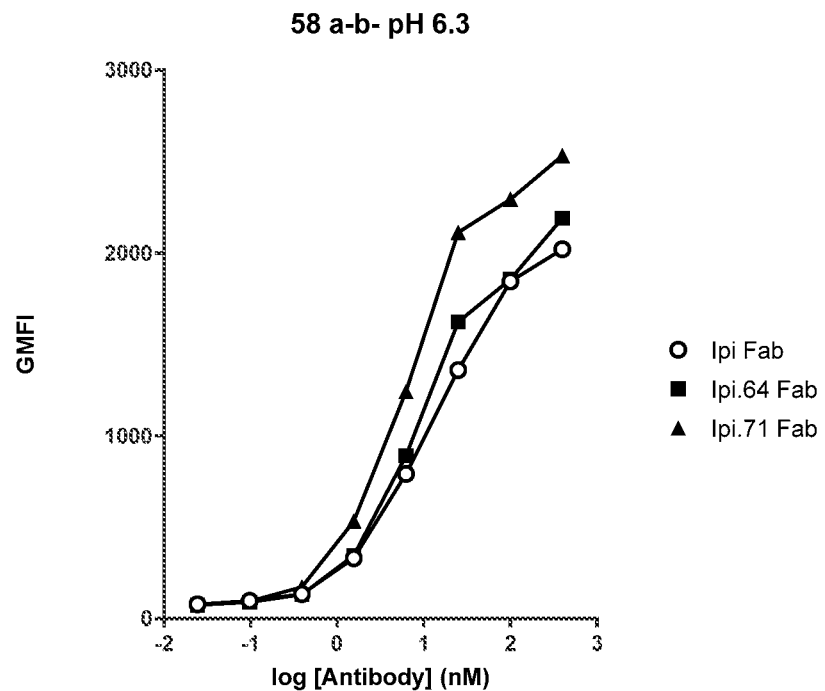
FIGS. 12A, 12B and 12C shows binding of various antibodies of the present invention, as Fab fragments, to 58 α-β-CTLA-4/CD3 & cells at pH 6.3 (FIG. 12A), pH 6.6 (FIG. 12B) and pH 7.2 (FIG. 12C). As usual, ipilimumab Fab (•) binds similarly as measured by arbitrary fluorescence intensity units (GMFI) at all pHs, whereas ipilimumab Fab sequence variants ipi.64 (■) and ipi.71 (▲) exhibit preferential binding at low pH. See Example 5. Curves for ipilimumab Fab sequence variants ipi.64 (■) and ipi. 71 (▲) overlap in FIG. 12C.
Figure 12B:
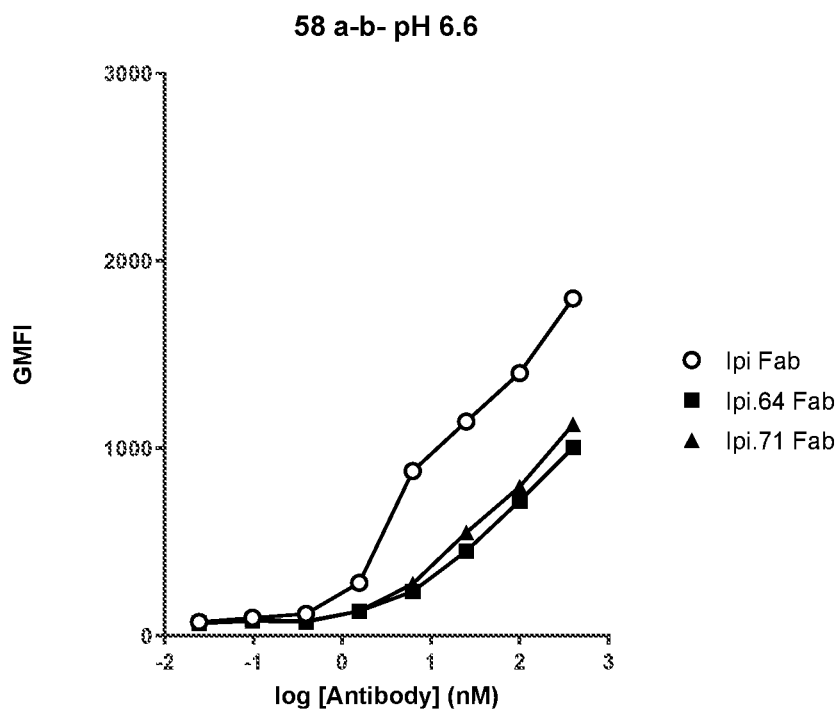
Figure 12C:
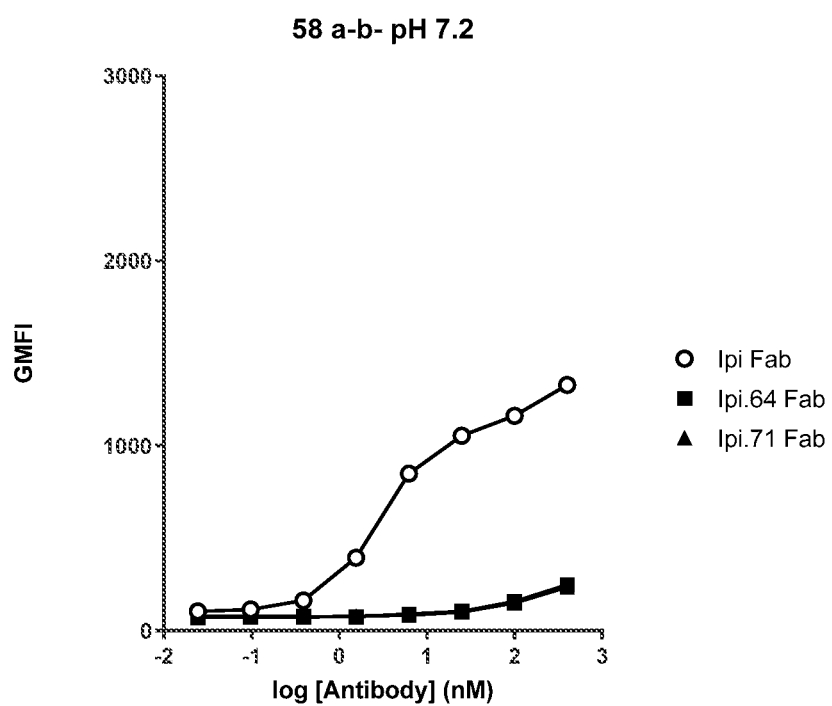

As illustrated at FIGS. 12A, 12B and 12C, when pH-optimized ipilimumab variants were studied in monovalent form as Fab fragments, variants ipi.64 and ipi.71 bound as well as ipilimumab at low pH but not at higher pH.

Figure 13A:
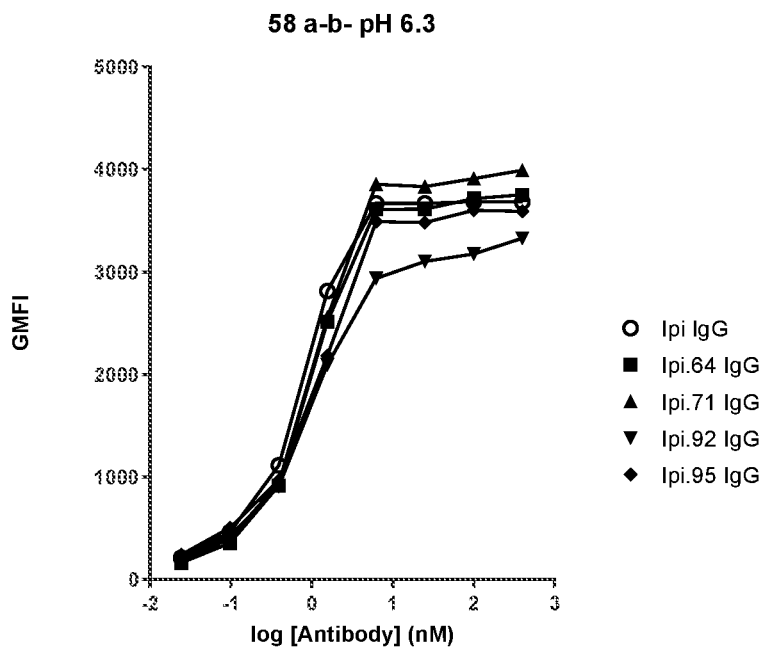
FIGS. 13A, 13B and 13C show results similar to those shown in FIGS. 12A, 12B and 12C except that data are obtained with full-length IgG antibodies rather than Fab fragments. As would be expected, the bivalent antibodies bind with higher avidity than the corresponding Fab fragments. Ipilimumab (•), ipi.64 (■) and ipi.71 (▲) bind indistinguishably from each other, and with similar avidity, at all pHs. See Example 5. Antibodies ipi.92 (▼) and ipi.95 (♦) exhibit preferential binding at low pH in this assay format, consistent with their high $K_{D\ 7.4/6}$ (APBP) values in Table 4 (>59 and 99, respectively).
Figure 13B:
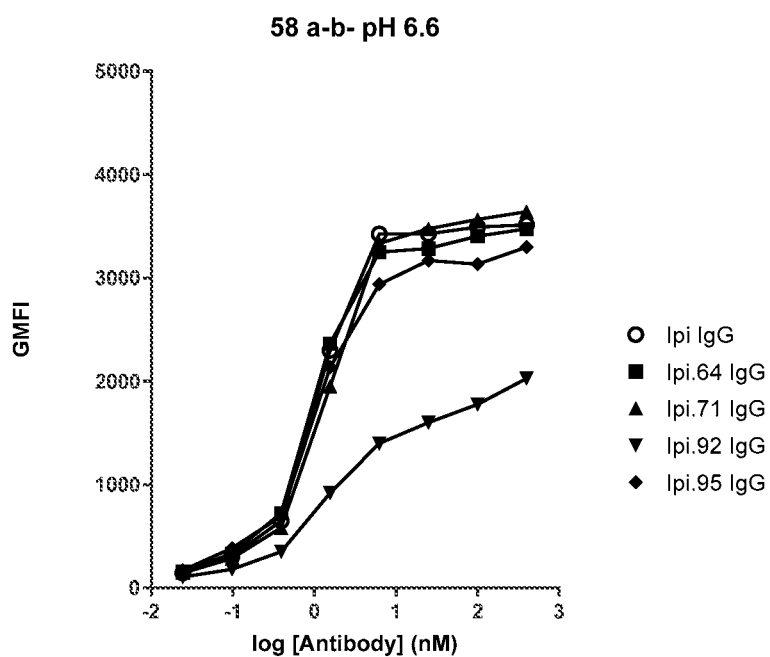
Figure 13C:
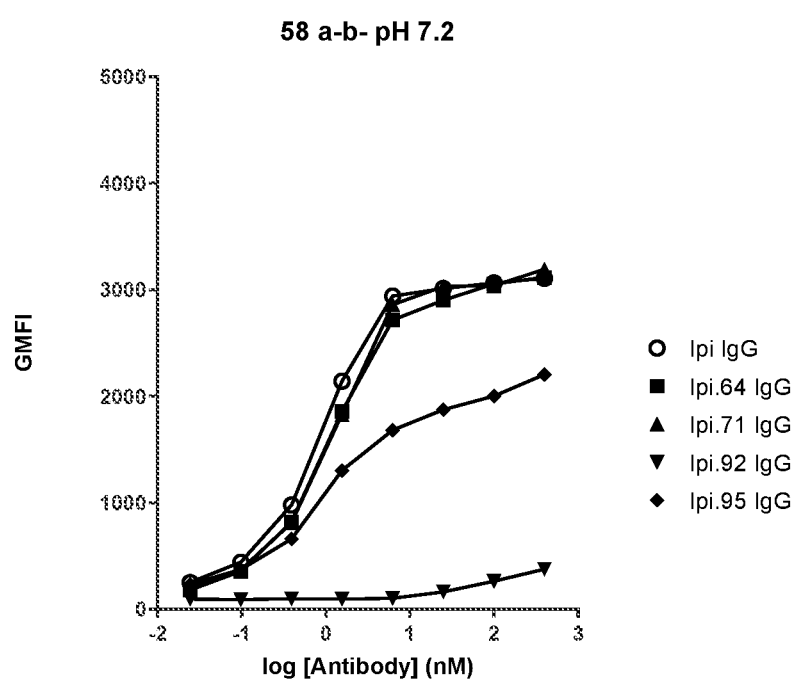

By contrast, as illustrated at FIGS. 13A, 13B and 13C, when pH-optimized ipilimumab variants were studied in bivalent form as full antibodies (IgG), variants ipi.64 and ipi.71 maintain their high affinity at high pH, masking any pH preference, whereas variants ipi.95 and ipi.92 (especially) bound poorly at high pH.

Additional experiments were performed to determine the pH dependence of binding of non-fucosylated IgG1 forms of ipi.64, ipi. 100, ipi. 101, ipi. 106 and ipi. 105 to 58αβ-CTLA4/mCD3ζ cells. Antibodies were titrated from 100 μg/mL at a 1:4 dilution across 12 points in pH-specific buffers and incubated for 30-60 minutes. Buffers contained HBSS, 2% FBS$^{HI}$, 0.02% sodium azide, 2 mM EDTA, and sodium phosphate buffer (pH 5.4). Sodium phosphate buffer was added until desired pH was reached (7.2, 6.7, 6.2). Approximately 3e5 cells/well were tested for each cell line. All binding and washing steps were performed in their respective pH-specific buffers. Detection was done with a monovalent anti-hKappa secondary nanobody conjugated to Alexa647 and used at a dilution of 1:2000. Cells were fixed with BD Fix Solution I for 30 minutes prior to resuspension in pH-specific buffers and reading on the cytometer (BD Fortessa). Results are provided at FIG. 16A (pH 7.2), 16B (pH 6.7) and 16C (pH 6.2), and EC50 values are provided at Table 5. Antibodies ipi. 105 and ipi. 106 show increased binding with decreasing pH.

TABLE 5

Binding Parameters for Selected Antibodies of the Present Invention

| Antibody | EC50 (nM) pH 7.2 | EC50 (nM) pH 6.7 | EC50 (nM) pH 6.2 |
| --- | --- | --- | --- |
| ipi | 1.84 | 2.35 | 2.76 |
| ipi.64 | 3.10 | 2.97 | 2.93 |
| ipi.100 | 2.80 | 2.85 | 2.94 |
| ipi.101 | 3.81 | 4.06 | 3.52 |
| ipi.106 | 11.5 | 4.37 | 3.15 |
| ipi.105 | 3.94 | 3.45 | 2.60 |

Additional experiments were performed to determine the pH dependence of binding of Fab forms of ipi. 100, ipi. 101, ipi. 106 and ipi. 105 to 58αβ-CTLA4/mCD3ζ cells. The experimental protocol was the same as used to obtain the data of FIGS. 16A-C. Results are provided at FIGS. 17A and 17B (pH 7.2), 17C and 17D (pH 6.7) and 17E and 17F (pH 6.2). As in other binding assays, ipilimumab shows very similar binding curves at regardless of pH. Antibodies ipi. 100 and ipi. 101 show enhanced binding at lower pH, with affinity generally near or exceeding that of ipilimumab. Antibodies ipi. 105 and ipi. 106, also show enhanced binding at lower pH, but with affinities lower than that of ipilimumab.

Example 6

Anti-Tumor Activity of Ipilimumab Variants of the Present Invention in Sa1N Fibrosarcoma Tumor Model The anti-tumor activity of ipilimumab sequence variants with enhanced preference for binding at low pH of the present invention is assessed in an immunogenic Sa1N fibrosarcoma tumor model. Human CTLA-4 knock-in A/J mice are subcutaneously injected with 2×10$^6$ with 2×10$^6$ Sa1N tumor cells per implant. After seven days, tumors are measured and mice are randomized into treatment groups so as to have comparable mean tumor volumes (e.g. 130-150 mm$^{3/2}$). Ipilimumab sequence variants of the present invention, as well as ipilimumab as a control, are administered IP on Days 7, 11 and 14 at 200 μg per dose in a volume of 200 μl. Tumor volume and markers of peripheral anti-CTLA-4 activity are measured at periodic intervals after Day 7 until the completion of the study. Peripheral anti-CTLA-4 activity in mouse tumor models is taken as a surrogate for toxicity in human subjects since such peripheral activity is responsible for dose-limiting side effects in patients treated with anti-CTLA-4 antibodies.

Antibodies that i) reduce tumor growth at least approximately as well as ipilimumab, and ii) exhibit less peripheral anti-CTLA-4 activity than ipilimumab, are candidates for development as improved human therapeutic agents for any disorder for which ipilimumab is approved or otherwise therapeutically effective.

Example 7

Anti-Tumor Activity of Ipilimumab Variants of the Present Invention in MC38 Tumor Model The anti-tumor activity of ipilimumab sequence variants with enhanced preference for binding at low pH of the present invention was assessed in the MC38 tumor model, as follows.

Tumor Model

Briefly, sixteen to eighteen-week-old male and female human CTLA-4 knock-in C57BL/6 mice were subcutaneously injected with 1×10⁶ MC38 cells. Mice were randomized into treatment groups eight days after tumor implantation once the tumors reached an average volume of 150 mm³. Ipi and pH sensitive ipi antibodies formulated in PBS were administered intravenously to the respective treatment groups for a single dose of 20, 60 or 200 µg per mouse nine days-post implantation. All anti-CTLA-4 antibodies administered in this example were non-fucosylated IgG1 antibodies. The control mice were treated with 200 µg anti-keyhole limpet hemocyanin antibody with a human IgG1-NF isotype. Tumors were measured every 2 to 5 days, and mice with ulcerated tumors and tumors greater than 2000 mm³ were removed from the study. To select mice for lymphocyte staining analysis, treated mice were randomized and euthanized fourteen days-post implantation. Mice with tumors that were unmeasurable during two or more consecutive measurements were considered tumor-free.

FIGS. 19A-19M show that pH sensitive antibodies ipi.64, ipi. 106 and ipi. 105 are as effective as ipilimumab in inhibiting tumor growth in a dose dependent manner.

Lymphocyte Staining Analysis

Peripheral anti-CTLA-4 activity in mouse tumor models is taken as a surrogate for toxicity in human subjects since such peripheral activity is responsible for dose-limiting side effects in patients treated with anti-CTLA-4 antibodies. Samples were taken from mice treated as above with selected pH sensitive ipi antibodies were taken from tumor and spleen to assess relative activity of the antibodies in the two environments, as follows.

Tumors and spleens were harvested from mice five days after treatment. Tumors were dissociated in gentleMACS C tubes (Miltenyi Biotec, Bergisch Gladbach, Germany) with 250 U/mL collagenase IV (Worthington Biochemical, Lakewood N.J., USA) and 100 µg/mL DNase I (Sigma-Aldrich, St. Louis Mo., USA) in HBSS supplemented with 5% heat-inactivated FBS (VWR, Radnor Pa., USA) and 5 mM $CaCl_2$) (VWR). Spleens were mechanically dissociated in gentleMACS C tubes (Miltenyi Biotec) and treated with red blood cell lysing buffer (Sigma-Aldrich). Cells were passed through 70 µm filters and resuspended in complete T cell media (RPMI-1640 supplemented with 10% heat-inactivated FBS, 50 U/mL penicillin/streptomycin, 2 mM L-glutamine, 50 µM β-mercaptoethanol, 2 mM sodium pyruvate and 10 mM HEPES). Cells were then stained with Zombie NIR fixable viability kit (Biolegend, San Diego Calif., USA) and treated with TruStain FcX (anti-mouse CD16/32) antibody (Biolegend) to block Fc receptor binding. For cell surface staining, cells were stained for CD45 (30-F11, BD Biosciences, San Jose Calif., USA), CD19 (6D5, Biolegend), CD4 (GK1.5, BD Biosciences), CD8 (53-6.7, Biolegend), and ICOS (7E.17G9, BD Biosciences) in eBioscience Flow Cytometry Staining buffer (ThermoFisher, Waltham Mass. USA). All cells were fixed and permeabilized with Foxp3/Transcription Factor Staining Buffer Set (ThermoFisher) and stained for FoxP3 (FJK-16s, ThermoFisher), Ki-67 (16A8, Biolegend) and human CTLA4 (BNI3, Biolegend, San Diego Calif., USA). Samples were analyzed on an LSRFortessa® flow cytometer (BD Biosciences). Flow data was analyzed using FlowJo® flow cytometry data analysis software with gates based on fluorescence minus one controls.

Figure 20A:
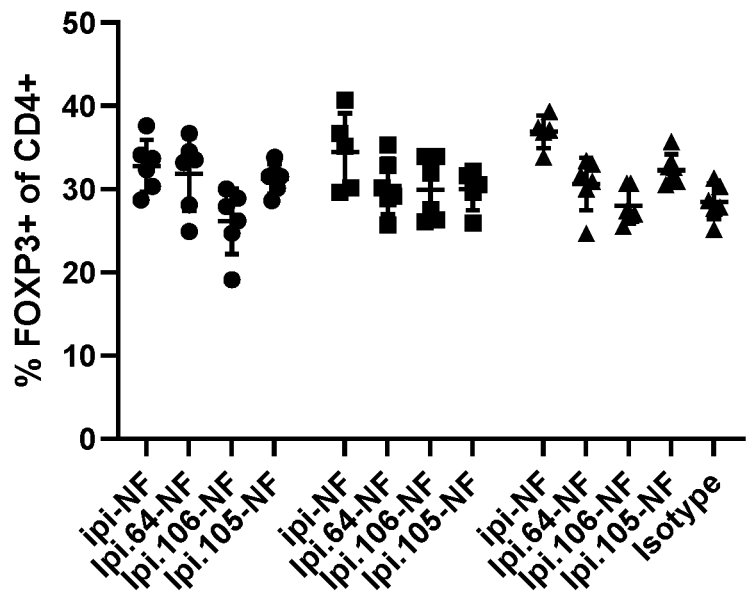
FIGS. 20A and 20B show the level of regulatory T cells, expressed as FoxP3+ cells as a percentage of all CD4+ T cells, in the spleen and in the tumor, respectively, in a mouse tumor model treated with selected pH sensitive anti-CTLA-4 antibodies of the present invention. See Example 7. Circles (( ) represent dosing at 1 mpk, squares (■) represent 3 mpk, and triangles (▲) represent 10 mpk in both figures. Mice were implanted with tumor cells and treated with selected antibody of the present invention as described with reference to FIGS. 19A-19M. Samples from spleen and from tumors were obtained, and the percentage of FoxP3+ cells among all CD4+ T cells was determined by flow cytometry. Non-fucosylated ipilimumab slightly increases the level of Tregs in the spleen compared with isotype control, whereas the pH sensitive antibodies of the present invention (ipi.64, ipi. 106 and ipi. 105) are more like isotype control in that they increase the level of Tregs little if at all.
Figure 20B:
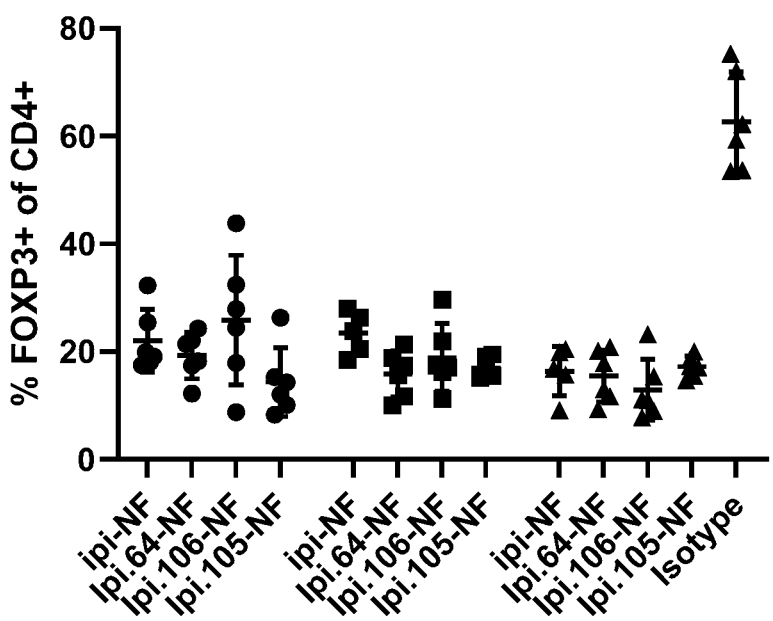
Figure 21A:
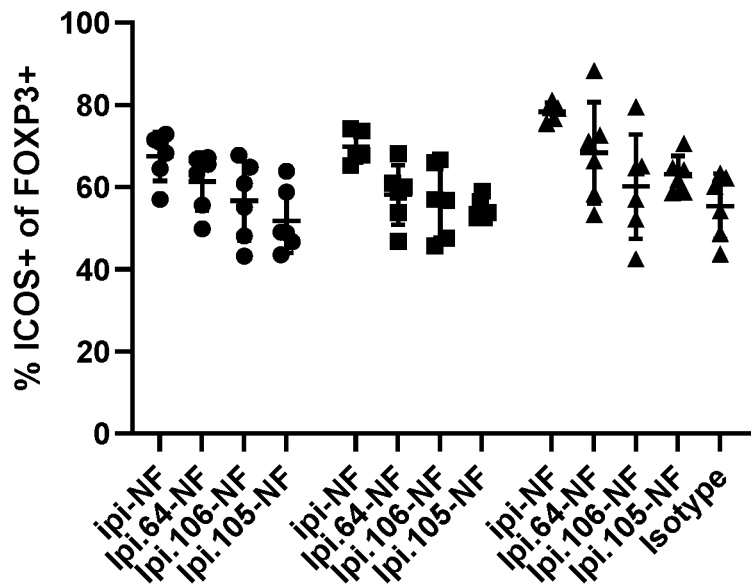
FIGS. 21A and 21B show T cell activation, as measured by the percentage of regulatory T cells that are ICOS+, and proliferation, as measured by the percentage of regulatory T cells that are Ki-67+, in spleens in a mouse tumor model treated with selected pH sensitive anti-CTLA-4 antibodies of the present invention as described with reference to FIGS. 20A and 20B. See Example 7. Circles (( ) represent dosing at 1 mpk, squares (■) represent 3 mpk, and triangles (▲) represent 10 mpk in both figures. Non-fucosylated pH sensitive ipilimumab variants show reduced peripheral activity compared to non-fucosylated ipilimumab in the spleen, as exhibited by the activation and proliferation markers ICOS and Ki-67, particularly at higher doses where the effects of non-fucosylated ipilimumab are more apparent.
Figure 21B:
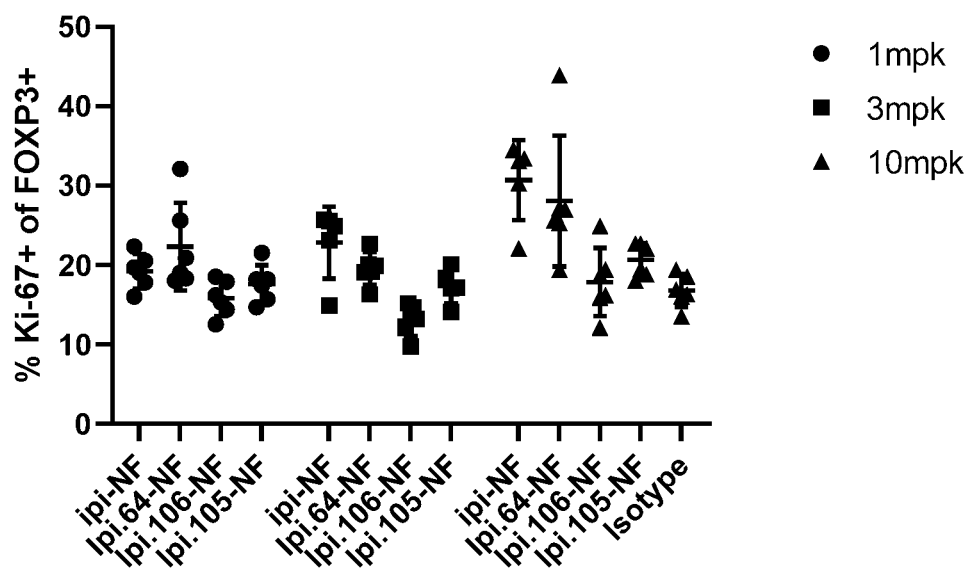

CTLA-4 blockade using anti-CTLA-4 antibodies results in expansion of $T_{regs}$ in peripheral sites such as the spleen or lymph nodes, which acts as a surrogate for toxicity. Selby et al. (2013) Cancer Immunol. Res. 1:32; Quezada et al. (2006) J. Clin. Invest. 116:1935. FIGS. 20A and 20B demonstrate that pH sensitive antibodies ipi.64, ipi. 106 and ipi. 105 reduce Treg levels in the tumor as effectively as ipilimumab (FIG. 20B), but they do not enhance Treg levels in the periphery (spleen) as much as ipilimumab (FIG. 20A, especially when dosed at 10 mpk). In addition, FIGS. 21A and 21B show that these same pH sensitive anti-CTLA-4 antibodies induce less activation, as measured by ICOS expression, and lower proliferation, as measured by Ki-67 expression, of Tregs in the periphery (spleen) than ipilimumab. See FIGS. 21A and 21B, respectively.

Antibodies that i) reduce tumor growth at least approximately as well as ipilimumab, and ii) exhibit less peripheral anti-CTLA-4 activity than ipilimumab as measured by expression of Ki-67 (Selby et al. (2013) Cancer Immunol. Res. 1:32) and ICOS (Liakou et al. (2008) Proc. Nat'l Acad. Sci. (USA) 105:14987), are candidates for development as improved human therapeutic agents for any disorder for which ipilimumab is approved or otherwise therapeutically effective. Antibodies ipi.64, ipi. 106 and ipi. 105 share these advantageous properties.

Example 8 pH Dependence of Binding Parameters of Ipilimumab Variants of the Present Invention The pH dependence of binding of selected antibodies of the present invention to human CTLA-4 and cyno CTLA-4 was measured by surface plasmon resonance (SPR) spectroscopy, essentially as described in Example 3. Briefly, antibodies were studied as monovalent Fab fragments. Anti-human kappa polyclonal capture antibody (Southern Biotech, Ala. USA) was immobilized on a ethylenediamine-blocked CM4 sensor chip in a Biacore T200 surface plasmon resonance system. Fab fragments of selected antibodies of the present invention were then captured on one flow cell each. Monomeric human CTLA4 or cyno CTLA-4 was flowed as analyte at 2 µM, 400 nM, 80 nM and 16 nM nominal concentration for each buffer condition. Running buffer was 20 mM BisTris, 150 mM NaCl, 0.05% Tween-20, 1 g/L BSA, at a pH ranging from 5.5 to 7.4 in 0.1-0.2 pH unit intervals (12 total). The surface was regenerated with 1/200 $H_3PO_4$ between cycles. All data were double-referenced and fitted to a 1:1 Langmuir binding model with transport limitation using the Biacore T200 Evaluation software. Where required, the $R_{max}$ was fixed by calculating expected binding based on capture level and apparent activity from other fits for the same Fab.

Figure 14A:
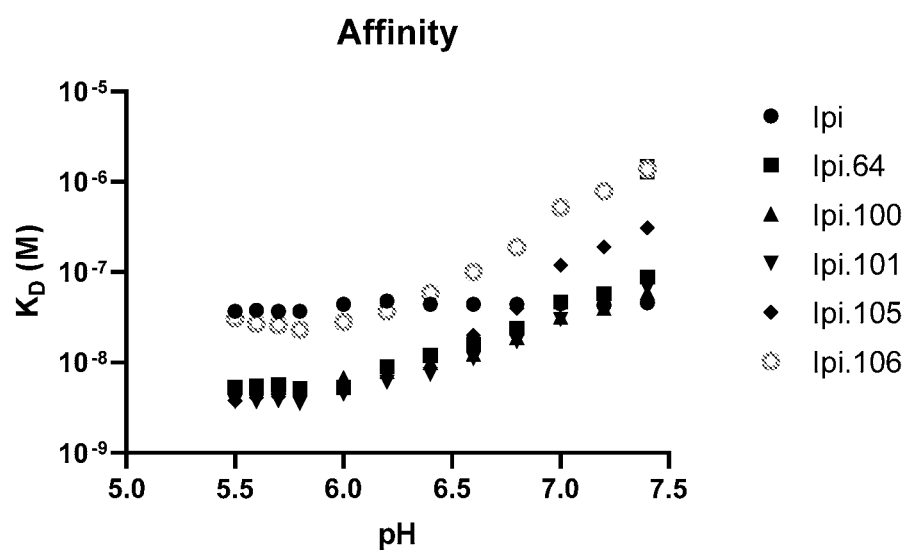
FIGS. 14A, 14B and 14C show pH titrations of the binding of selected antibodies of the present invention to human CTLA-4 as measured by surface plasmon resonance spectroscopy, providing equilibrium binding constant $K_D$, association/on-rate constant $k_{on}$, and dissociation/off-rate constant $k_{off}$, respectively. Ipilimumab (•) shows relatively little dependence on pH, whereas ipi.64 (■), ipi. 100 (▲), ipi. 101 (▼), ipi. 105 (♦) and ipi. 106 (*) all show substantial dependences on pH. See Example 8.

Results for human CTLA-4 are provided at FIG. 14A ($K_D$), 14B ($k_{on}$) and 14C ($k_{off}$). FIG. 14A shows the binding affinity ($K_D$) of Fab fragments of various antibodies of the present invention as a function of pH. Ipilimumab, as expected, shows little change as a function of pH. Antibodies ipi.64, ipi. 100, ipi. 101, ipi. 105 and ipi. 106 all show systematic decrease in affinity at higher pH. Ipi. 105 shows the largest difference in affinity between pH 5.5 and 7.5, with an affinity generally higher than ipilimumab. Ipi. 106 also shows nearly equivalent change in affinity with pH, but at much lower affinity over the entire range, with an affinity lower than ipilimumab above pH 6.5.

Figure 14B:
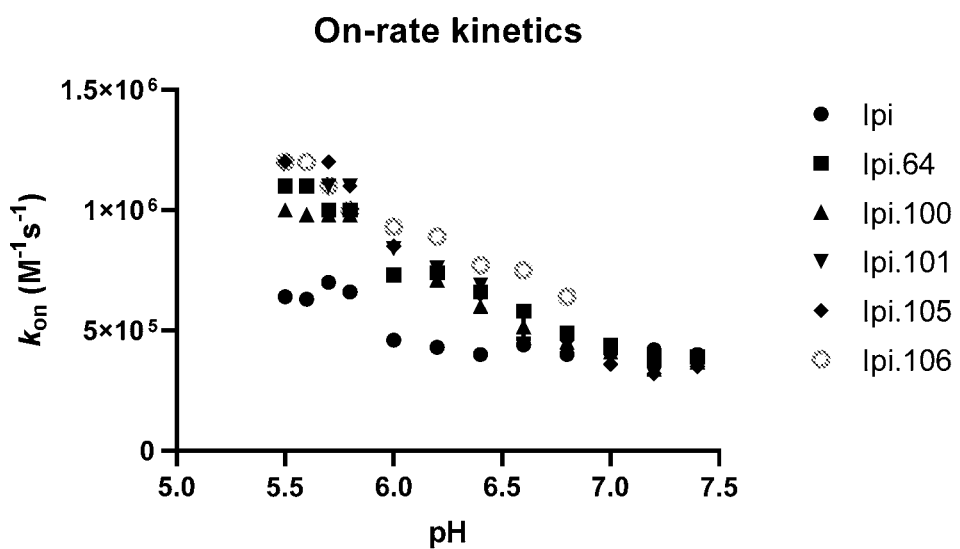
Figure 14C:
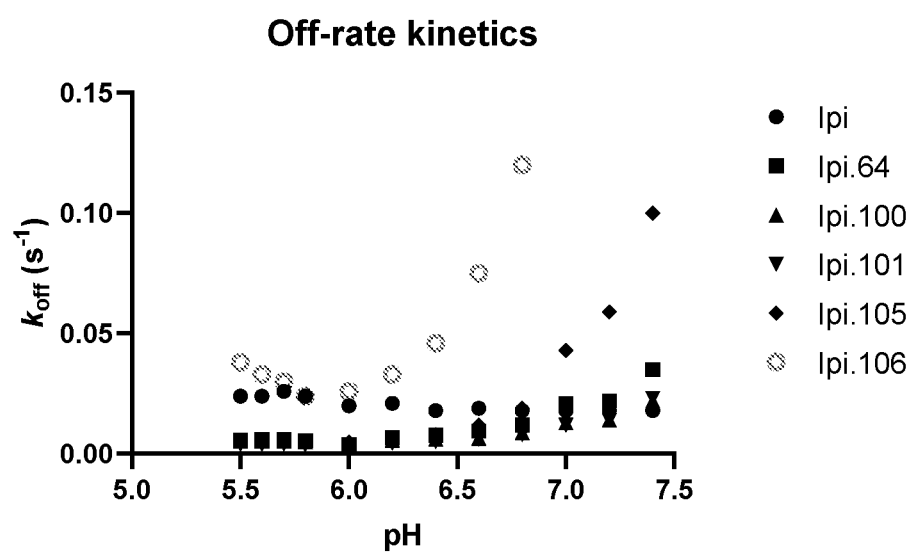

FIG. 14B and FIG. 14C show association/on-rate and dissociation/off-rate kinetic constants ($k_{on}$ and $k_{off}$) for the same Fab fragments as a function of pH. As with overall affinity, ipilimumab shows little difference in either constant as a function of pH. In contrast, the antibodies of the present invention all show a similar decrease in $k_{on}$ with increasing pH, but differ substantially in the dependence of $k_{off}$ on pH, with antibodies ipi. 105, and particularly antibody ipi. 106 showing a dramatic increase in $k_{off}$ at higher pH. These kinetic results show that the greater dependence of $K_D$ on pH for ipi. 105 and ipi. 106, compared with ipi.64, ipi. 100, ipi. 101, is driven by their increased $k_{off}$.

Figure 15A:
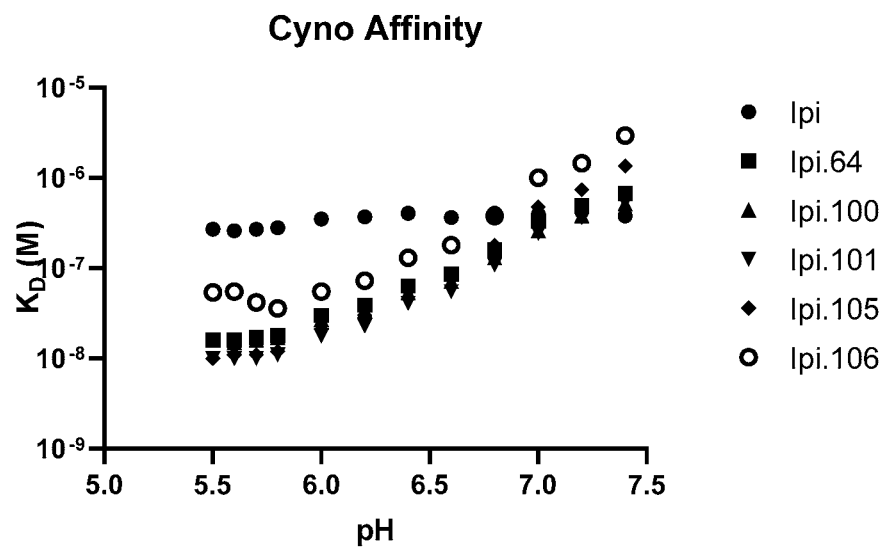
FIGS. 15A, 15B and 15C show pH titrations of the binding of selected antibodies of the present invention to cyno CTLA-4 (CTLA-4 from the cynomolgus macaque *Macaca fascicularis*) as measured by surface plasmon resonance spectroscopy, providing equilibrium binding constant $K_D$, association/on-rate constant $k_{on}$, and dissociation/off-rate constant $k_{off}$, respectively. Results are qualitatively similar to the results obtains with human CTLA-4, shown in FIGS. 14A-C, albeit at lower affinity. See Example 8.
Figure 15B:
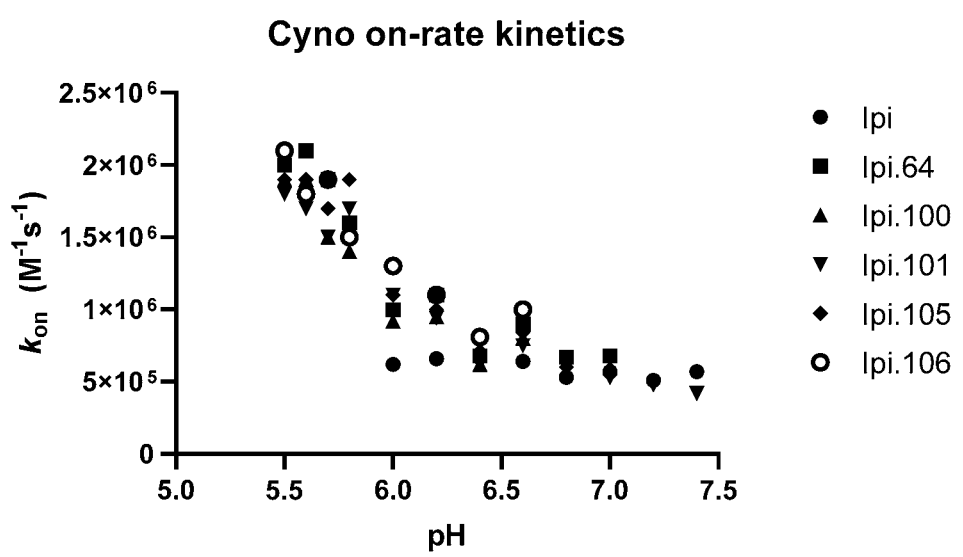
Figure 15C:
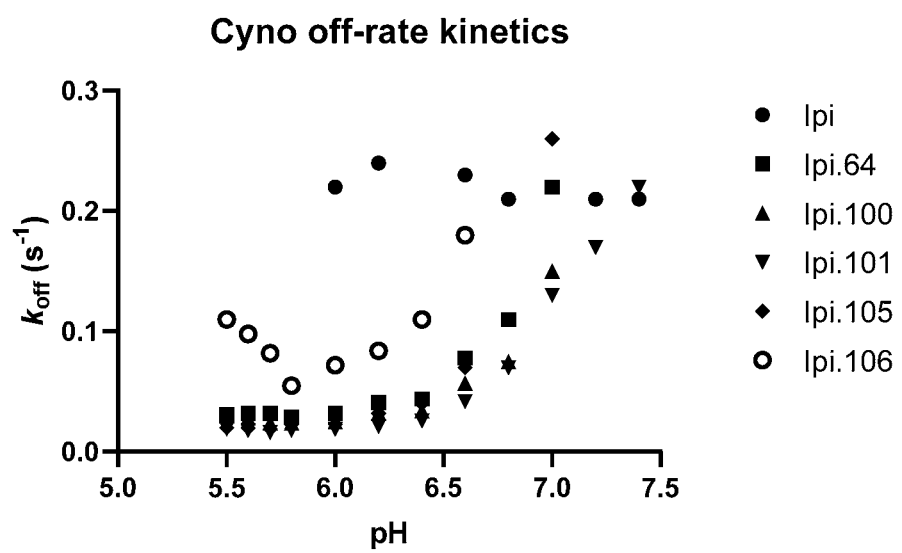
Figure 16A:
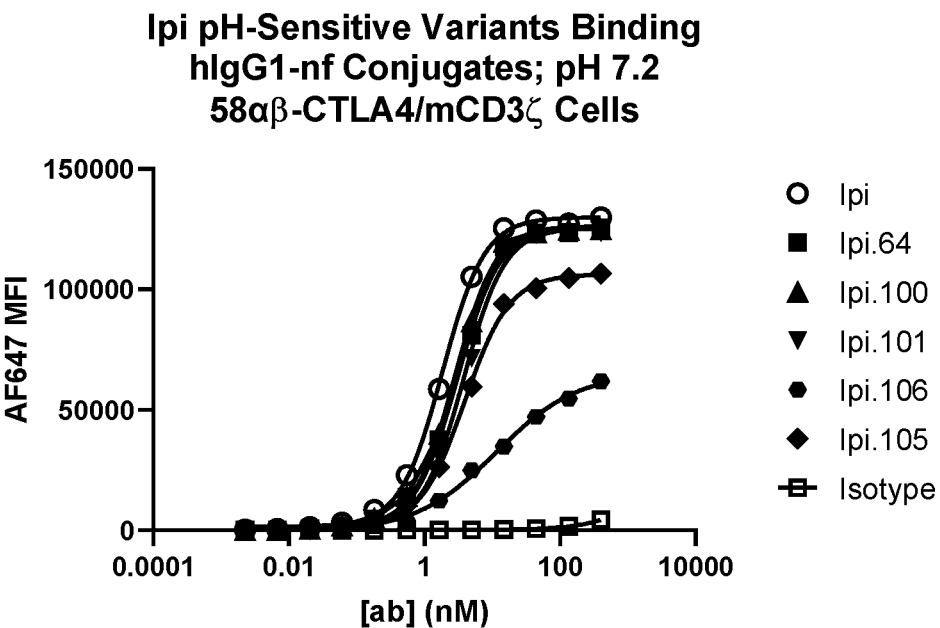
FIGS. 16A, 16B and 16C show results similar to those shown in FIGS. 13A, 13B and 13C except that data are obtained for additional antibodies of the present invention, and all are non-fucosylated. See Example 5. Data are provided for ipilimumab (*), ipi.64 (■) ipi.100 (▲), ipi. 101 (▼), ipi. 106 ((–filled hexagons) and ipi. 105 (♦) Antibodies ipi.105 and ipi. 106 exhibit preferential binding at low pH.
Figure 16B:
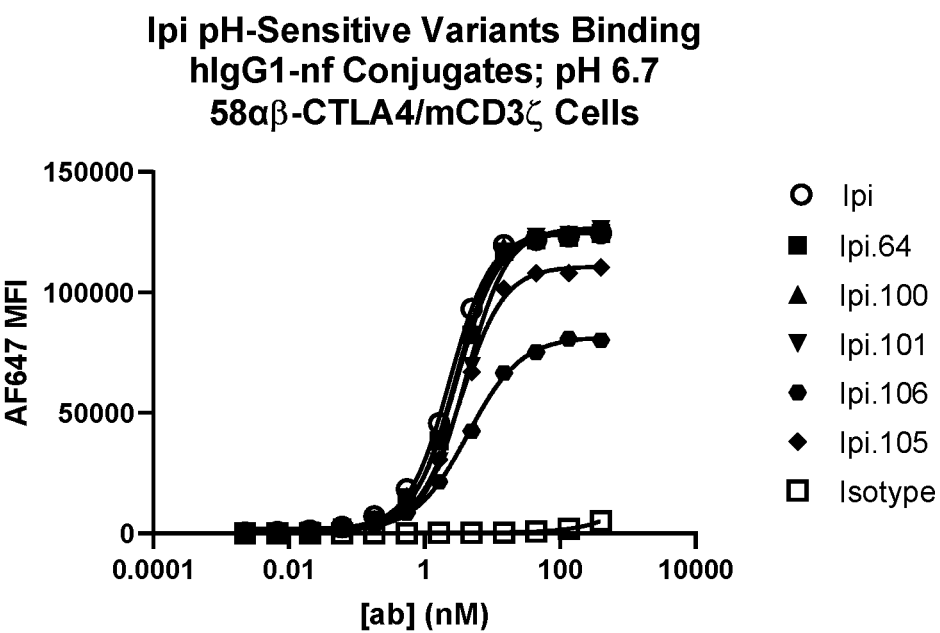
Figure 16C:
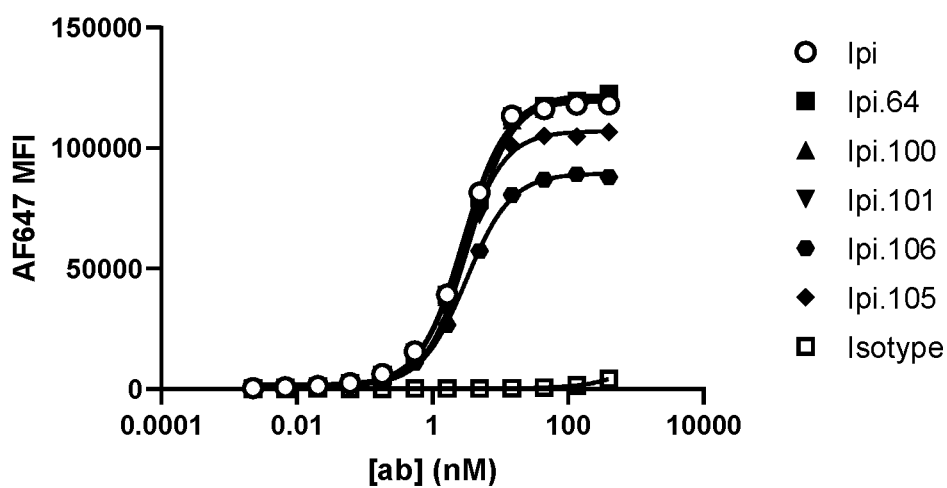
Figure 17A:
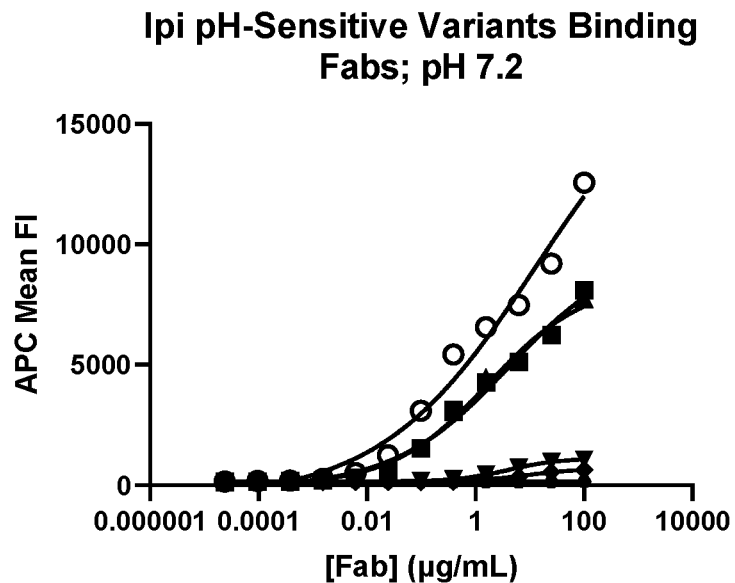
FIGS. 17A-F show results similar to those shown in FIGS. 16A-C except that data are obtained Fab fragments rather than non-fucosylated full length IgG1 antibodies. See Example 5.
Figure 17B:
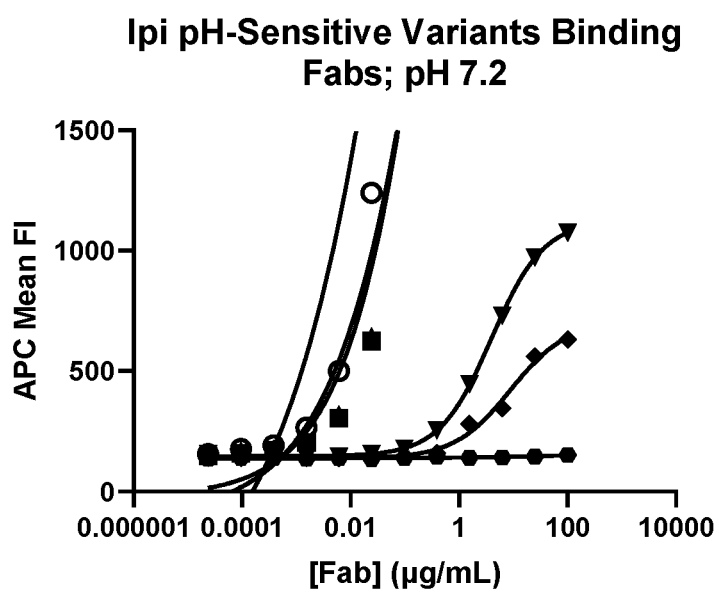
Figure 17C:
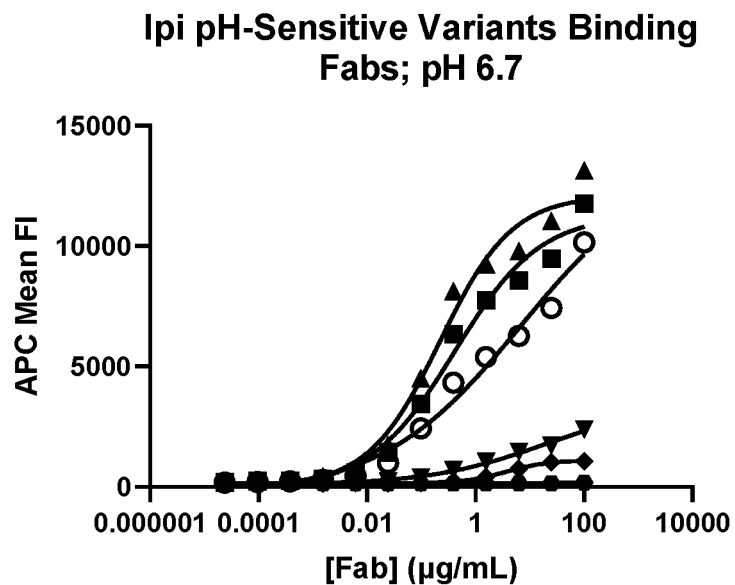
Figure 17D:
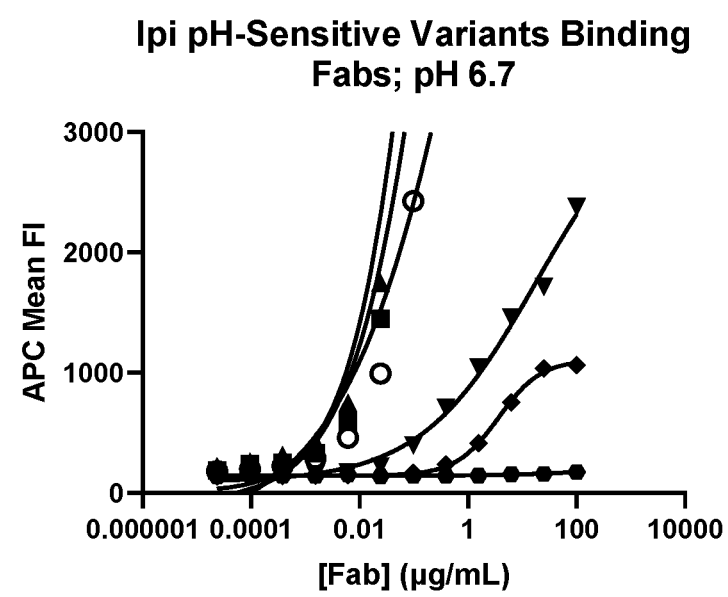
Figure 17E:
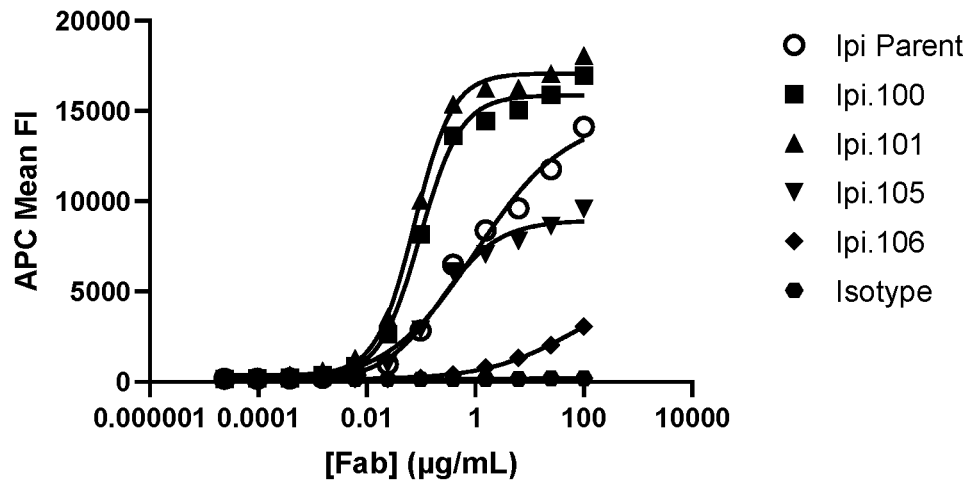
Figure 17F:
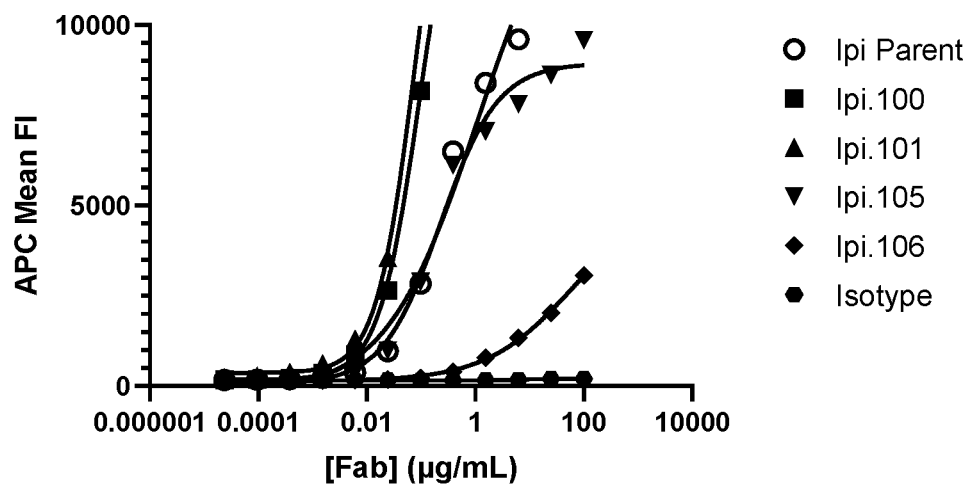
Figure 18A:
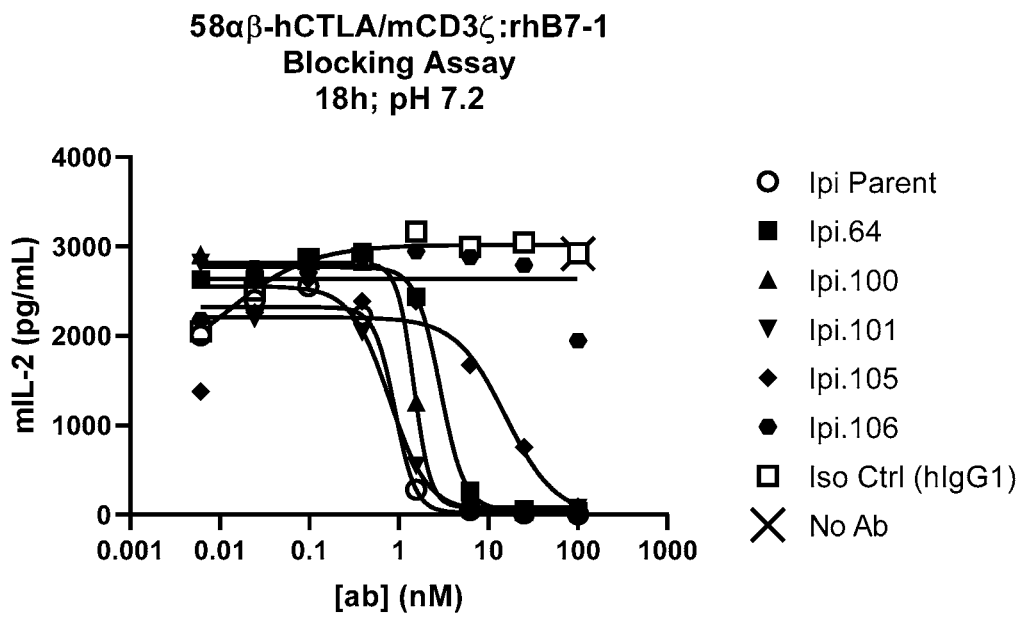
FIGS. 18A, 18B and 18C show results of a 58αβ-hCTLA/mCD3ζ: rhB7-1 blocking assay for selected antibodies of the present invention, expressed as non-fucosylated IgG1, at pH 7.2, 7.0 and 6.8, respectively. Data are provided for ipilimumab (*), ipi.64 (■), ipi.100 (▲), ipi. 101 (▼), ipi. 105 (♦), ipi. 106 ((–filled hexagons), an isotype control (3) and no antibody (X). Antibodies ipi.64, ipi. 100, and ipi101 are all nearly as effective as ipilimumab at blocking CTLA-4 binding to B7-1, as reflected by suppression of IL-2 secretion, at all pHs, with generally improved blocking at lower pH. Ipi. 105 is not as effective as ipilimumab at pH 7.2, but exhibits nearly equivalent blockade at pH 6.8. Ipi. 106 shows little if any activity at pH 7.2, but modest activity at pH 6.8. See Example 9.
Figure 18B:
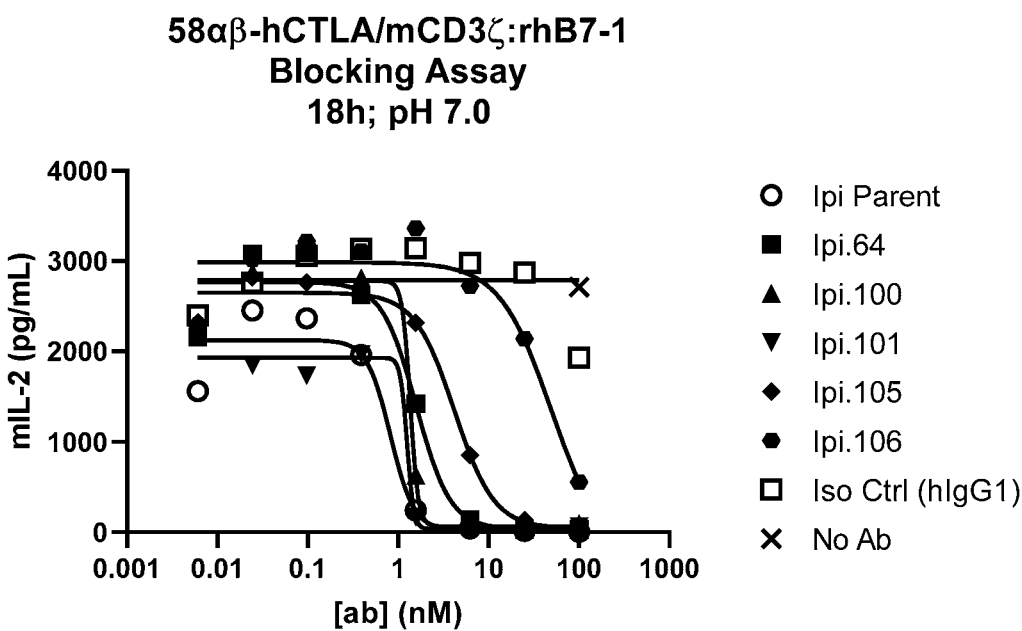
Figure 18C:
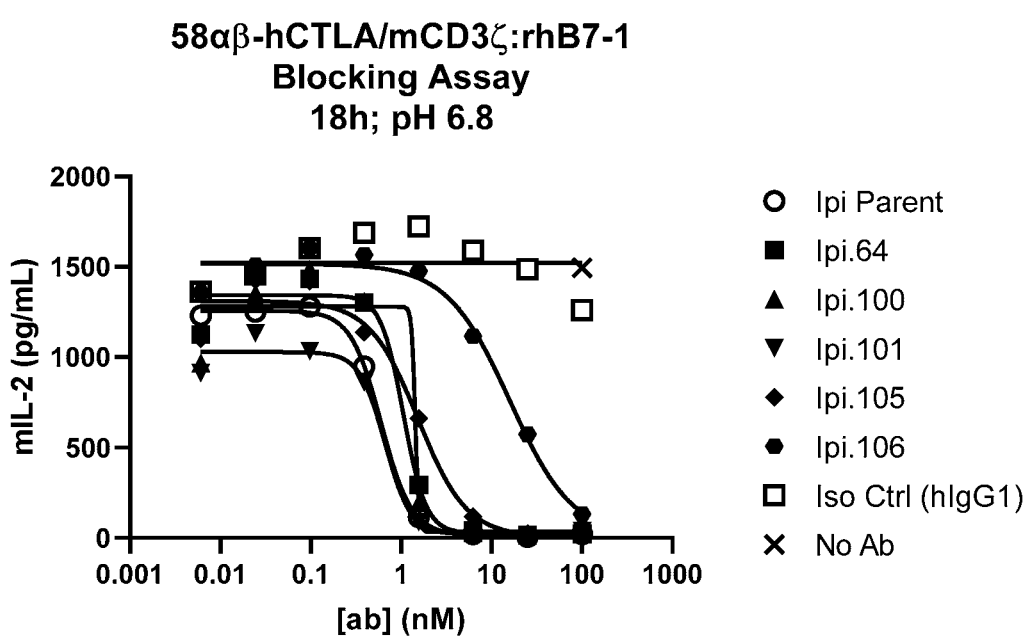
Figure 19A:
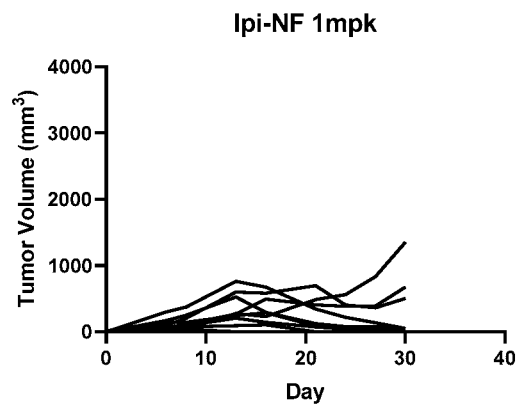
FIGS. 19A-19M show the effects of selected pH sensitive anti-CTLA-4 antibodies of the present invention, each expressed as a non-fucosylated IgG1, in the MC38 mouse tumor model. Human CTLA-4 knock-in mice were used. See Example 7. Tumor volume (mm³) is provided as a function of the number of days past implantation, with each trace representing one of the ten mice per experiment.
Figure 19B:
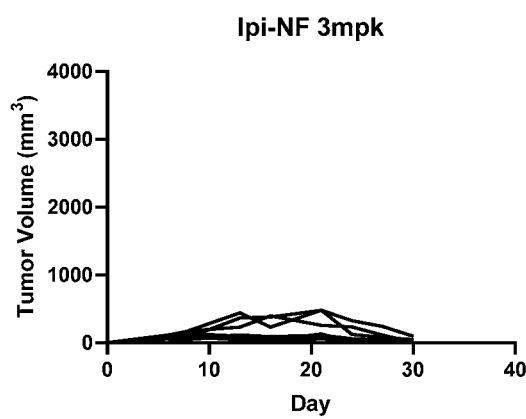
Figure 19C:
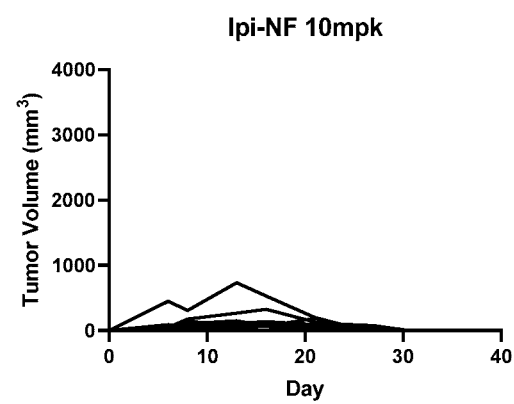
Figure 19D:
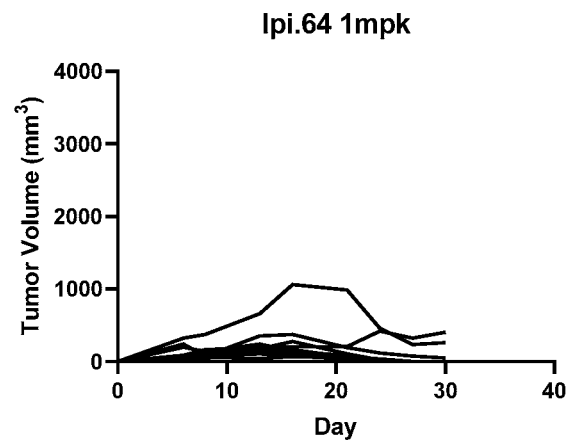
Figure 19E:
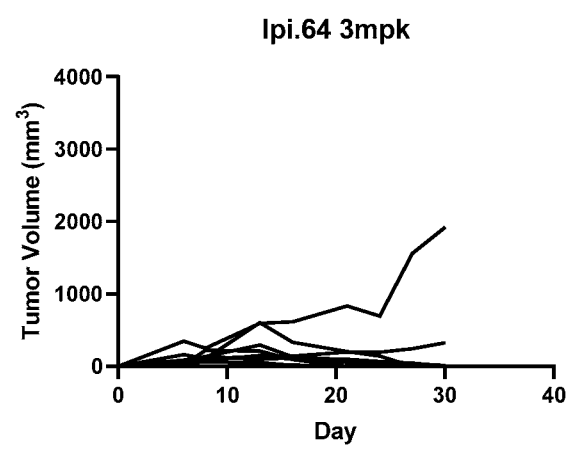
Figure 19F:
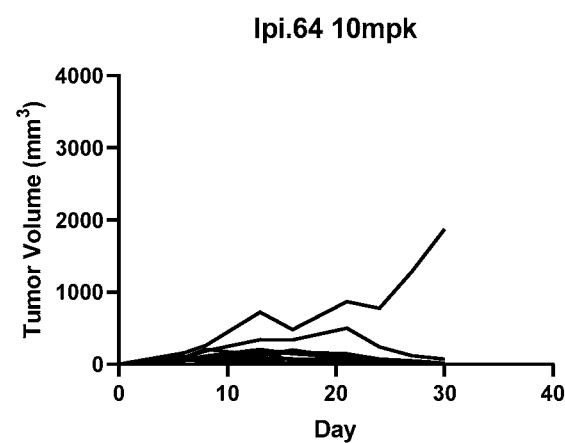
Figure 19G:
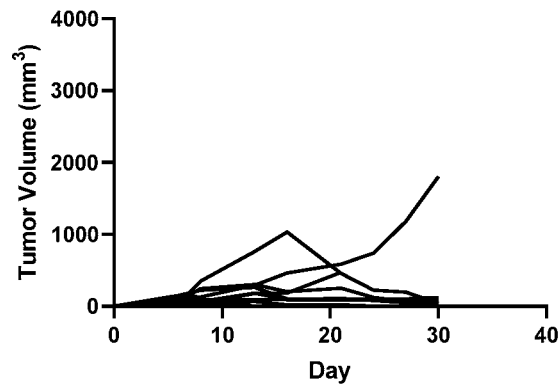
Figure 19H:
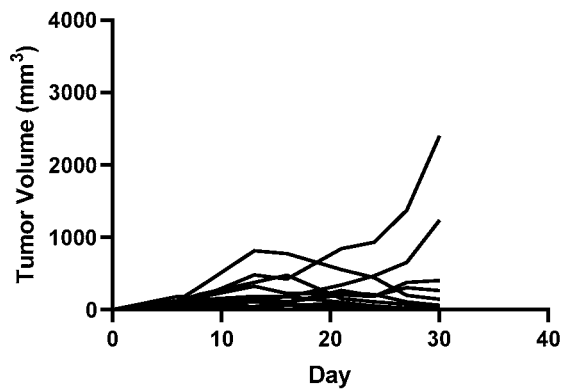
Figure 19I:
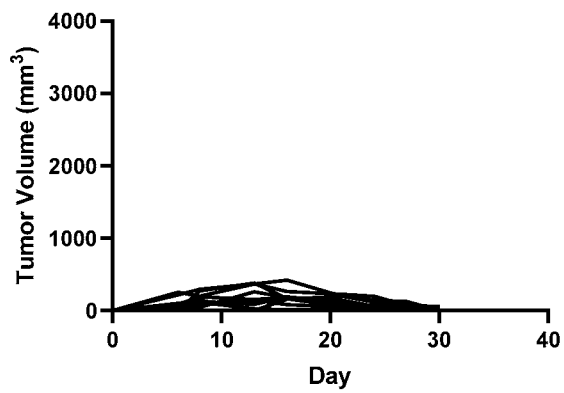
Figure 19J:
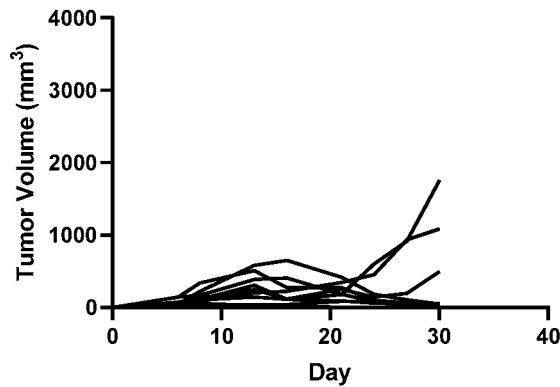
Figure 19K:
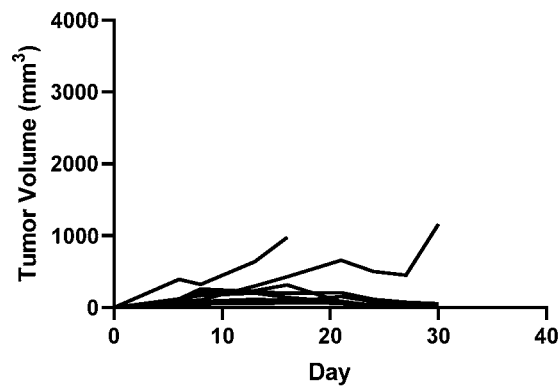
Figure 19L:
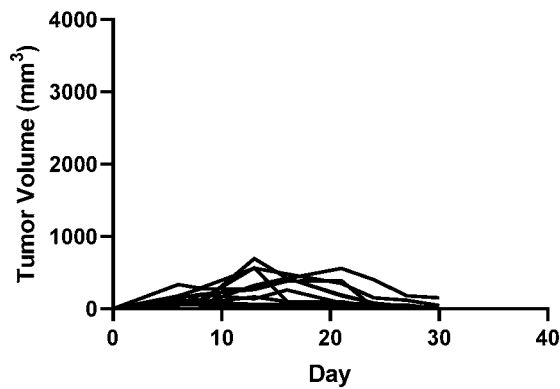
Figure 19M:
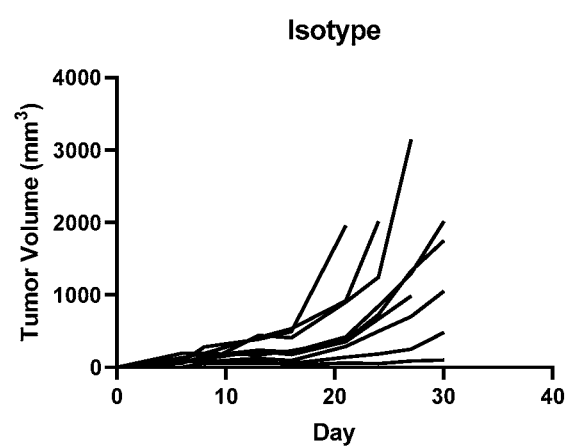

Analogous results for cyno CTLA-4 are provided at FIG. 15A ($K_D$), 15B ($k_{on}$) and 15C ($k_{off}$). Results are qualitatively similar to those observed with human CTLA-4, although generally at lower affinity FIG. 14A shows the binding affinity ($K_D$) of Fab fragments of various antibodies of the present invention as a function of pH, primarily resulting from an increased $k_{off}$. The similar pH dependence of binding to human and cyno CTLA-4 demonstrates that cynomolgus macaques are a good animal for toxicology and other studies with the antibodies of the present invention. See Example 10.

Example 9

Biological Activity of Ipilimumab Variants of the Present Invention in 58αβ-hCTLA mCD3ζ: rhB7-1 Blocking Assay The biological activity of selected pH sensitive ipilimumab variants of the present invention was assessed in a 58αβ-hCTLA/mCD3ζ: rhB7-1 blocking assay as follows. One day prior to running the assay, rhB7-1 was diluted in 1×PBS and plated in 50 µL/well at 1.2 µg/mL in 96-well flat-bottom plates and incubated at 4° C. overnight. Ipilimumab pH variants (Ipi.64, Ipi. 100, Ipi. 101, Ipi. 105, Ipi. 106) were expressed as IgG1-NF variants and tested for blockade of 58αβ-hCTLA4/mCD3ζ cells and plate-bound rhB7-1. Ipi-pH variants were titrated for a final top concentration of 15 µg/mL at a 1:4 dilution across 8 points in pH-specific media. Media contains RPMI-1640, 10% $FBS^{HI}$, sodium bicarbonate and sodium phosphate buffer (pH 5.4). Sodium phosphate buffer was added until desired pH was reached (7.2, 7.0, 6.8). 120 µL of cells at 1e6 cells/mL and 60 µL antibody titrations were combined in a 96-well round-bottom plate and incubated at 37° C., 8% $CO_2$, for 20 minutes to allow equilibration of pH. Coated plates were washed with PBS and 150 µL cell/antibody mixture was transferred to the plates. Plates were incubated at 37° C., 8% $CO_2$, for 18 hours and supernatant was removed and tested for mIL-2 production by ELISA (BD). Results are provided at FIGS. 18A-18C.

Example 10

Toxicity Evaluation in Cynomolgus Macaques

A 4-week study is conducted in cynomolgus monkeys to evaluate the toxicity of pH sensitive ipilimumab variants of the present invention compared to ipilimumab in compliance with the Good Laboratory Practice Regulations for nonclinical Laboratory Studies of the US Food and Drug Administration (21 C.F.R. Part 58), the USDA Animal Welfare Act (9 C.F.R., Parts 1, 2, 3), and the Guide for the Care and Use of Laboratory Animals of the National Institutes of Health (ILAR publication 1996).

Thirty purpose-bred cynomolgus monkeys Macaca fascicularis; 5/sex/group) are assigned to three groups by a stratified randomization scheme designed to achieve similar group mean body weights, and the groups are randomly assigned to treatment. The groups are dosed intravenously (IV) with 1) saline control, 2) ipilimumab 50 mg/kg, or 3) pH sensitive ipilimumab variant of the present invention 50 mg/kg, once weekly (days 1, 8, 15, and 22), for a total of four doses. The animals are evaluated for changes in clinical signs and body weight and cardiovascular assessments are performed. Selby et al. (2016) PLOS One 11:e0167251.

TABLE 6

Variants of Ipilimumab with Potential Preferential Binding at Acid pH*

|  | ipi LC (SEQ ID NO: 21) | LC var. 2 (SEQ ID NO: 22) | LC var. 3 (SEQ ID NO: 23) | LC var. 4 (SEQ ID NO: 24) | LC var. 5 (SEQ ID NO: 25) | LC var. 6 (SEQ ID NO: 26) | LC var. 7 (SEQ ID NO: 27) | LC var. 8 (SEQ ID NO: 28) |
|---|---|---|---|---|---|---|---|---|
| ipi HC (SEQ ID NO: 11) | ipi | ipi.25 | ipi.93 | ipi.17 | ipi.18 | ipi.20 | ipi.26 | ipi.103 |
| HC var. 2 (SEQ ID NO: 12) | ipi.57 | ipi.64 | ipi.94 | ipi.107 | ipi.96 |  | ipi.100 | ipi.104 |
| HC var. 3 (SEQ ID NO: 13) | ipi.69 | ipi.71 | ipi.95 | ipi.108 | ipi.98 |  | ipi.101 | ipi.105 |
| HC var. 4 (SEQ ID NO: 14) | ipi.84 | ipi.88 | ipi.92 |  |  |  | ipi.102 | ipi.106 |
| HC var. 5 (SEQ ID NO: 15) | ipi.1 | ipi.38 |  |  |  |  |  |  |
| HC var. 6 (SEQ ID NO: 16) | ipi.2 | ipi.39 |  |  |  |  |  |  |
| HC var. 7 (SEQ ID NO: 17) | ipi.3 | ipi.40 |  |  |  |  |  |  |
| HC var. 8 (SEQ ID NO: 18) | ipi.7 | ipi.40 |  |  |  |  |  |  |
| HC var. 9 (SEQ ID NO: 19) | ipi.59 | ipi.66 |  | ipi.97 |  |  |  |  |

TABLE 6-continued

Variants of Ipilimumab with Potential Preferential Binding at Acid pH*

| | ipi LC (SEQ ID NO: 21) | LC var. 2 (SEQ ID NO: 22) | LC var. 3 (SEQ ID NO: 23) | LC var. 4 (SEQ ID NO: 24) | LC var. 5 (SEQ ID NO: 25) | LC var. 6 (SEQ ID NO: 26) | LC var. 7 (SEQ ID NO: 27) | LC var. 8 (SEQ ID NO: 28) |
|---|---|---|---|---|---|---|---|---|
| HC var. 10 (SEQ ID NO: 20) | ipi.82 | ipi.86 | ipi.90 | | | | | |

*Additional variants ipi.23 and ipi.24, comprising ipi HC (SEQ ID NO: 11) and either LC var. 9 (SEQ ID NO: 29) or LC var. 10 (SEQ ID NO: 30), respectively, are not included in Table 6 merely for space reasons, but are included in Table 7.

TABLE 7

CDR Sequences of Ipilimumab Variants with Potential Preferential Binding at Acid pH

| | SEQ ID NOs | HCDR1 | HCDR2 | HCDR3 | LCDR1 |
|---|---|---|---|---|---|
| ipi | 11/21 | GFTFSSYTMH | FISYDGNNKYYADSVKG | TGWLGPFDY | RASQSVGSSYLA |
| ipi.1 | 15/21 | -------H-- | ----------------- | --------- | ------------ |
| ipi.2 | 16/21 | ---------- | -------H--------- | --------- | ------------ |
| ipi.3 | 17/21 | ---------- | ----------------- | H-------- | ------------ |
| ipi.7 | 18/21 | -------H-- | -------H--------- | --------- | ------------ |
| ipi.17 | 11/24 | ---------- | ----------------- | --------- | ----E------- |
| ipi.18 | 11/25 | ---------- | ----------------- | --------- | -------D---- |
| ipi.20 | 11/26 | ---------- | ----------------- | --------- | ---------E-- |
| ipi.23 | 11/29 | ---------- | ----------------- | --------- | ----D--D---- |
| ipi.24 | 11/30 | ---------- | ----------------- | --------- | ----D--E---- |
| ipi.25 | 11/22 | ---------- | ----------------- | --------- | ----E--D---- |
| ipi.26 | 11/27 | ---------- | ----------------- | --------- | ----E--E---- |
| ipi.57 | 12/21 | -----H---- | ----------------- | --------- | ------------ |
| ipi.59 | 19/21 | ---------- | ------H--------- | --------- | ------------ |
| ipi.64 | 12/22 | -----H---- | ----------------- | --------- | ----E--D---- |
| ipi.66 | 19/22 | ---------- | ------H--------- | --------- | ----E--D---- |
| ipi.69 | 13/21 | -----H---- | ------H--------- | --------- | ------------ |
| ipi.71 | 13/22 | -----H---- | ------H--------- | --------- | ----E--D---- |
| ipi.82 | 20/21 | -----H---- | ----------------- | H-------- | ------------ |
| ipi.84 | 14/21 | -----H---- | ------H--------- | H-------- | ------------ |
| ipi.86 | 20/22 | -----H---- | ----------------- | H-------- | ----E--D---- |
| ipi.88 | 14/22 | -----H---- | ------H--------- | H-------- | ----E--D---- |
| ipi.90 | 20/23 | -----H---- | ----------------- | H-------- | ----E--D-E-- |
| ipi.92 | 14/23 | -----H---- | ------H--------- | H-------- | ----E--D-E-- |
| ipi.93 | 11/23 | ---------- | ----------------- | --------- | ----E--D-E-- |
| ipi.94 | 12/23 | -----H---- | ----------------- | --------- | ----E--D-E-- |
| ipi.95 | 13/23 | -----H---- | ------H--------- | --------- | ----E--D-E-- |
| ipi.100 | 12/27 | -----H---- | ----------------- | --------- | ----E--E---- |
| ipi.101 | 13/27 | -----H---- | ------H--------- | --------- | ----E--E---- |

TABLE 7-continued

CDR Sequences of Ipilimumab Variants with Potential Preferential Binding at Acid pH

| | SEQ ID NOs | HCDR1 | HCDR2 | HCDR3 | LCDR1 |
|---|---|---|---|---|---|
| ipi.105 | 13/28 | -----H---- | ------H---------- | --------- | ----E--E-E-- |
| ipi.106 | 14/28 | -----H---- | ------H---------- | H-------- | ----E--E-E-- |

TABLE 8

Summary of the Sequence Listing

| SEQ ID NO. | Description |
|---|---|
| 1 | human CTLA-4 (NP_005205.2) |
| 2 | human CD28 (NP_006130.1) |
| 3 | ipilimumab HCDR1 |
| 4 | ipilimumab HCDR2 |
| 5 | ipilimumab HCDR3 |
| 6 | ipilimumab LCDR1 |
| 7 | ipilimumab LCDR2 |
| 8 | ipilimumab LCDR3 |
| 9 | ipilimumab heavy chain variable region |
| 10 | ipilimumab light chain variable region |
| 11 | ipilimumab heavy chain w/o K448 |
| 12 | ipilimumab heavy chain variant 2 |
| 13 | ipilimumab heavy chain variant 3 |
| 14 | ipilimumab heavy chain variant 4 |
| 15 | ipilimumab heavy chain variant 5 |
| 16 | ipilimumab heavy chain variant 6 |
| 17 | ipilimumab heavy chain variant 7 |
| 18 | ipilimumab heavy chain variant 8 |
| 19 | ipilimumab heavy chain variant 9 |
| 20 | ipilimumab heavy chain variant 10 |
| 21 | ipilimumab light chain |
| 22 | ipilimumab light chain variant 2 |
| 23 | ipilimumab light chain variant 3 |
| 24 | ipilimumab light chain variant 4 |
| 25 | ipilimumab light chain variant 5 |
| 26 | ipilimumab light chain variant 6 |
| 27 | ipilimumab light chain variant 7 |
| 28 | ipilimumab light chain variant 8 |
| 29 | ipilimumab light chain variant 9 |
| 30 | ipilimumab light chain variant 10 |
| 31 | ipilimumab heavy chain variable region variant [S31X, N56X, T99X] |
| 32 | ipilimumab light chain variable region variant [528X, S31X, Y33X] |
| 33 | tremelimumab HCDR1 |
| 34 | tremelimumab HCDR2 |
| 35 | tremelimumab HCDR3 |
| 36 | tremelimumab LCDR1 |
| 37 | tremelimumab LCDR2 |
| 38 | tremelimumab LCDR3 |
| 39 | tremelimumab heavy chain variable region |
| 40 | tremelimumab light chain variable region |
| 41 | tremelimumab heavy chain w/o K448 |
| 42 | tremelimumab light chain |
| 43 | tremelimumab heavy chain variable region variant [S31X, S56X, D99X] |
| 44 | tremelimumab light chain variable region variant a [S28X, S31X, Y32X] |
| 45 | tremelimumab light chain variable region variant b [S28X, N30X, Y32X] |

With regard to antibody sequences, the Sequence Listing provides the sequences of the mature variable regions of the heavy and light chains, i.e. the sequences do not include signal peptides. Any signal sequence suitable for use in the production cell line being used may be used in production of the antibodies of the present invention. Heavy chain amino acid sequences are provided without a C-terminal lysine residue, but in some embodiments such residue is encoded in the nucleic acid construct for the antibody. Numbering in the specification and figures is often according to the Kabat numbering system, and thus may not correspond to the numbering in the sequence listing, but any ambiguity can be resolved by reference to FIG. 1.

EQUIVALENTS

Those skilled in the art will recognize, or be able to ascertain using no more than routine experimentation, many equivalents of the specific embodiments disclosed herein. Such equivalents are intended to be encompassed by the following claims.

What is claimed is:

1. An anti-human CTLA-4 antibody, or antigen binding fragment thereof, that has an acidic pH binding preference (APBP) for binding at acidic pH compared to binding at neutral pH, comprising the heavy chain variable region sequence of residues 1-118 of SEQ ID NO: 14 and the light chain variable region sequence of residues 1-108 of SEQ ID NO: 28.

2. An anti-human CTLA-4 antibody of claim 1 comprising the heavy chain sequence of SEQ ID NO: 14 and the light chain sequence of SEQ ID NO: 28.

3. A preparation of the anti-human CTLA-4 antibody of claim 2 wherein the preparation has reduced fucosylation, is hypofucosylated, or is nonfucosylated.

4. The preparation of the anti-human CTLA-4 antibody of claim 3 wherein the antibody is produced in a mammalian cell line lacking alpha-1,6-fucosyltransferase activity.

5. A method of treating cancer in a human subject comprising administering to the subject a therapeutic amount of the antibody, or antigen binding fragment thereof, of claim 1.

6. The method of claim 5 wherein the treating is performed in combination with an antagonist antibody or fragment thereof that binds to PD1 or PD-L1.

7. The method of claim 5 wherein the cancer is unresectable or metastatic melanoma.

8. The method of claim 7 wherein the antibody is administered at a dose greater than 3 mg/kg.

9. The method of claim 5 wherein the cancer is melanoma and the antibody is administered as an adjuvant to patients with cutaneous melanoma with pathologic involvement of regional lymph nodes of more than 1 mm who have undergone complete resection, including total lymphadenectomy.

10. The method of claim 9 wherein the antibody is administered at a dose greater than 10 mg/kg.

* * * * *